(12) United States Patent
Kuo

(10) Patent No.: US 10,895,716 B2
(45) Date of Patent: Jan. 19, 2021

(54) ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 282 days.

(21) Appl. No.: 16/174,085

(22) Filed: Oct. 29, 2018

(65) Prior Publication Data

US 2020/0081228 A1 Mar. 12, 2020

(30) Foreign Application Priority Data

Sep. 7, 2018 (TW) ............... 107131586 A

(51) Int. Cl.
| | | |
|---|---|---|
| G02B 13/00 | (2006.01) | |
| G02B 9/62 | (2006.01) | |
| G02B 5/00 | (2006.01) | |
| G02B 13/18 | (2006.01) | |
| G02B 3/04 | (2006.01) | |

(52) U.S. Cl.
CPC ........... *G02B 13/0045* (2013.01); *G02B 9/62* (2013.01); *G02B 13/008* (2013.01); *G02B 3/04* (2013.01); *G02B 5/005* (2013.01); *G02B 13/18* (2013.01)

(58) Field of Classification Search
CPC .... G02B 13/0045; G02B 13/008; G02B 9/62; G02B 13/18; G02B 5/005; G02B 3/04
USPC .................. 359/713, 740, 756, 757
See application file for complete search history.

(56) References Cited

U.S. PATENT DOCUMENTS

| | | | |
|---|---|---|---|
| 8,385,006 B2 | 2/2013 | Tsai et al. | |
| 9,857,563 B2 | 1/2018 | Liao et al. | |
| 2010/0188555 A1 | 7/2010 | Hirao et al. | |
| 2013/0010181 A1 | 1/2013 | Baba | |
| 2016/0018629 A1 | 1/2016 | Tang et al. | |
| 2017/0052346 A1 | 2/2017 | Tang et al. | |
| 2017/0052347 A1 | 2/2017 | Tang et al. | |
| 2017/0153419 A1 | 6/2017 | Hsieh et al. | |
| 2017/0329109 A1 | 11/2017 | Kubota et al. | |
| 2018/0003803 A1 | 1/2018 | Kakani et al. | |
| 2018/0052304 A1* | 2/2018 | Wu ................. | G02B 13/0045 |
| 2018/0074295 A1 | 3/2018 | Lin et al. | |
| 2018/0321468 A1 | 11/2018 | Shih et al. | |

FOREIGN PATENT DOCUMENTS

| | | |
|---|---|---|
| CN | 101553748 A | 10/2009 |
| CN | 104280859 B | 1/2015 |
| JP | H02-272513 A | 6/1991 |
| JP | H03-118509 A | 12/1992 |
| JP | 1993-173063 A | 1/1995 |

(Continued)

*Primary Examiner* — Evelyn A Lester
(74) *Attorney, Agent, or Firm* — Maschoff Brennan

(57) ABSTRACT

An electronic device includes an optical system. The optical system includes six lens elements, and the six lens elements are, in order from an outer side to an inner side: a first lens element, a second lens element, a third lens element, a fourth lens element, a fifth lens element and a sixth lens element. Each of the six lens elements has an outer-side surface facing toward the outer side and an inner-side surface facing toward the inner side. Each of at least three lens surfaces of the six lens elements is aspheric and has at least one inflection point.

26 Claims, 30 Drawing Sheets

(56) References Cited

FOREIGN PATENT DOCUMENTS

| | | |
|---|---|---|
| JP | 2013-210534 A | 10/2013 |
| JP | 2013-210538 A | 10/2013 |
| KR | 10-0835108 B1 | 6/2008 |
| TW | 201807447 A | 3/2018 |
| TW | 201809784 A | 3/2018 |
| TW | 201843487 A | 12/2018 |
| WO | 2020039486 A | 2/2020 |

\* cited by examiner

ELECTRONIC DEVICE

RELATED APPLICATIONS

This application claims priority to Taiwan Application 107131586, filed on Sep. 7, 2018, which is incorporated by reference herein in its entirety.

BACKGROUND

Technical Field

The present disclosure relates to an electronic device, more particularly to an electronic device including an optical system.

Description of Related Art

Due to the rapid changes in technology, electronic devices equipped with optical systems are applicable to various applications including normal photography, infrared photography and 3D (three-dimensional) image capturing, and therefore the functionality and image quality requirements of the optical systems have been increasing. However, it is difficult for a conventional optical system to obtain a balance among requirements such as high image quality, low sensitivity, a desirable aperture size, miniaturization or required field of view. Accordingly, the present disclosure provides an optical system that satisfies the aforementioned requirements.

SUMMARY

According to one aspect of the present disclosure, an electronic device includes an optical system. The optical system includes six lens elements. The six lens elements are, in order from an outer side to an inner side, a first lens element, a second lens element, a third lens element, a fourth lens element, a fifth lens element and a sixth lens element. Each of the six lens elements has an outer-side surface facing toward the outer side and an inner-side surface facing toward the inner side. Each of at least three lens surfaces of the six lens elements is aspheric and has at least one inflection point. Each of at least five lens elements of the six lens elements has an Abbe number smaller than 33.0. When half of a maximum field of view of the optical system is HFOV, a focal length of the second lens element is f2, a curvature radius of the outer-side surface of the second lens element is R3, an axial distance between the second lens element and the third lens element is T23, and a central thickness of the third lens element is CT3, the following conditions are satisfied:

0[deg.]<HFOV<120.0[deg.];

$-5.0 < \log_{10}(|f2/R3|) < 3.6$; and $0 < T23/CT3 < 2.00$.

According to another aspect of the present disclosure, an electronic device includes an optical system. The optical system includes six lens elements. The six lens elements are, in order from an outer side to an inner side, a first lens element, a second lens element, a third lens element, a fourth lens element, a fifth lens element and a sixth lens element. Each of the six lens elements has an outer-side surface facing toward the outer side and an inner-side surface facing toward the inner side. The inner-side surface of the sixth lens element is concave in a paraxial region thereof. The inner-side surface of the sixth lens element is aspheric and has at least one inflection point. Each of at least four lens elements of the six lens elements adjacently arranged has an Abbe number smaller than 35.0. When half of a maximum field of view of the optical system is HFOV, a central thickness of the first lens element is CT1, a central thickness of the second lens element is CT2, a central thickness of the third lens element is CT3, a central thickness of the fourth lens element is CT4, a central thickness of the fifth lens element is CT5, and a central thickness of the sixth lens element is CT6, the following conditions are satisfied:

5.0[deg.]<HFOV<30.0[deg.]; and $0 < (CT2+CT4+CT5)/(CT1+CT3+CT6) < 0.95$.

According to still another aspect of the present disclosure, an electronic device includes an optical system. The optical system includes six lens elements. The six lens elements are, in order from an outer side to an inner side, a first lens element, a second lens element, a third lens element, a fourth lens element, a fifth lens element and a sixth lens element. Each of the six lens elements has an outer-side surface facing toward the outer side and an inner-side surface facing toward the inner side. The inner-side surface of the sixth lens element is concave in a paraxial region thereof. The inner-side surface of the sixth lens element is aspheric and has at least one inflection point. Each of at least five lens elements of the six lens elements has an Abbe number smaller than 35.0. When half of a maximum field of view of the optical system is HFOV, the following condition is satisfied:

38.0[deg.]<HFOV<120.0[deg.].

BRIEF DESCRIPTION OF THE DRAWINGS

The disclosure can be better understood by reading the following detailed description of the embodiments, with reference made to the accompanying drawings as follows.

DETAILED DESCRIPTION

An electronic device includes an optical system, and the optical system includes six lens elements. The six lens elements are, in order from an outer side to an inner side, a first lens element, a second lens element, a third lens element, a fourth lens element, a fifth lens element and a sixth lens element. Each of the six lens elements has an outer-side surface facing toward the outer side and an inner-side surface facing toward the inner side.

There can be an air gap in a paraxial region between each of all adjacent lens elements of the six lens elements; that is, each of the first through sixth lens elements can be a single and non-cemented lens element. The manufacturing process of cemented lenses is more complex than the non-cemented lenses, particularly when an inner-side surface of one lens element and an outer-side surface of the following lens element need to have accurate curvatures to ensure both lenses being highly cemented. In addition, during the cementing process, those two lens elements might not be highly cemented due to misalignment and it is thereby not favorable for the image quality. Therefore, having an air gap in a paraxial region between each of all adjacent lens elements of the optical system in the present disclosure is favorable for preventing the problem associated with the cemented lens elements while improving the yield rate.

The inner-side surface of the sixth lens element can be concave in a paraxial region thereof. Therefore, it is favorable for ensuring proper distance between the sixth lens element and an inner-side conjugate surface of the optical system.

Figure 30:
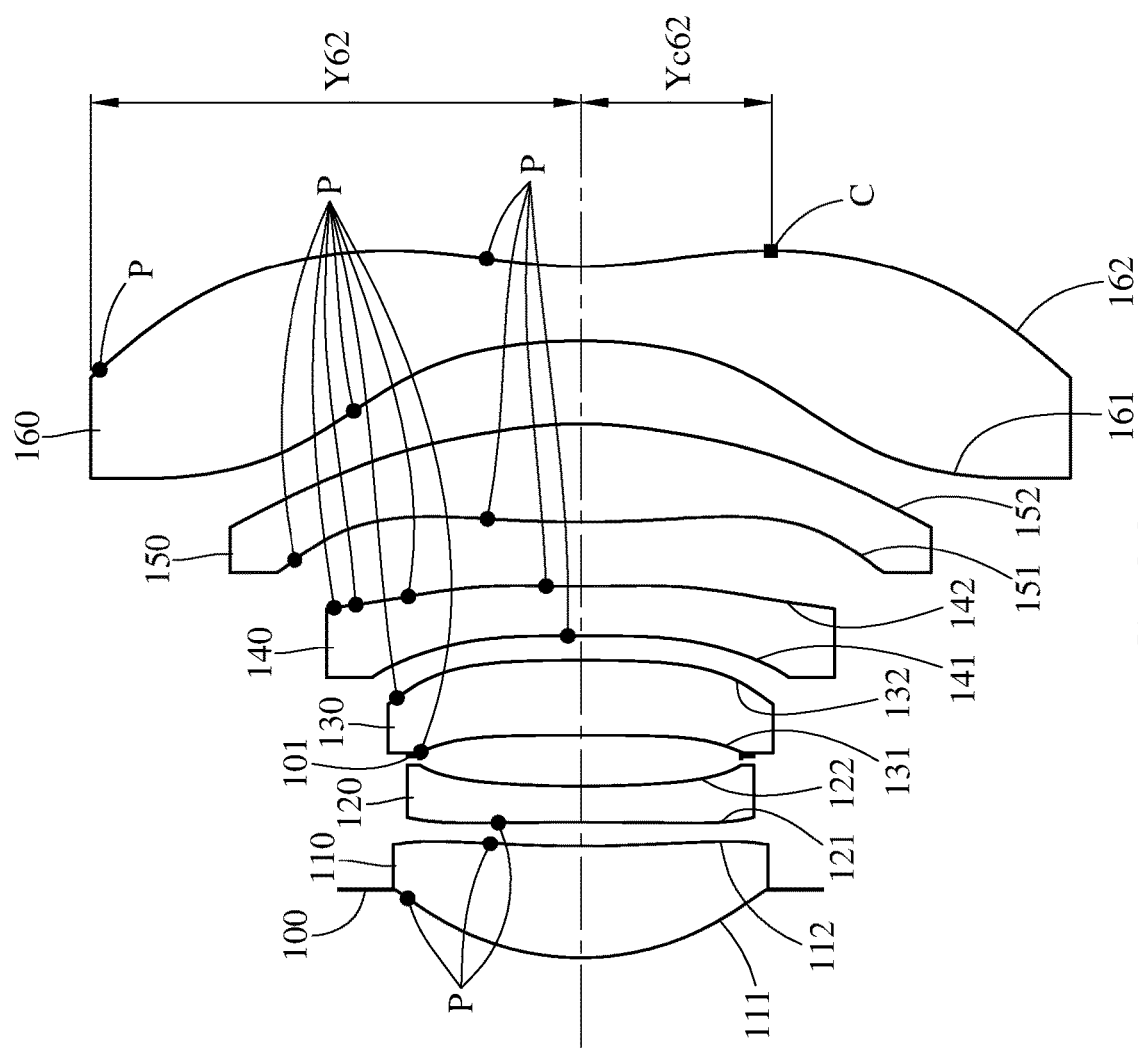
FIG. 30 shows a schematic view of Yc62, Y62, a critical point of the sixth lens element and inflection points of the lens elements according to the 1st embodiment of the present disclosure.

According to the present disclosure, at least one lens surface of the six lens elements of the optical system is aspheric and has at least one inflection point; therefore, it is favorable for increasing the shape variation of the lens elements so as to correct aberrations and reduce the size of the optical system. Preferably, each of at least two lens surfaces of the six lens elements of the optical system can be aspheric and have at least one inflection point. More preferably, each of at least two lens elements of the six lens elements of the optical system can have at least one aspheric surface that has at least one inflection point. Much more preferably, each of at least three lens surfaces of the six lens elements of the optical system can be aspheric and have at least one inflection point. Still more preferably, each of at least three lens elements of the six lens elements of the optical system can have at least one aspheric surface that has at least one inflection point. When the outer-side surface of the sixth lens element is aspheric and has at least one inflection point, it is favorable for adjusting the incident direction of light rays onto the sixth lens element so as to prevent stray light; when the inner-side surface of the sixth lens element is aspheric and has at least one inflection point, it is favorable for increasing peripheral illuminance and image quality. Furthermore, the inner-side surface of the sixth lens element can have at least one critical point in an off-axis region thereof; therefore, it is favorable for correcting aberrations such as off-axis field curvature so as to improve peripheral image quality. Please refer to FIG. 30, which shows a schematic view of a critical point C on the inner-side surface 162 of the sixth lens element 160 and inflection points P of the six lens elements according to the 1st embodiment of the present disclosure.

According to the present disclosure, each of at least four lens elements of the six lens elements of the optical system can have an Abbe number smaller than 35.0; therefore, a lens material having a low Abbe number generally features a stronger refractive capability, which is favorable for correcting aberrations so as to improve image quality; in addition, when the optical system is operated within a wavelength range of infrared light, the requirement of chromatic aberration correction is relatively low, such that the lens elements made of a low Abbe number material can be used to correct other kinds of aberrations. Preferably, each of at least four lens elements of the six lens elements of the optical system can have an Abbe number smaller than 33.0. More preferably, each of at least four lens elements of the six lens elements of the optical system can have an Abbe number smaller than 31.0. Much more preferably, each of at least four lens elements of the six lens elements of the optical system can have an Abbe number smaller than 28.5.

According to the present disclosure, each of at least four lens elements of the six lens elements of the optical system adjacently arranged can have an Abbe number smaller than 35.0. Therefore, arranging adjacent lens elements with each of them having a low Abbe number is favorable for correcting aberrations. Preferably, each of at least four adjacently arranged lens elements of the six lens elements of the optical system can have an Abbe number smaller than 33.0. More preferably, each of at least four adjacently arranged lens elements of the six lens elements of the optical system can have an Abbe number smaller than 31.0. The adjacently arranged lens elements indicate a group of lens elements that are arranged in sequence and have no additional lens element disposed thereamong. For example, four adjacently arranged lens elements can be referred to as the first through fourth lens elements, the second through fifth lens elements or the third through sixth lens elements.

According to the present disclosure, each of at least five lens elements of the six lens elements of the optical system can have an Abbe number smaller than 35.0. Therefore, lens elements having a low Abbe number is favorable for the miniaturization of the optical system. Preferably, each of at least five lens elements of the six lens elements of the optical system can have an Abbe number smaller than 33.0. More preferably, each of at least five lens elements of the six lens elements of the optical system can have an Abbe number smaller than 31.0.

When half of a maximum field of view of the optical system is HFOV, the following condition is satisfied: 0 [deg.]<HFOV<120.0 [deg.]; therefore, it is favorable for the optical system to be applicable to various applications. In one configuration, the following condition can also be satisfied: 38.0 [deg.]<HFOV<120.0 [deg.]; therefore, it is favorable for achieving a wide angle effect. In another configuration, the following condition can also be satisfied: 5.0 [deg.]<HFOV<30.0 [deg.]; therefore, it is favorable for obtaining a telephoto configuration in the optical system. Preferably, the following condition can also be satisfied: 7.0 [deg.]<HFOV<27.0 [deg.].

When a focal length of the second lens element is f2, and a curvature radius of the outer-side surface of the second lens element is R3, the following condition can be satisfied: $-5.0<\log_{10}(|f2/R3|)$. Therefore, adjusting the surface shape and the focal length of the second lens element is favorable for correcting aberrations. Preferably, the following condition can be satisfied: $-5.0<\log_{10}(|f2/R3|)<3.6$. More preferably, the following condition can be satisfied: $-3.5<\log_{10}(|f2/R3|)<2.5$. Much more preferably, the following condition can also be satisfied: $-2.0<\log_{10}(|f2/R3|)<2.0$.

When an axial distance between the second lens element and the third lens element is T23, and a central thickness of the third lens element is CT3, the following condition can be satisfied: 0<T23/CT3<2.00. Therefore, it is favorable for adjusting the incident or refraction directions of light rays on the third lens element so as to reduce surface reflection. Preferably, the following condition can be satisfied: 0.25<T23/CT3<1.80. More preferably, the following condition can also be satisfied: 0.35<T23/CT3<1.60.

When a central thickness of the first lens element is CT1, a central thickness of the second lens element is CT2, the central thickness of the third lens element is CT3, a central thickness of the fourth lens element is CT4, a central thickness of the fifth lens element is CT5, and a central thickness of the sixth lens element is CT6, the following condition can be satisfied: 0<(CT2+CT4+CT5)/(CT1+CT3+CT6)<0.95. Therefore, it is favorable for balancing the distribution of the lens elements of the optical system so as to achieve a short total track length configuration while improving image quality. Preferably, the following condition can also be satisfied: 0.20<(CT2+CT4+CT5)/(CT1+CT3+CT6)<0.80.

When an f-number of the optical system is Fno, the following condition can be satisfied: 0.5<Fno<5.0; therefore, it is favorable for providing the optical system with a proper size of aperture stop, making the optical system applicable to various applications. In one configuration, the following condition can also be satisfied: 1.8<Fno<5.0; therefore, it is favorable for balancing the image sharpness of the central and peripheral regions. In another configuration, the following condition can also be satisfied: 0.5<Fno<2.8; therefore, it is favorable for the optical system to have a sufficient amount of incident light so as to increase illuminance.

When an axial distance between the outer-side surface of the first lens element and the inner-side conjugate surface of the optical system is TL, and a focal length of the optical system is f, the following condition can be satisfied: 0.50<TL/f<5.00; therefore, adjusting the ratio of the total track length to the focal length of the optical system is favorable for obtaining a balance between the size and the field of view of the optical system. In one configuration, the following condition can also be satisfied: 1.00<TL/f<5.00; therefore, it is favorable for achieving a compact and wide angle configuration. Preferably, the following condition can also be satisfied: 1.25<TL/f<4.50. In another configuration, the following condition can also be satisfied: 0.50<TL/f<1.00; therefore, it is favorable for achieving a compact and telephoto configuration.

When the focal length of the optical system is f, a focal length of the first lens element is f1, the focal length of the second lens element is f2, a focal length of the third lens element is f3, a focal length of the fourth lens element is f4, a focal length of the fifth lens element is f5, and a focal length of the sixth lens element is f6, at least one of the following conditions can be satisfied: −2.0<f/f1<5.0; −5.0<f/f2<5.0; −5.0<f/f3<5.0; −5.0<f/f4<5.0; −5.0<f/f5<5.0; and −5.0<f/f6<5.0. Therefore, it is favorable for preventing the lens elements having overly strong refractive power so as to reduce sensitivity, thereby improving the manufacturing yield rate. Preferably, at least one of the following conditions can also be satisfied: −1.2<f/f1<1.4; −3.0<f/f2<2.0; −3.0<f/f3<3.0; −3.0<f/f4<3.0; −3.0<f/f5<3.0; and −3.0<f/f6<3.0.

When the central thickness of the third lens element is CT3, the central thickness of the fourth lens element is CT4, and an axial distance between the third lens element and the fourth lens element is T34, the following condition can be satisfied: 0.28<(CT3+CT4)/T34<50.00. Therefore, it is favorable for the third lens element and the fourth lens element to work with each other so as to adjust the travelling direction of light and thus to reduce the size of the optical system. Preferably, the following condition can also be satisfied: 1.55<(CT3+CT4)/T34<14.00.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and an Abbe number of the i-th lens element is Vi, the following condition can be satisfied: $60.0<\Sigma Vi<200.0$, wherein i=1, 2, 3, 4, 5, 6. Therefore, a proper selection of materials of the lens elements is favorable for correcting aberrations such as chromatic aberration. According to the present disclosure, the Abbe number V of one lens element is obtained from the following equation: $V=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When the central thickness of the second lens element is CT2, the central thickness of the third lens element is CT3, and the axial distance between the second lens element and the third lens element is T23, the following condition can be satisfied: $1.1<(CT2+CT3)/T23$. Therefore, it is favorable for the second lens element and the third lens element to work with each other so as to reduce aberrations and the total track length of the optical system. Preferably, the following condition can be satisfied: $1.1<(CT2+CT3)/T23<41.0$. More preferably, the following condition can also be satisfied: $1.1<(CT2+CT3)/T23<8.0$.

When an axial distance between the first lens element and the second lens element is T12, and the central thickness of the second lens element is CT2, the following condition can be satisfied: $0.022<T12/CT2<1.5$. Therefore, it is favorable for the first lens element and the second lens element to work with each other so as to properly distribute the incident light and to obtain a balance between the field of view and the size of the optical system. Preferably, the following condition can also be satisfied: $0.34<T12/CT2<1.0$.

When the focal length of the optical system is f, and a minimum value among absolute values of focal lengths of each of the six lens elements of the optical system is |f|min, the following condition can be satisfied: $1.21 \leq f/|f|min<5.00$. Therefore, it is favorable for the lens elements to have sufficient refractive power so as to converge light. Preferably, the following condition can be satisfied: $1.40<f/|f|min<4.00$. More preferably, the following condition can also be satisfied: $1.62 \leq f/|f|min<3.00$.

When a curvature radius of the inner-side surface of the second lens element is R4, and a curvature radius of the outer-side surface of the third lens element is R5, the following condition can be satisfied: $-0.70<R4/R5<0.95$. Therefore, it is favorable for the second lens element and the third lens element to work with each other so as to adjust light path and thus reduce stray light.

According to the present disclosure, the optical system can be operated within infrared light having a wavelength range of 750 nanometers (nm) to 1600 nm. Therefore, it is favorable for reducing the disturbance of visible light during operation, such that the optical system is applicable to various applications such as motion capturing, augmented reality, face recognition and night vision imaging.

When the axial distance between the outer-side surface of the first lens element and the inner-side conjugate surface of the optical system is TL, the following condition can be satisfied: $1.0\ [mm]<TL<15\ [mm]$. Therefore, it is favorable for reducing the space occupied by the optical system, making the optical system applicable to a wide range of applications. Preferably, the following condition can also be satisfied: $2.0\ [mm]<TL<7.0\ [mm]$.

When the axial distance between the outer-side surface of the first lens element and the inner-side conjugate surface of the optical system is TL, and a maximum effective radius of the inner-side conjugate surface of the optical system is YI, the following condition can be satisfied: $0.9<TL/YI<6.0$. Therefore, it is favorable for obtaining a balance between reducing the total track length and enlarging the inner-side conjugate surface of the optical system. When the optical system is applied to an image capturing unit or a receiving device, the optical system featuring a large conjugate surface provides a high image quality. When the optical system is applied to a projection device, the optical system featuring a large conjugate surface enhances the projection capability of the projection device.

When a maximum value among refractive indices of the six lens elements of the optical system is Nmax, the following condition can be satisfied: $1.64 \leq Nmax<1.75$. Therefore, selecting lens materials having suitable refractive index is favorable for reducing the size of the optical system and correcting aberrations so as to improve image quality.

When a minimum value among Abbe numbers of the six lens elements of the optical system is Vmin, the following condition can be satisfied: $10.0<Vmin \leq 20.4$. Therefore, since a lens material with low Abbe number generally features a stronger refractive capability, the lens elements made of a low Abbe number material is favorable for correcting aberrations such as chromatic aberration.

According to the present disclosure, there can be an air gap in a paraxial region between each of at least three pairs of adjacent lens elements of the six lens elements of the optical system. Since the refraction depends on the difference in the speeds of light between two sides of an interface, having an air gap between adjacent two lens elements is favorable for increasing refraction effect. In particular, comparing to refracting visible light, lens elements are weaker at refracting infrared light, so having an air gap between adjacent two lens elements is essential when the optical system is operated within a wavelength range of infrared light. Preferably, there can be an air gap in a paraxial region between each of at least four pairs of adjacent lens elements of the six lens elements of the optical system.

According to the present disclosure, the outer-side surfaces and the inner-side surfaces of at least three lens elements of the six lens elements of the optical system can be all aspheric. Therefore, it is favorable for enhancing the refractive capability of the lens elements so as to correct off-axis aberrations and improve peripheral image quality. Preferably, the outer-side surfaces and the inner-side surfaces of at least four lens elements of the six lens elements of the optical system can be all aspheric. More preferably, the outer-side surfaces and the inner-side surfaces of at least five lens elements of the six lens elements of the optical system can be all aspheric. Much more preferably, the outer-side surfaces and the inner-side surfaces of the six lens elements of the optical system can be all aspheric.

When a sum of axial distances between each of all adjacent lens elements of the six lens elements of the optical system is $\Sigma AT$, and a sum of central thicknesses of the six lens elements of the optical system is $\Sigma CT$, the following condition can be satisfied: $0.20<\Sigma AT/\Sigma CT<1.40$. Therefore, adjusting the arrangement of the lens elements is favorable for reducing the total track length of the optical system.

When a vertical distance between the critical point on the inner-side surface of the sixth lens element and an optical axis is Yc62, and a maximum effective radius of the inner-side surface of the sixth lens element is Y62, the following condition can be satisfied: $0.10<Yc62/Y62<0.90$. Therefore, it is favorable for adjusting the position of the critical point on the inner-side surface of the sixth lens element so as to reduce surface reflection of light at wide field of view, to reduce stray light and to increase peripheral illuminance. Please refer to FIG. 30, which shows a schematic view of Yc62 and Y62 according to the 1st embodiment of the present disclosure.

According to the present disclosure, each of at least three lens elements of the six lens elements of the optical system can be made of plastic material. Therefore, it is favorable for reducing the weight of the optical system and favorable for mass production; also, it's favorable for increasing the shape variation of the lens elements so as to correct aberrations and reduce the size of the optical system. Preferably, each of at least four lens elements of the six lens elements of the optical system can be made of plastic material. More preferably, each of at least five lens elements of the six lens elements of the optical system can be made of plastic material. Much more preferably, each of the six lens elements of the optical system can be made of plastic material.

According to the present disclosure, the aforementioned features and conditions can be utilized in numerous combinations so as to achieve corresponding effects.

According to the present disclosure, the lens elements of the optical system of the electronic device can be made of either glass or plastic material. When the lens elements are made of glass material, the refractive power distribution of the optical system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical system can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an outer-side surface and an inner-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the optical system, image capturing unit, receiving device, projection device and the electronic device are not specifically defined, these parameters may be determined according to the operating wavelength range. For example, when the operating wavelength range is a wavelength range of visible light (e.g., 350 nm to 750 nm), these parameters are defined at the wavelength of helium d-line; when the operating wavelength range is a wavelength range of near infrared light (e.g., 750 nm to 1600 nm), these parameters are defined at the wavelength of 940 nm.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an inner-side conjugate surface of the optical system of the electronic device, based on the corresponding image sensor, can be flat or curved, especially a curved surface being concave facing towards the outer side of the optical system.

According to the present disclosure, an image correction unit, such as a field flattener, can be optionally disposed between the lens element closest to the inner-side conjugate surface and the inner-side conjugate surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave outer-side surface and a planar inner-side surface, and the thin transparent element is disposed near the inner-side conjugate surface.

According to the present disclosure, the optical system of the electronic device can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical system and the inner-side conjugate surface to produce a telecentric effect, and thereby improves the image-sensing efficiency of an image sensor (for example, CCD or CMOS). A middle stop disposed between the first lens element and the inner-side conjugate surface is favorable for enlarging the viewing angle of the optical system and thereby provides a wider field of view for the same.

According to the present disclosure, the optical system of the electronic device can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. When applied to an image capturing unit or a receiving device, the aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed. When applied to a projection device, the aperture control unit adjusts the projection illuminance or area.

Figure 27:
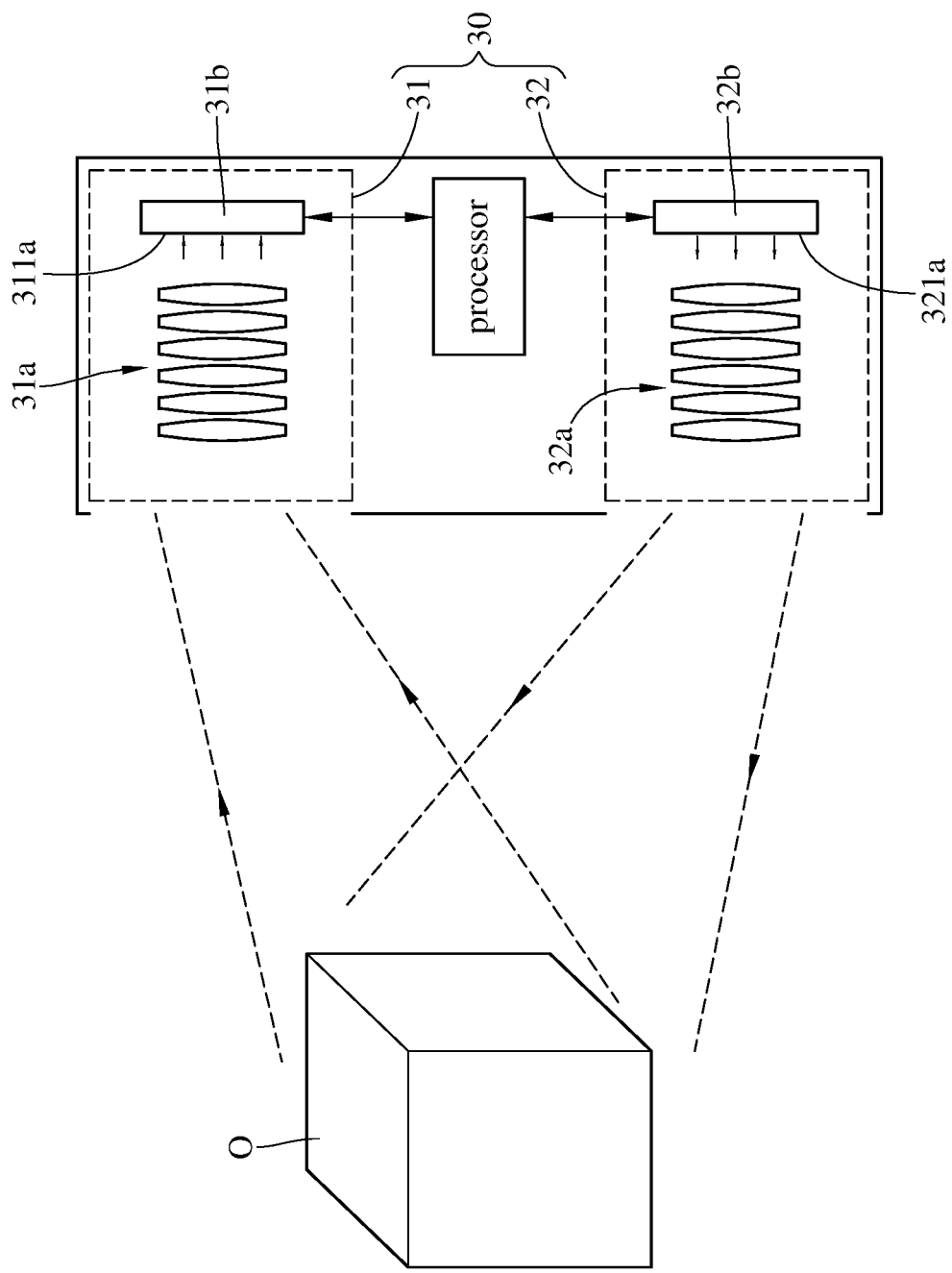
FIG. 27 is a schematic view of a detecting module of an electronic device according to the 14th embodiment of the present disclosure.

According to the present disclosure, said outer side indicates the outside of a mechanism, and said inner side indicates the inside of the mechanism. FIG. 27 is a schematic view of an imaging optical system 31a of a receiving device and a projection optical system 32a of a projection device according to an exemplary embodiment of the present disclosure. The projection optical system 32a includes an inner-side conjugate surface 321a on the inner side, which means that the inner-side conjugate surface 321a is a focal plane located on the inside of the mechanism (the conjugate surface on a reducing side). The imaging optical system 31a includes an inner-side conjugate surface 311a on the inner side, which means that the inner-side conjugate surface 311a is an image surface located on the inside of the mechanism. As for the imaging optical system 31a, the outer side of the imaging optical system 31a is an object side of the imaging optical system 31a, and the inner side of the imaging optical system 31a is an image side of the imaging optical system 31a. As for any lens element of the imaging optical system 31a, an outer-side surface of the lens element is a lens surface facing toward the object side, and an inner-side surface of the lens element is a lens surface facing toward the image side. As for the projection optical system 32a of the projection device 32, the outer side of the projection optical system 32a is a magnifying side of the projection optical system 32a closer to a detected object O, and the inner side of the projection optical system 32a is a reducing side of the projection optical system 32a closer to a light source 32b. As for any lens element of the projection optical system 32a, an outer-side surface (i.e., a light emitting surface) of the lens element is a lens surface facing toward the detected object O, and an inner-side surface (i.e., a light receiving surface) of the lens element is a lens surface facing toward the light source 32b (or the inner-side conjugate surface 321a). Furthermore, a maximum effective radius YI of the inner-side conjugate surface 311a of the imaging optical system 31a is a maximum image height of the imaging optical system 31a; a maximum effective radius YI of the inner-side conjugate surface 321a of the projection optical system 32a is a maximum radius of the light source 32b.

According to the above description of the present disclosure, the following specific embodiments are provided for further explanation.

1st Embodiment

Figure 1:
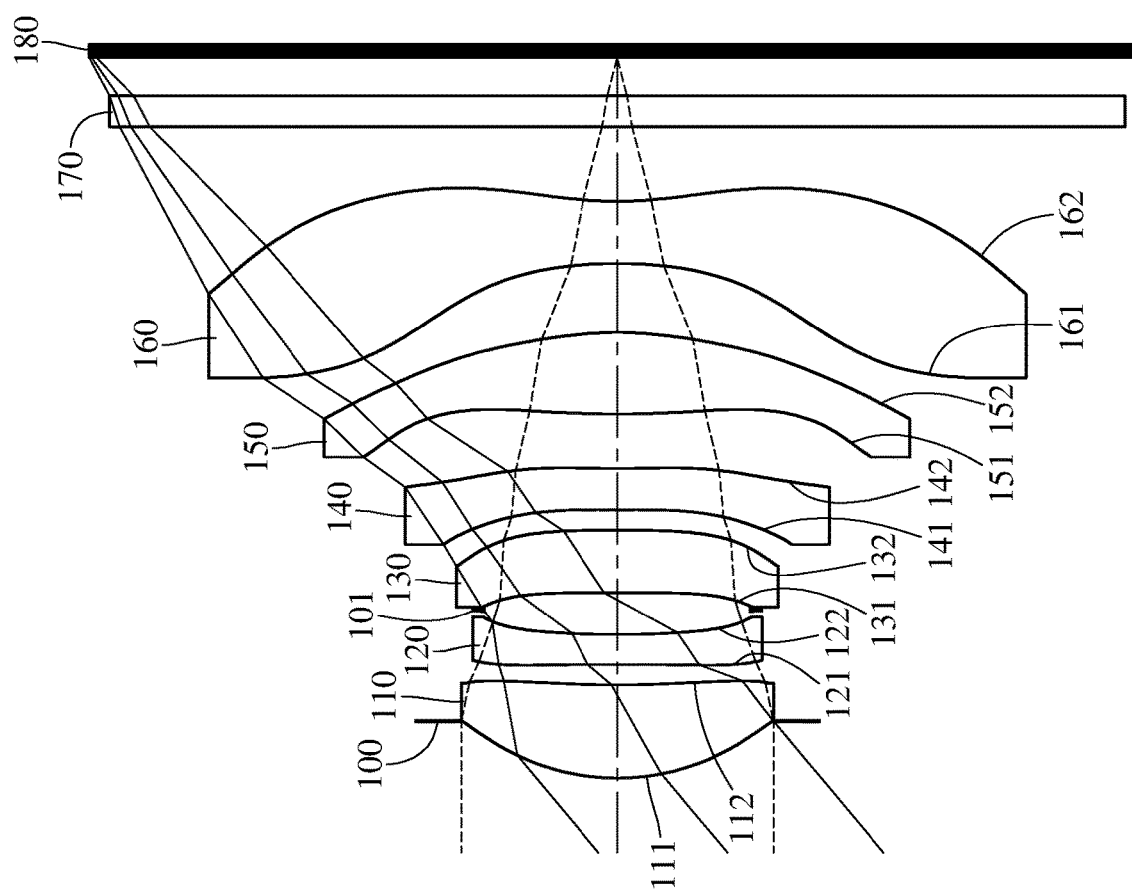
FIG. 1 is a schematic view of an optical system of an electronic device according to the 1st embodiment of the present disclosure.
Figure 2:
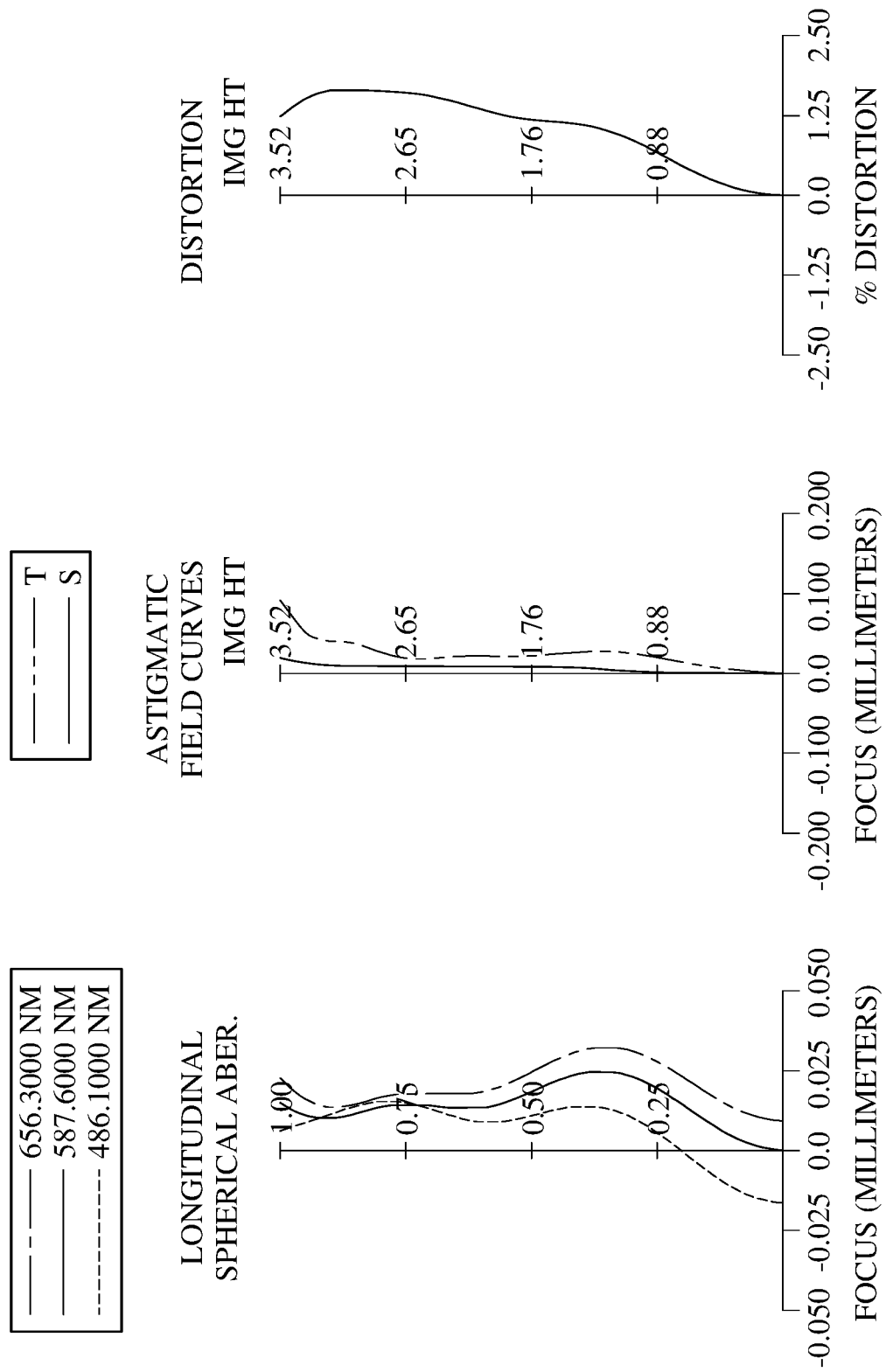
FIG. 2 shows spherical aberration curves, astigmatic field curves and a distortion curve of the optical system of the electronic device according to the 1st embodiment.

FIG. 1 is a schematic view of an optical system of an electronic device according to the 1st embodiment of the present disclosure. FIG. 2 shows, in order from left to right, spherical aberration curves, astigmatic field curves and a distortion curve of the optical system of the electronic device according to the 1st embodiment. The optical system includes, in order from an outer side to an inner side, an aperture stop 100, a first lens element 110, a second lens element 120, a stop 101, a third lens element 130, a fourth lens element 140, a fifth lens element 150, a sixth lens element 160, a filter 170 and an inner-side conjugate surface 180. The optical system includes six lens elements (110, 120, 130, 140, 150 and 160) with no additional lens element disposed between each of the adjacent six lens elements, wherein there is an air gap between each of all adjacent lens elements.

The first lens element 110 with positive refractive power has an outer-side surface 111 being convex in a paraxial region thereof and an inner-side surface 112 being concave in a paraxial region thereof. The first lens element 110 is made of plastic material and has the outer-side surface 111 and the inner-side surface 112 being both aspheric. The outer-side surface 111 of the first lens element 110 has one inflection point. The inner-side surface 112 of the first lens element 110 has one inflection point.

The second lens element 120 with negative refractive power has an outer-side surface 121 being concave in a paraxial region thereof and an inner-side surface 122 being concave in a paraxial region thereof. The second lens element 120 is made of plastic material and has the outer-side surface 121 and the inner-side surface 122 being both aspheric. The outer-side surface 121 of the second lens element 120 has one inflection point.

The third lens element 130 with positive refractive power has an outer-side surface 131 being concave in a paraxial region thereof and an inner-side surface 132 being convex in a paraxial region thereof. The third lens element 130 is made of plastic material and has the outer-side surface 131 and the inner-side surface 132 being both aspheric. The outer-side surface 131 of the third lens element 130 has one inflection point. The inner-side surface 132 of the third lens element 130 has one inflection point.

The fourth lens element 140 with negative refractive power has an outer-side surface 141 being convex in a paraxial region thereof and an inner-side surface 142 being concave in a paraxial region thereof. The fourth lens element 140 is made of plastic material and has the outer-side surface 141 and the inner-side surface 142 being both aspheric. The outer-side surface 141 of the fourth lens element 140 has one inflection point. The inner-side surface 142 of the fourth lens element 140 has four inflection points.

The fifth lens element 150 with positive refractive power has an outer-side surface 151 being convex in a paraxial region thereof and an inner-side surface 152 being convex in a paraxial region thereof. The fifth lens element 150 is made of plastic material and has the outer-side surface 151 and the inner-side surface 152 being both aspheric. The outer-side surface 151 of the fifth lens element 150 has two inflection points.

The sixth lens element 160 with negative refractive power has an outer-side surface 161 being concave in a paraxial region thereof and an inner-side surface 162 being concave in a paraxial region thereof. The sixth lens element 160 is made of plastic material and has the outer-side surface 161 and the inner-side surface 162 being both aspheric. The outer-side surface 161 of the sixth lens element 160 has one inflection point. The inner-side surface 162 of the sixth lens element 160 has two inflection points. The inner-side surface 162 of the sixth lens element 160 has at least one critical point in an off-axis region thereof.

The filter 170 is made of glass material and located between the sixth lens element 160 and the inner-side conjugate surface 180, and will not affect the focal length of the optical system.

In this embodiment, each of the second through sixth lens elements (120, 130, 140, 150 and 160) adjacently arranged has an Abbe number smaller than 35.0.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical system according to the 1st embodiment, when a focal length of the optical system is f, an f-number of the optical system is Fno, half of a maximum field of view of the optical system is HFOV, these parameters have the following values: f=4.15 millimeters (mm), Fno=1.98, HFOV=39.9 degrees (deg.).

When a maximum value among refractive indices of the six lens elements of the optical system is Nmax, the following condition is satisfied: Nmax=1.67. In this embodiment, a refractive index of the second lens element 120 is equal to a refractive index of the fourth lens element 140, and the refractive indices of the second lens element 120 and the fourth lens element 140 are larger than refractive indices of the first lens element 110, the third lens element 130, the fifth lens element 150 and the sixth lens element 160, so Nmax is equal to the refractive indices of the second lens element 120 and the fourth lens element 140.

When an Abbe number of the first lens element 110 is V1, the following condition is satisfied: V1=56.1.

When an Abbe number of the second lens element 120 is V2, the following condition is satisfied: V2=19.4.

When an Abbe number of the third lens element 130 is V3, the following condition is satisfied: V3=30.2.

When an Abbe number of the fourth lens element 140 is V4, the following condition is satisfied: V4=19.4.

When an Abbe number of the fifth lens element 150 is V5, the following condition is satisfied: V5=30.2.

When an Abbe number of the sixth lens element 160 is V6, the following condition is satisfied: V6=30.2.

When a minimum value among Abbe numbers of the six lens elements of the optical system is Vmin, the following condition is satisfied: Vmin=19.4. In this embodiment, the Abbe number of the second lens element 120 is equal to the Abbe number of the fourth lens element 140, and the Abbe numbers of the second lens element 120 and the fourth lens element 140 are smaller than the Abbe numbers of the first lens element 110, the third lens element 130, the fifth lens element 150 and the sixth lens element 160, so Vmin is equal to the Abbe numbers of the second lens element 120 and the fourth lens element 140.

When the Abbe number of the first lens element 110 is V1, the Abbe number of the second lens element 120 is V2, the Abbe number of the third lens element 130 is V3, the Abbe number of the fourth lens element 140 is V4, the Abbe number of the fifth lens element 150 is V5, the Abbe number of the sixth lens element 160 is V6, and an Abbe number of the i-th lens element is Vi, the following condition is satisfied: ΣVi=185.7, wherein i=1, 2, 3, 4, 5, 6.

When a sum of axial distances between each of all adjacent lens elements of the six lens elements of the optical system is ΣAT, and a sum of central thicknesses of the six lens elements of the optical system is ΣCT, the following condition is satisfied: ΣAT/ΣCT=0.56. In this embodiment, an axial distance between two adjacent lens elements is an air gap in a paraxial region between the two adjacent lens elements.

When a central thickness of the second lens element 120 is CT2, a central thickness of the third lens element 130 is CT3, and an axial distance between the second lens element 120 and the third lens element 130 is T23, the following condition is satisfied: (CT2+CT3)/T23=2.19.

When a central thickness of the first lens element 110 is CT1, the central thickness of the second lens element 120 is CT2, the central thickness of the third lens element 130 is CT3, a central thickness of the fourth lens element 140 is CT4, a central thickness of the fifth lens element 150 is CT5, and a central thickness of the sixth lens element 160 is CT6, the following condition is satisfied: (CT2+CT4+CT5)/(CT1+CT3+CT6)=0.70.

When the central thickness of the third lens element 130 is CT3, the central thickness of the fourth lens element 140 is CT4, and an axial distance between the third lens element 130 and the fourth lens element 140 is T34, the following condition is satisfied: (CT3+CT4)/T34=5.13.

When an axial distance between the first lens element 110 and the second lens element 120 is T12, and the central thickness of the second lens element 120 is CT2, the following condition is satisfied: T12/CT2=0.67.

When the axial distance between the second lens element 120 and the third lens element 130 is T23, and the central thickness of the third lens element 130 is CT3, the following condition is satisfied: T23/CT3=0.68.

When an axial distance between the outer-side surface 111 of the first lens element 110 and the inner-side conjugate surface 180 is TL, the following condition is satisfied: TL=4.85 [mm].

When the axial distance between the outer-side surface 111 of the first lens element 110 and the inner-side conjugate surface 180 is TL, and the focal length of the optical system is f, the following condition is satisfied: TL/f=1.17.

When the axial distance between the outer-side surface 111 of the first lens element 110 and the inner-side conjugate surface 180 is TL, and a maximum effective radius of the inner-side conjugate surface 180 of the optical system is YI, the following condition is satisfied: TL/YI=1.37.

When a curvature radius of the inner-side surface 122 of the second lens element 120 is R4, and a curvature radius of the outer-side surface 131 of the third lens element 130 is R5, the following condition is satisfied: R4/R5=−0.03.

When the focal length of the optical system is f, and a focal length of the first lens element 110 is f1, the following condition is satisfied: f/f1=1.20.

When the focal length of the optical system is f, and a focal length of the second lens element 120 is f2, the following condition is satisfied: f/f2=−0.42.

When the focal length of the optical system is f, and a focal length of the third lens element 130 is f3, the following condition is satisfied: f/f3=0.12.

When the focal length of the optical system is f, and a focal length of the fourth lens element 140 is f4, the following condition is satisfied: f/f4=−0.29.

When the focal length of the optical system is f, and a focal length of the fifth lens element 150 is f5, the following condition is satisfied: f/f5=1.37.

When the focal length of the optical system is f, and a focal length of the sixth lens element 160 is f6, the following condition is satisfied: f/f6=−1.80.

When the focal length of the optical system is f, and a minimum value among absolute values of focal lengths of each of the six lens elements of the optical system is |f|min, the following condition is satisfied: f/|f|min=1.80. In this embodiment, f/|f|min=f/|f6|.

When the focal length of the second lens element 120 is f2, and a curvature radius of the outer-side surface 121 of the second lens element 120 is R3, the following condition is satisfied: $\log_{10}(|f2/R3|)=-1.30$.

When a vertical distance between the critical point on the inner-side surface 162 of the sixth lens element 160 and an optical axis is Yc62, and a maximum effective radius of the inner-side surface 162 of the sixth lens element 160 is Y62, the following condition is satisfied: Yc62/Y62=0.39.

The detailed optical data of the 1st embodiment are shown in Table 1 and the aspheric surface data are shown in Table 2 below.

TABLE 1

1st Embodiment
f = 4.15 mm, Fno = 1.98, HFOV = 39.9 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.383 | | | | |
| 2 | Lens 1 | 1.537 | (ASP) | 0.627 | Plastic | 1.545 | 56.1 | 3.47 |
| 3 | | 7.053 | (ASP) | 0.136 | | | | |
| 4 | Lens 2 | −197.441 | (ASP) | 0.203 | Plastic | 1.669 | 19.4 | −9.93 |
| 5 | | 6.878 | (ASP) | 0.167 | | | | |
| 6 | Stop | Plano | | 0.117 | | | | |
| 7 | Lens 3 | −200.000 | (ASP) | 0.420 | Plastic | 1.582 | 30.2 | 34.38 |
| 8 | | −18.217 | (ASP) | 0.136 | | | | |
| 9 | Lens 4 | 39.463 | (ASP) | 0.277 | Plastic | 1.669 | 19.4 | −14.13 |
| 10 | | 7.605 | (ASP) | 0.365 | | | | |
| 11 | Lens 5 | 7.016 | (ASP) | 0.551 | Plastic | 1.582 | 30.2 | 3.03 |
| 12 | | −2.289 | (ASP) | 0.464 | | | | |
| 13 | Lens 6 | −3.044 | (ASP) | 0.417 | Plastic | 1.582 | 30.2 | −2.31 |
| 14 | | 2.527 | (ASP) | 0.500 | | | | |
| 15 | Filter | Plano | | 0.210 | Glass | 1.517 | 64.2 | — |
| 16 | | Plano | | 0.256 | | | | |
| 17 | Inner-Side Conjugate Surface | Plano | | — | | | | |

Note:
Reference wavelength (d-line) is 587.6 nm (visible light).
An effective radius of the stop 101 (Surface 6) is 0.900 mm.

TABLE 2

Aspheric Coefficients

| | Surface # | | | | | |
|---|---|---|---|---|---|---|
| | 2 | 3 | 4 | 5 | 7 | 8 |
| k = | −5.0778E−01 | 1.2307E+01 | −9.0000E+01 | 2.5742E+00 | 9.0000E+01 | −8.0471E+01 |
| A4 = | 1.5094E−02 | −5.4005E−02 | −5.7412E−02 | −9.9115E−03 | −1.1120E−01 | −2.1235E−01 |
| A6 = | 6.0696E−03 | 3.9491E−03 | 9.4342E−02 | 4.0861E−02 | 1.2202E−01 | 3.4370E−01 |
| A8 = | 2.2002E−02 | 1.4941E−02 | 1.4191E−01 | 3.6339E−01 | −6.7455E−01 | −7.2954E−01 |
| A10 = | −7.7960E−02 | −4.7836E−02 | −4.1906E−01 | −8.1273E−01 | 1.3543E+00 | 7.3924E−01 |
| A12 = | 8.5826E−02 | 4.6386E−02 | 4.6250E−01 | 8.1421E−01 | −1.4951E+00 | −4.2417E−01 |
| A14 = | −4.0589E−02 | −2.4414E−02 | −1.8355E−01 | −2.6567E−01 | 6.8660E−01 | 1.1925E−01 |

| | Surface # | | | | | |
|---|---|---|---|---|---|---|
| | 9 | 10 | 11 | 12 | 13 | 14 |
| k = | −6.4345E+01 | −2.1131E+01 | −9.2875E+01 | −2.6746E−01 | −1.7702E−02 | −1.0000E+00 |
| A4 = | −4.0023E−01 | −3.1660E−01 | 3.6741E−02 | 1.6783E−01 | −1.2564E−02 | −1.5254E−01 |
| A6 = | 6.3185E−01 | 3.6548E−01 | −1.3574E−01 | −1.4882E−01 | −1.2123E−01 | 5.6740E−02 |
| A8 = | −7.2499E−01 | −3.0525E−01 | 1.2337E−01 | 5.3039E−02 | 1.1831E−01 | −1.6296E−02 |
| A10 = | 4.7233E−01 | 2.0072E−01 | −8.2930E−02 | 6.3080E−03 | −4.9417E−02 | 3.8408E−03 |
| A12 = | −1.5380E−01 | −8.3631E−02 | 4.1496E−02 | −1.1375E−02 | 1.1876E−02 | −7.5859E−04 |
| A14 = | 2.9147E−02 | 1.7527E−02 | −1.4330E−02 | 3.8031E−03 | −1.7667E−03 | 1.1130E−04 |
| A16 = | −7.9176E−03 | −1.2739E−03 | 2.8923E−03 | −5.6370E−04 | 1.6160E−04 | −1.0590E−05 |
| A18 = | — | — | −2.4485E−04 | 3.2336E−05 | −8.3628E−06 | 5.6971E−07 |
| A20 = | — | — | — | — | 1.8787E−07 | −1.3063E−08 |

In Table 1, the curvature radius, the thickness and the focal length are shown in millimeters (mm). Surface numbers 0-17 represent the surfaces sequentially arranged from the outer side to the inner side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
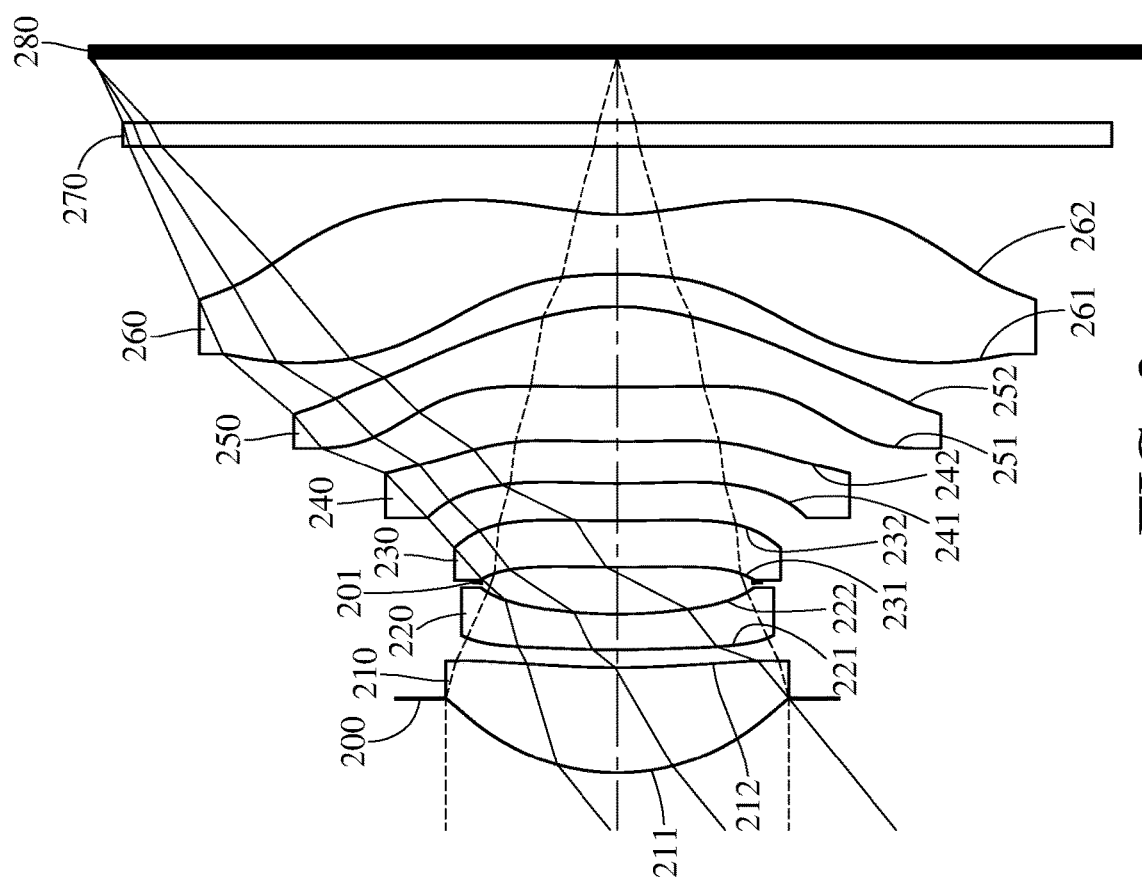
FIG. 3 is a schematic view of an optical system of an electronic device according to the 2nd embodiment of the present disclosure.
Figure 4:
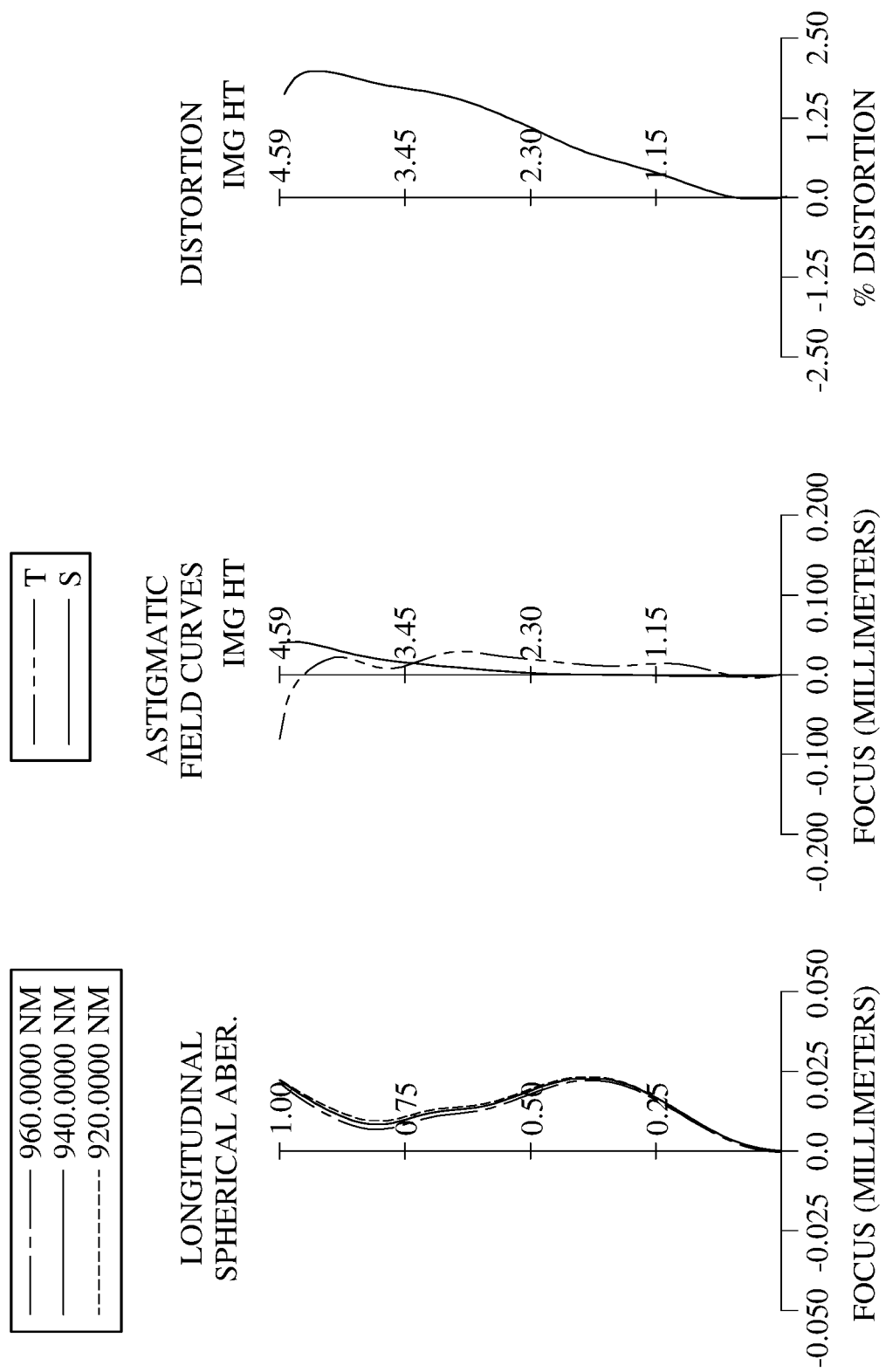
FIG. 4 shows spherical aberration curves, astigmatic field curves and a distortion curve of the optical system of the electronic device according to the 2nd embodiment.

FIG. 3 is a schematic view of an optical system of an electronic device according to the 2nd embodiment of the present disclosure. FIG. 4 shows, in order from left to right, spherical aberration curves, astigmatic field curves and a distortion curve of the optical system of the electronic device according to the 2nd embodiment. The optical system includes, in order from an outer side to an inner side, an aperture stop 200, a first lens element 210, a second lens element 220, a stop 201, a third lens element 230, a fourth lens element 240, a fifth lens element 250, a sixth lens element 260, a filter 270 and an inner-side conjugate surface 280. The optical system includes six lens elements (210, 220, 230, 240, 250 and 260) with no additional lens element disposed between each of the adjacent six lens elements, wherein there is an air gap between each of all adjacent lens elements.

The first lens element 210 with positive refractive power has an outer-side surface 211 being convex in a paraxial region thereof and an inner-side surface 212 being concave in a paraxial region thereof. The first lens element 210 is made of plastic material and has the outer-side surface 211 and the inner-side surface 212 being both aspheric. The outer-side surface 211 of the first lens element 210 has one inflection point. The inner-side surface 212 of the first lens element 210 has one inflection point.

The second lens element 220 with negative refractive power has an outer-side surface 221 being convex in a paraxial region thereof and an inner-side surface 222 being concave in a paraxial region thereof. The second lens element 220 is made of plastic material and has the outer-side surface 221 and the inner-side surface 222 being both aspheric.

The third lens element 230 with negative refractive power has an outer-side surface 231 being convex in a paraxial region thereof and an inner-side surface 232 being concave in a paraxial region thereof. The third lens element 230 is made of plastic material and has the outer-side surface 231 and the inner-side surface 232 being both aspheric. The outer-side surface 231 of the third lens element 230 has one inflection point. The inner-side surface 232 of the third lens element 230 has one inflection point.

The fourth lens element 240 with positive refractive power has an outer-side surface 241 being convex in a paraxial region thereof and an inner-side surface 242 being concave in a paraxial region thereof. The fourth lens element 240 is made of plastic material and has the outer-side surface 241 and the inner-side surface 242 being both aspheric. The outer-side surface 241 of the fourth lens element 240 has one inflection point. The inner-side surface 242 of the fourth lens element 240 has four inflection points.

The fifth lens element 250 with positive refractive power has an outer-side surface 251 being convex in a paraxial region thereof and an inner-side surface 252 being convex in a paraxial region thereof. The fifth lens element 250 is made of plastic material and has the outer-side surface 251 and the inner-side surface 252 being both aspheric. The outer-side surface 251 of the fifth lens element 250 has three inflection points. The inner-side surface 252 of the fifth lens element 250 has four inflection points.

The sixth lens element 260 with negative refractive power has an outer-side surface 261 being concave in a paraxial region thereof and an inner-side surface 262 being concave in a paraxial region thereof. The sixth lens element 260 is made of plastic material and has the outer-side surface 261 and the inner-side surface 262 being both aspheric. The outer-side surface 261 of the sixth lens element 260 has two inflection points. The inner-side surface 262 of the sixth lens element 260 has three inflection points. The inner-side surface 262 of the sixth lens element 260 has at least one critical point in an off-axis region thereof.

The filter 270 is made of glass material and located between the sixth lens element 260 and the inner-side conjugate surface 280, and will not affect the focal length of the optical system.

In this embodiment, each of the second through sixth lens elements (220, 230, 240, 250 and 260) adjacently arranged has an Abbe number smaller than 35.0.

The detailed optical data of the 2nd embodiment are shown in Table 3 and the aspheric surface data are shown in Table 4 below.

TABLE 3

2nd Embodiment
f = 5.54 mm, Fno = 1.85, HFOV = 39.2 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.655 | | | | |
| 2 | Lens 1 | 1.952 | (ASP) | 0.923 | Plastic | 1.536 | 56.1 | 4.69 |
| 3 | | 7.269 | (ASP) | 0.157 | | | | |
| 4 | Lens 2 | 9.064 | (ASP) | 0.310 | Plastic | 1.641 | 19.4 | −12.67 |
| 5 | | 4.227 | (ASP) | 0.280 | | | | |
| 6 | Stop | Plano | | 0.131 | | | | |
| 7 | Lens 3 | 14.216 | (ASP) | 0.405 | Plastic | 1.564 | 30.2 | −91.90 |
| 8 | | 11.043 | (ASP) | 0.328 | | | | |

TABLE 3-continued

2nd Embodiment
f = 5.54 mm, Fno = 1.85, HFOV = 39.2 deg.

| Surface # | | Curvature Radius | | Thickness | Material | Index | Abbe # | Focal Length |
|---|---|---|---|---|---|---|---|---|
| 9 | Lens 4 | 7.381 | (ASP) | 0.371 | Plastic | 1.641 | 19.4 | 80.18 |
| 10 | | 8.450 | (ASP) | 0.477 | | | | |
| 11 | Lens 5 | 24.401 | (ASP) | 0.700 | Plastic | 1.567 | 28.2 | 3.45 |
| 12 | | −2.107 | (ASP) | 0.285 | | | | |
| 13 | Lens 6 | −4.945 | (ASP) | 0.521 | Plastic | 1.564 | 30.2 | −2.60 |
| 14 | | 2.165 | (ASP) | 0.600 | | | | |
| 15 | Filter | Plano | | 0.210 | Glass | 1.508 | 64.2 | — |
| 16 | | Plano | | 0.560 | | | | |
| 17 | Inner-Side Conjugate Surface | Plano | | — | | | | |

Note:
Reference wavelength is 940.0 nm (infrared light).
An effective radius of the stop 201 (Surface 6) is 1.190 mm.
An effective radius of the inner-side surface 262 (Surface 14) is 3.655 mm.

TABLE 4

Aspheric Coefficients

| | Surface # | | | | | |
|---|---|---|---|---|---|---|
| | 2 | 3 | 4 | 5 | 7 | 8 |
| k = | −1.4694E−01 | 1.4726E+01 | 3.4234E+01 | 9.7054E+00 | −9.9000E+01 | 4.2068E+01 |
| A4 = | 1.0690E−03 | −4.1586E−02 | −6.8438E−02 | −5.1603E−02 | −7.1005E−02 | −8.8899E−02 |
| A6 = | 4.3558E−05 | 2.1823E−02 | 6.7716E−02 | 5.7618E−02 | 2.9962E−02 | 3.5176E−02 |
| A8 = | 3.1689E−03 | −1.1234E−02 | −3.4531E−02 | −2.4785E−02 | −4.0141E−02 | −2.3224E−02 |
| A10 = | −4.3904E−03 | 3.0877E−03 | 1.3328E−02 | 4.8037E−03 | 2.4132E−02 | −4.8859E−03 |
| A12 = | 2.3680E−03 | −5.7850E−04 | −3.6437E−03 | 2.2115E−04 | −9.6620E−03 | 1.3039E−02 |
| A14 = | −5.4343E−04 | — | 6.9508E−04 | — | 8.4014E−04 | −7.4504E−03 |
| A16 = | — | — | — | — | — | 1.4739E−03 |

| | Surface # | | | | | |
|---|---|---|---|---|---|---|
| | 9 | 10 | 11 | 12 | 13 | 14 |
| k = | 6.7381E+00 | 3.1470E−01 | 4.6468E+01 | −5.6513E+00 | −3.1039E+00 | −1.3053E+01 |
| A4 = | −1.1302E−01 | −1.0113E−01 | −1.9551E−03 | 1.8822E−02 | −1.0295E−01 | −6.8742E−02 |
| A6 = | 5.7840E−02 | 3.4159E−02 | −1.9592E−03 | −2.3219E−02 | 3.7757E−02 | 2.8169E−02 |
| A8 = | −4.5972E−02 | −1.9996E−02 | 2.0016E−03 | 9.9597E−03 | −4.2427E−03 | −7.9684E−03 |
| A10 = | 3.1491E−02 | 1.1927E−02 | 1.0489E−03 | −2.2361E−03 | −3.4199E−04 | 1.4996E−03 |
| A12 = | −1.3851E−02 | −3.4881E−03 | −3.9281E−04 | 3.2393E−04 | 1.5815E−04 | −1.8937E−04 |
| A14 = | 3.1521E−03 | 4.6072E−04 | 1.0450E−04 | −3.4194E−05 | −2.0637E−05 | 1.5615E−05 |
| A16 = | −2.8874E−04 | −2.1983E−05 | −2.0400E−05 | 2.2632E−06 | 1.4036E−06 | −7.9130E−07 |
| A18 = | — | — | 2.1342E−06 | −3.9861E−08 | −5.0465E−08 | 2.2081E−08 |
| A20 = | — | — | −8.7482E−08 | −2.4870E−09 | 7.5996E−10 | −2.5781E−10 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.54 | T12/CT2 | 0.51 |
| Fno | 1.85 | T23/CT3 | 1.01 |
| HFOV [deg.] | 39.2 | TL [mm] | 6.26 |

-continued

| 2nd Embodiment | | | |
|---|---|---|---|
| Nmax | 1.64 | TL/f | 1.13 |
| V1 | 56.1 | TL/YI | 1.36 |
| V2 | 19.4 | R4/R5 | 0.30 |
| V3 | 30.2 | f/f1 | 1.18 |
| V4 | 19.4 | f/f2 | −0.44 |
| V5 | 28.2 | f/f3 | −0.06 |
| V6 | 30.2 | f/f4 | 0.07 |
| Vmin | 19.4 | f/f5 | 1.60 |
| ΣVi | 183.6 | f/f6 | −2.13 |
| ΣAT/ΣCT | 0.51 | f/|fmin| | 2.13 |
| (CT2 + CT3)/T23 | 1.74 | $\log_{10}(|f2/R3|)$ | 0.15 |
| (CT2 + CT4 + CT5)/(CT1 + CT3 + CT6) | 0.75 | Yc62/Y62 | 0.36 |
| (CT3 + CT4)/T34 | 2.37 | — | — |

3rd Embodiment

Figure 5:
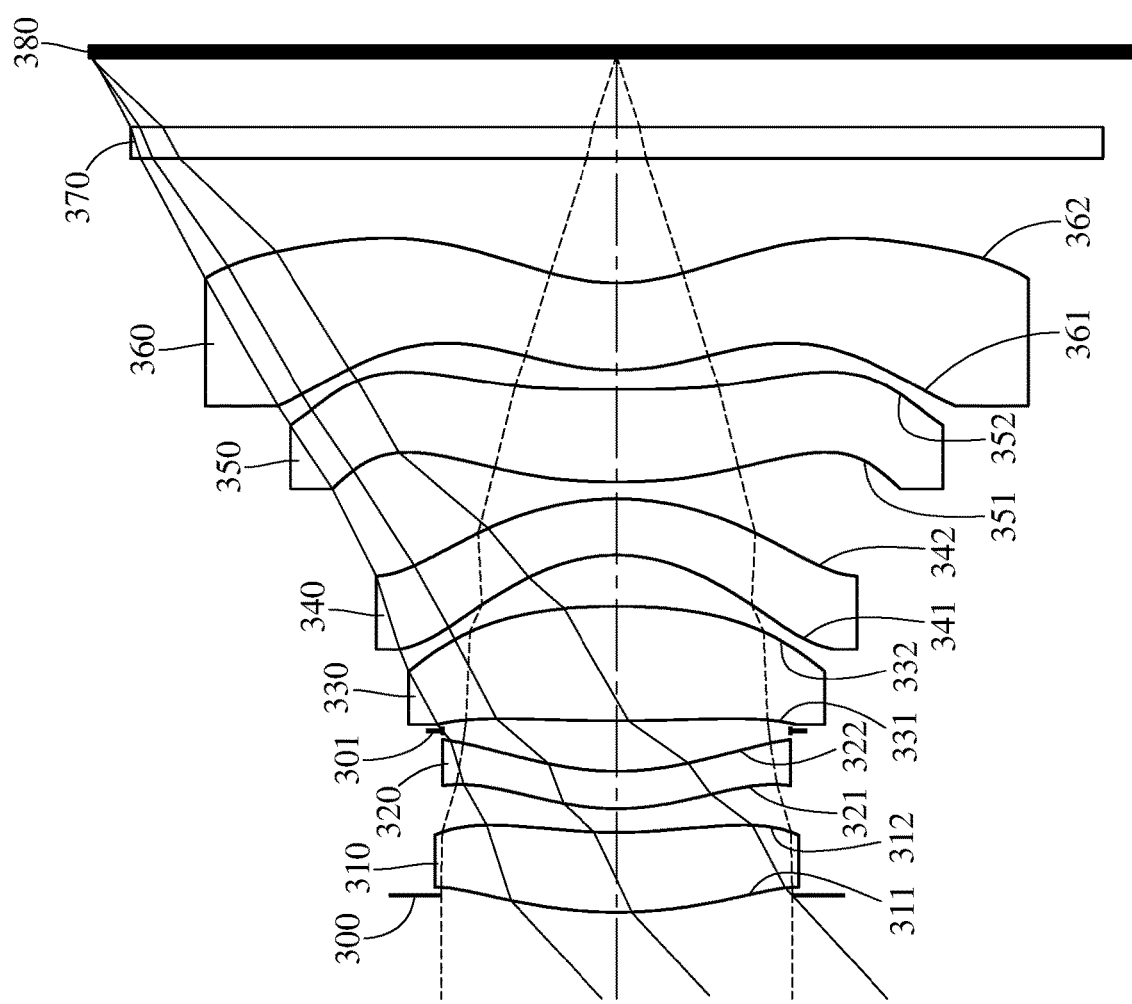
FIG. 5 is a schematic view of an optical system of an electronic device according to the 3rd embodiment of the present disclosure.
Figure 6:
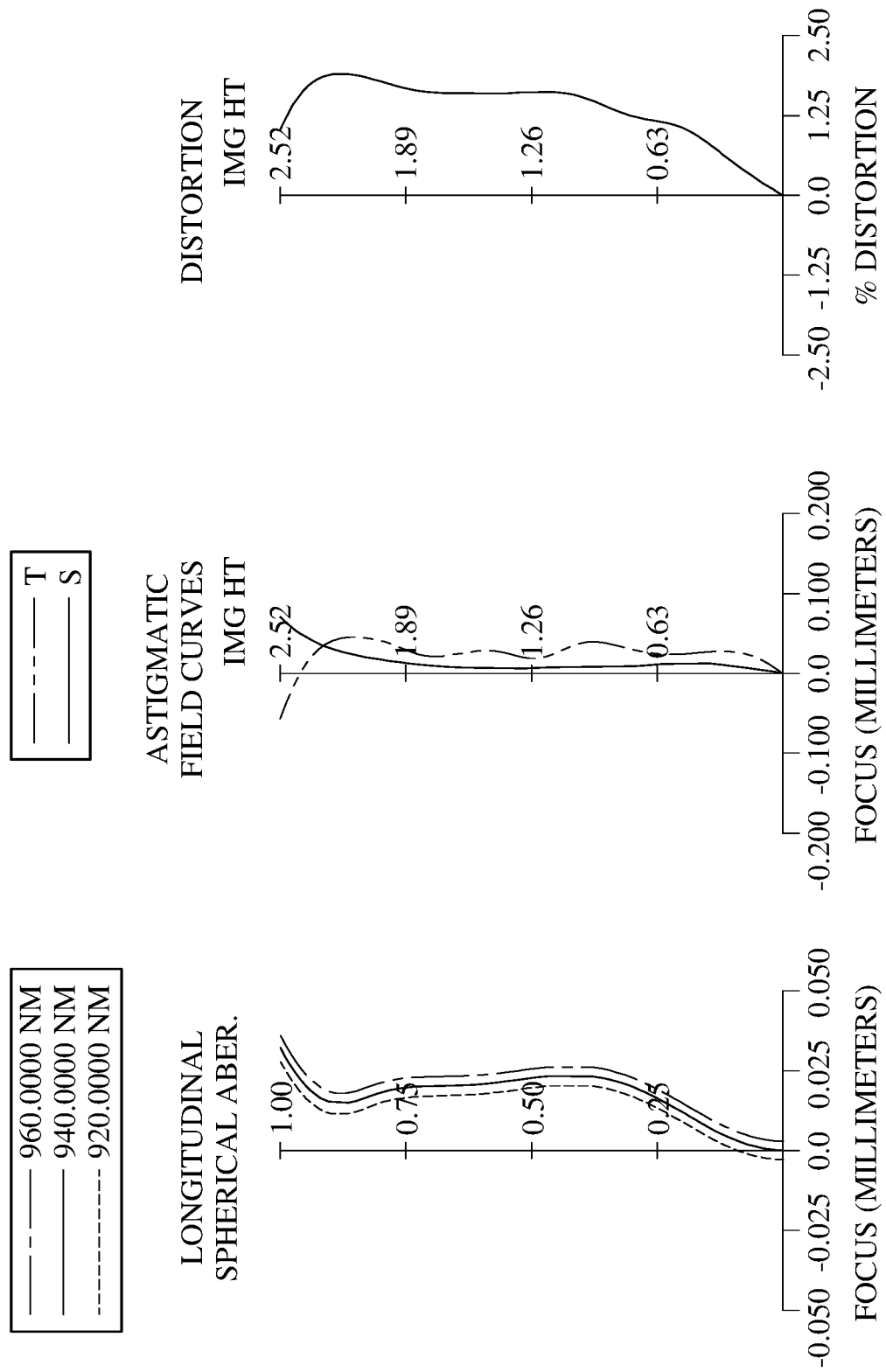
FIG. 6 shows spherical aberration curves, astigmatic field curves and a distortion curve of the optical system of the electronic device according to the 3rd embodiment.

FIG. 5 is a schematic view of an optical system of an electronic device according to the 3rd embodiment of the present disclosure. FIG. 6 shows, in order from left to right, spherical aberration curves, astigmatic field curves and a distortion curve of the optical system of the electronic device according to the 3rd embodiment. The optical system includes, in order from an outer side to an inner side, an aperture stop 300, a first lens element 310, a second lens element 320, a stop 301, a third lens element 330, a fourth lens element 340, a fifth lens element 350, a sixth lens element 360, a filter 370 and an inner-side conjugate surface 380. The optical system includes six lens elements (310, 320, 330, 340, 350 and 360) with no additional lens element disposed between each of the adjacent six lens elements, wherein there is an air gap between each of all adjacent lens elements.

The first lens element 310 with positive refractive power has an outer-side surface 311 being convex in a paraxial region thereof and an inner-side surface 312 being concave in a paraxial region thereof. The first lens element 310 is made of plastic material and has the outer-side surface 311 and the inner-side surface 312 being both aspheric. The outer-side surface 311 of the first lens element 310 has one inflection point. The inner-side surface 312 of the first lens element 310 has one inflection point.

The second lens element 320 with positive refractive power has an outer-side surface 321 being convex in a paraxial region thereof and an inner-side surface 322 being concave in a paraxial region thereof. The second lens element 320 is made of plastic material and has the outer-side surface 321 and the inner-side surface 322 being both aspheric. The outer-side surface 321 of the second lens element 320 has one inflection point. The inner-side surface 322 of the second lens element 320 has one inflection point.

The third lens element 330 with positive refractive power has an outer-side surface 331 being convex in a paraxial region thereof and an inner-side surface 332 being convex in a paraxial region thereof. The third lens element 330 is made of plastic material and has the outer-side surface 331 and the inner-side surface 332 being both aspheric. The outer-side surface 331 of the third lens element 330 has one inflection point. The inner-side surface 332 of the third lens element 330 has one inflection point.

The fourth lens element 340 with negative refractive power has an outer-side surface 341 being concave in a paraxial region thereof and an inner-side surface 342 being convex in a paraxial region thereof. The fourth lens element 340 is made of plastic material and has the outer-side surface 341 and the inner-side surface 342 being both aspheric. The outer-side surface 341 of the fourth lens element 340 has one inflection point. The inner-side surface 342 of the fourth lens element 340 has one inflection point.

The fifth lens element 350 with positive refractive power has an outer-side surface 351 being convex in a paraxial region thereof and an inner-side surface 352 being concave in a paraxial region thereof. The fifth lens element 350 is made of plastic material and has the outer-side surface 351 and the inner-side surface 352 being both aspheric. The outer-side surface 351 of the fifth lens element 350 has one inflection point. The inner-side surface 352 of the fifth lens element 350 has two inflection points.

The sixth lens element 360 with negative refractive power has an outer-side surface 361 being convex in a paraxial region thereof and an inner-side surface 362 being concave in a paraxial region thereof. The sixth lens element 360 is made of plastic material and has the outer-side surface 361 and the inner-side surface 362 being both aspheric. The outer-side surface 361 of the sixth lens element 360 has two inflection points. The inner-side surface 362 of the sixth lens element 360 has one inflection point. The inner-side surface 362 of the sixth lens element 360 has at least one critical point in an off-axis region thereof.

The filter 370 is made of glass material and located between the sixth lens element 360 and the inner-side conjugate surface 380, and will not affect the focal length of the optical system.

In this embodiment, each of the first through sixth lens elements (310, 320, 330, 340, 350 and 360) adjacently arranged has an Abbe number smaller than 35.0.

The detailed optical data of the 3rd embodiment are shown in Table 5 and the aspheric surface data are shown in Table 6 below.

TABLE 5

3rd Embodiment
f = 2.69 mm, Fno = 1.60, HFOV = 42.6 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.081 | | | | |
| 2 | Lens 1 | 2.172 | (ASP) | 0.384 | Plastic | 1.649 | 18.4 | 18.31 |
| 3 | | 2.472 | (ASP) | 0.113 | | | | |
| 4 | Lens 2 | 1.194 | (ASP) | 0.180 | Plastic | 1.649 | 18.4 | 9.08 |
| 5 | | 1.409 | (ASP) | 0.194 | | | | |
| 6 | Stop | Plano | | 0.048 | | | | |
| 7 | Lens 3 | 7.530 | (ASP) | 0.553 | Plastic | 1.649 | 18.4 | 3.32 |
| 8 | | −2.934 | (ASP) | 0.246 | | | | |
| 9 | Lens 4 | −0.802 | (ASP) | 0.271 | Plastic | 1.649 | 18.4 | −4.42 |
| 10 | | −1.262 | (ASP) | 0.080 | | | | |
| 11 | Lens 5 | 3.710 | (ASP) | 0.445 | Plastic | 1.649 | 18.4 | 5.86 |
| 12 | | 137.878 | (ASP) | 0.094 | | | | |
| 13 | Lens 6 | 1.153 | (ASP) | 0.418 | Plastic | 1.649 | 18.4 | −41.90 |
| 14 | | 0.949 | (ASP) | 0.600 | | | | |

TABLE 5-continued

3rd Embodiment
f = 2.69 mm, Fno = 1.60, HFOV = 42.6 deg.

| Surface # | | Curvature Radius | Thickness | Material | Index | Abbe # | Focal Length |
|---|---|---|---|---|---|---|---|
| 15 | Filter | Plano | 0.150 | Glass | 1.508 | 64.2 | — |
| 16 | | Plano | 0.333 | | | | |
| 17 | Inner-Side Conjugate Surface | Plano | — | | | | |

Note:
Reference wavelength is 940.0 nm (infrared light).
An effective radius of the stop 301 (Surface 6) is 0.835 mm.

TABLE 6

Aspheric Coefficients

| | Surface # | | | | | |
|---|---|---|---|---|---|---|
| | 2 | 3 | 4 | 5 | 7 | 8 |
| k = | 2.4039E+00 | −1.1548E+01 | −2.8889E−01 | 2.2450E−01 | −3.2895E+01 | 0.0000E+00 |
| A4 = | −8.3541E−02 | −3.0504E−01 | −5.1343E−01 | −2.5309E−01 | −1.2858E−01 | −1.6269E−01 |
| A6 = | −5.5239E−02 | 5.1028E−01 | 5.6467E−01 | −6.0509E−02 | 2.6316E−01 | 1.3676E−01 |
| A8 = | 2.3252E−01 | −1.1423E+00 | −1.6915E+00 | 2.5145E−01 | −1.2185E+00 | −3.9494E−01 |
| A10 = | −9.1784E−01 | 1.1462E+00 | 3.1948E+00 | −6.4342E−01 | 3.0280E+00 | 2.5092E−01 |
| A12 = | 1.1973E+00 | −4.6474E−01 | −4.6044E+00 | 8.2869E−01 | −3.7520E+00 | 5.2342E−01 |
| A14 = | −6.2656E−01 | −1.9223E−02 | 4.5347E+00 | −4.0820E−01 | 1.7331E+00 | −8.2351E−01 |
| A16 = | — | — | −2.0506E+00 | — | — | 3.3021E−01 |

| | Surface # | | | | | |
|---|---|---|---|---|---|---|
| | 9 | 10 | 11 | 12 | 13 | 14 |
| k = | −6.1959E−01 | 0.0000E+00 | 1.9054E+00 | 9.0000E+01 | −1.8185E+00 | −1.0179E+00 |
| A4 = | 1.2623E−01 | 2.3463E−01 | 4.9065E−01 | 4.7799E−01 | −3.2306E−01 | −5.5627E−01 |
| A6 = | 8.3405E−01 | −6.4574E−01 | −1.6219E+00 | −1.0039E+00 | −1.1484E−01 | 4.1216E−01 |
| A8 = | −2.8695E+00 | 1.4718E+00 | 2.9810E+00 | 1.3150E+00 | 4.2135E−01 | −2.5787E−01 |
| A10 = | 5.0890E+00 | −1.8682E+00 | −3.7103E+00 | −1.2440E+00 | −4.3931E−01 | 1.2028E−01 |
| A12 = | −4.5417E+00 | 1.5227E+00 | 2.9662E+00 | 7.7568E−01 | 2.5903E−01 | −3.7112E−02 |
| A14 = | 2.0761E+00 | −6.9118E−01 | −1.4592E+00 | −2.9969E−01 | −8.8774E−02 | 7.0144E−03 |
| A16 = | −3.9688E−01 | 1.3378E−01 | 3.9902E−01 | 6.4765E−02 | 1.6404E−02 | −7.3616E−04 |
| A18 = | — | — | −4.6016E−02 | −5.9389E−03 | −1.2633E−03 | 3.2940E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.69 | T12/CT2 | 0.63 |
| Fno | 1.60 | T23/CT3 | 0.44 |
| HFOV [deg.] | 42.6 | TL [mm] | 4.11 |
| Nmax | 1.65 | TL/f | 1.52 |
| V1 | 18.4 | TL/YI | 1.63 |
| V2 | 18.4 | R4/R5 | 0.19 |
| V3 | 18.4 | f/f1 | 0.15 |
| V4 | 18.4 | f/f2 | 0.30 |
| V5 | 18.4 | f/f3 | 0.81 |
| V6 | 18.4 | f/f4 | −0.61 |
| Vmin | 18.4 | f/f5 | 0.46 |
| ΣVi | 110.4 | f/f6 | −0.06 |
| ΣAT/ΣCT | 0.34 | f/\|f\|min | 0.81 |
| (CT2 + CT3)/T23 | 3.03 | $\log_{10}(|f2/R3|)$ | 0.88 |
| (CT2 + CT4 + CT5)/(CT1 + CT3 + CT6) | 0.66 | Yc62/Y62 | 0.56 |
| (CT3 + CT4)/T34 | 3.35 | — | — |

4th Embodiment

Figure 7:
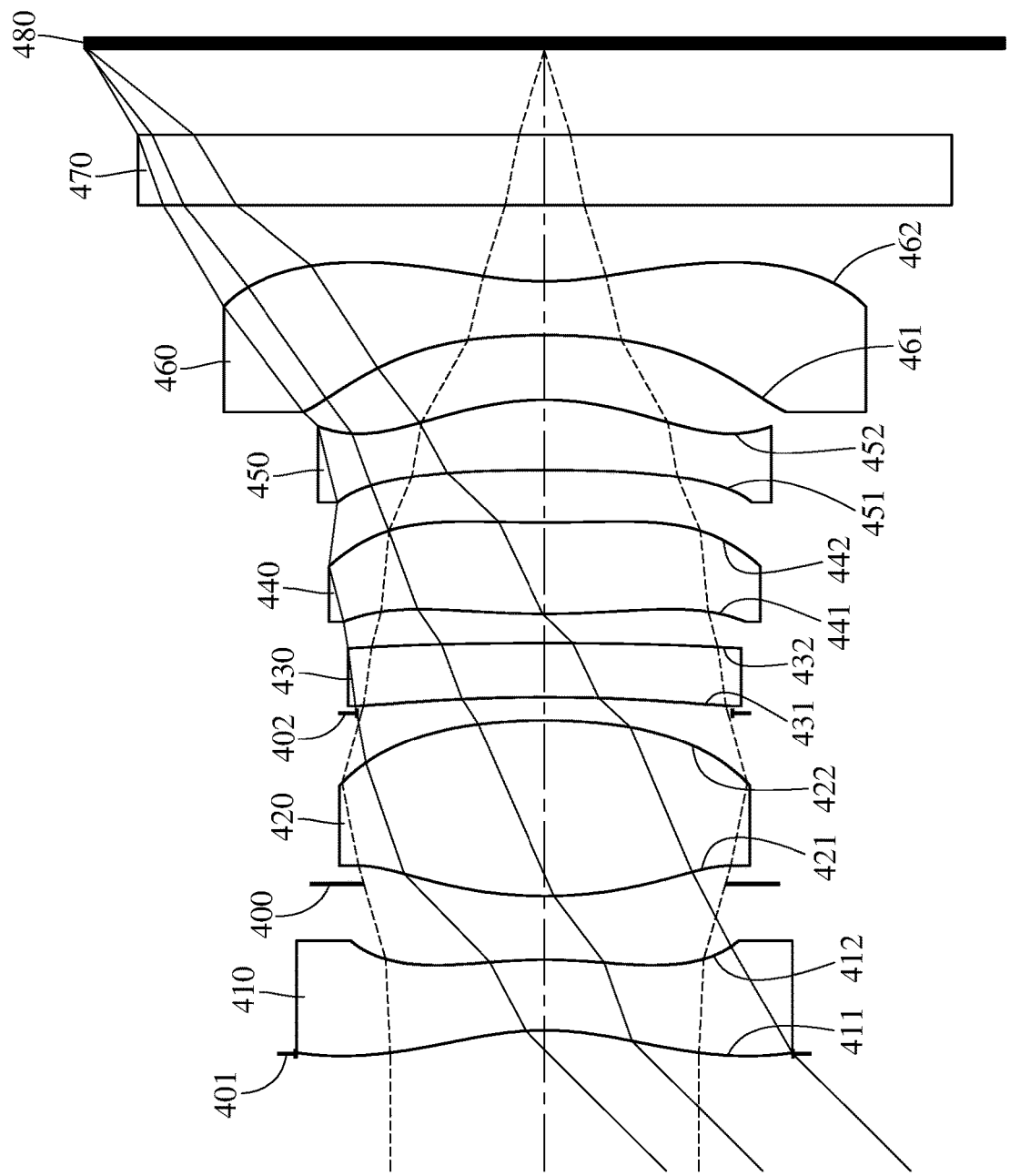
FIG. 7 is a schematic view of an optical system of an electronic device according to the 4th embodiment of the present disclosure.
Figure 8:
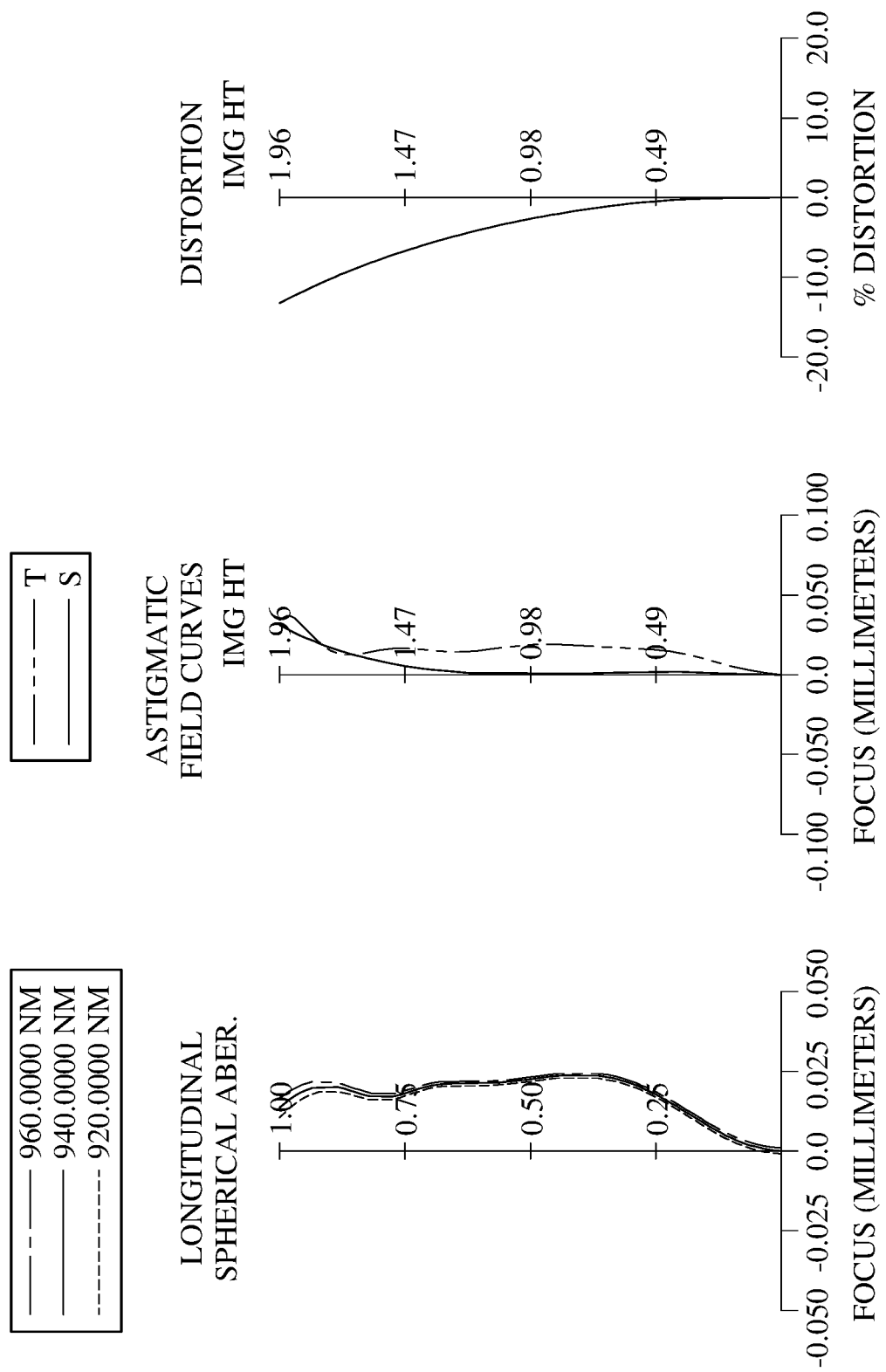
FIG. 8 shows spherical aberration curves, astigmatic field curves and a distortion curve of the optical system of the electronic device according to the 4th embodiment.

FIG. 7 is a schematic view of an optical system of an electronic device according to the 4th embodiment of the present disclosure. FIG. 8 shows, in order from left to right, spherical aberration curves, astigmatic field curves and a distortion curve of the optical system of the electronic device according to the 4th embodiment. The optical system includes, in order from an outer side to an inner side, a stop 401, a first lens element 410, an aperture stop 400, a second lens element 420, a stop 402, a third lens element 430, a fourth lens element 440, a fifth lens element 450, a sixth lens element 460, a filter 470 and an inner-side conjugate surface 480. The optical system includes six lens elements (410, 420, 430, 440, 450 and 460) with no additional lens element disposed between each of the adjacent six lens elements, wherein there is an air gap between each of all adjacent lens elements.

The first lens element 410 with negative refractive power has an outer-side surface 411 being concave in a paraxial region thereof and an inner-side surface 412 being convex in a paraxial region thereof. The first lens element 410 is made of plastic material and has the outer-side surface 411 and the inner-side surface 412 being both aspheric. The outer-side surface 411 of the first lens element 410 has one inflection point. The inner-side surface 412 of the first lens element 410 has one inflection point.

The second lens element 420 with positive refractive power has an outer-side surface 421 being convex in a paraxial region thereof and an inner-side surface 422 being convex in a paraxial region thereof. The second lens element 420 is made of plastic material and has the outer-side surface 421 and the inner-side surface 422 being both aspheric. The outer-side surface 421 of the second lens element 420 has one inflection point.

The third lens element 430 with negative refractive power has an outer-side surface 431 being concave in a paraxial region thereof and an inner-side surface 432 being convex in a paraxial region thereof. The third lens element 430 is made of plastic material and has the outer-side surface 431 and the inner-side surface 432 being both aspheric. The outer-side surface 431 of the third lens element 430 has two inflection points. The inner-side surface 432 of the third lens element 430 has two inflection points.

The fourth lens element 440 with positive refractive power has an outer-side surface 441 being convex in a paraxial region thereof and an inner-side surface 442 being concave in a paraxial region thereof. The fourth lens element 440 is made of plastic material and has the outer-side surface 441 and the inner-side surface 442 being both aspheric. The outer-side surface 441 of the fourth lens element 440 has one inflection point. The inner-side surface 442 of the fourth lens element 440 has one inflection point.

The fifth lens element 450 with positive refractive power has an outer-side surface 451 being concave in a paraxial region thereof and an inner-side surface 452 being convex in a paraxial region thereof. The fifth lens element 450 is made of plastic material and has the outer-side surface 451 and the inner-side surface 452 being both aspheric. The inner-side surface 452 of the fifth lens element 450 has one inflection point.

The sixth lens element 460 with negative refractive power has an outer-side surface 461 being concave in a paraxial region thereof and an inner-side surface 462 being concave in a paraxial region thereof. The sixth lens element 460 is made of plastic material and has the outer-side surface 461 and the inner-side surface 462 being both aspheric. The outer-side surface 461 of the sixth lens element 460 has one inflection point. The inner-side surface 462 of the sixth lens element 460 has one inflection point. The inner-side surface 462 of the sixth lens element 460 has at least one critical point in an off-axis region thereof.

The filter 470 is made of glass material and located between the sixth lens element 460 and the inner-side conjugate surface 480, and will not affect the focal length of the optical system.

In this embodiment, each of the first lens element 410, the third lens element 430, the fourth lens element 440, the fifth lens element 450 and the sixth lens element 460 has an Abbe number smaller than 35.0, wherein the third lens element 430, the fourth lens element 440, the fifth lens element 450 and the sixth lens element 460 are four lens elements which are adjacently arranged.

The detailed optical data of the 4th embodiment are shown in Table 7 and the aspheric surface data are shown in Table 8 below.

TABLE 7

4th Embodiment
f = 2.24 mm, Fno = 1.70, HFOV = 45.1 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Stop | Plano | | 0.100 | | | | |
| 2 | Lens 1 | −1.242 | (ASP) | 0.304 | Plastic | 1.641 | 19.4 | −5.90 |
| 3 | | −2.025 | (ASP) | 0.322 | | | | |
| 4 | Ape. Stop | Plano | | −0.052 | | | | |
| 5 | Lens 2 | 1.905 | (ASP) | 0.751 | Plastic | 1.535 | 56.0 | 2.18 |
| 6 | | −2.597 | (ASP) | 0.030 | | | | |
| 7 | Stop | Plano | | 0.069 | | | | |
| 8 | Lens 3 | −7.386 | (ASP) | 0.230 | Plastic | 1.641 | 19.4 | −18.80 |
| 9 | | −19.299 | (ASP) | 0.124 | | | | |
| 10 | Lens 4 | 3.573 | (ASP) | 0.390 | Plastic | 1.641 | 19.4 | 10.58 |
| 11 | | 7.225 | (ASP) | 0.225 | | | | |
| 12 | Lens 5 | −8.506 | (ASP) | 0.300 | Plastic | 1.641 | 19.4 | 2.05 |
| 13 | | −1.156 | (ASP) | 0.275 | | | | |
| 14 | Lens 6 | −3.029 | (ASP) | 0.230 | Plastic | 1.641 | 19.4 | −1.43 |
| 15 | | 1.360 | (ASP) | 0.326 | | | | |
| 16 | Filter | Plano | | 0.300 | Glass | 1.508 | 64.2 | — |
| 17 | | Plano | | 0.366 | | | | |
| 18 | Inner-Side Conjugate Surface | Plano | | — | | | | |

Note:
Reference wavelength is 940.0 nm (infrared light).
An effective radius of the stop 401 (Surface 1) is 1.060 mm.
An effective radius of the stop 402 (Surface 7) is 0.800 mm.

TABLE 8

Aspheric Coefficients

| Surface # | | | | | |
|---|---|---|---|---|---|
| 2 | 3 | 5 | 6 | 8 | 9 |
| k = 0.0000E+00 | 0.0000E+00 | 0.0000E+00 | 0.0000E+00 | 0.0000E+00 | 0.0000E+00 |
| A4 = 6.9657E−01 | 7.6575E−01 | 1.0894E−01 | −2.1213E−01 | −5.3546E−04 | −4.3717E−02 |
| A6 = −6.6311E−01 | −7.9021E−01 | −4.1029E−01 | 6.9351E−02 | 1.0137E−01 | 4.3364E−01 |
| A8 = 6.0409E−01 | 1.1750E+00 | 8.0629E−02 | −1.5969E−01 | −5.5757E−01 | −1.6497E+00 |
| A10 = −3.1859E−01 | −1.2754E+00 | 4.4357E−01 | 2.3814E−01 | 1.1155E+00 | 2.4997E+00 |
| A12 = 8.4231E−02 | 8.2937E−01 | −6.6268E−01 | −2.2000E−01 | −6.8658E−01 | −1.3236E+00 |

| Surface # | | | | | |
|---|---|---|---|---|---|
| 10 | 11 | 12 | 13 | 14 | 15 |
| k = 0.0000E+00 | 0.0000E+00 | 3.4678E+01 | 0.0000E+00 | 0.0000E+00 | −3.2705E−01 |
| A4 = −3.2014E−01 | −3.1953E−01 | −5.7952E−02 | 4.9938E−01 | −2.5853E−01 | −7.6238E−01 |
| A6 = 5.1927E−01 | −5.2277E−02 | −3.5674E−01 | −7.4864E−01 | −1.9369E−01 | 1.0094E+00 |
| A8 = −1.2930E+00 | 4.7187E−01 | 1.3212E+00 | 1.9092E+00 | 1.1784E+00 | −1.1523E+00 |
| A10 = 1.0156E+00 | −2.5558E+00 | −2.8371E+00 | −1.8817E+00 | −1.8529E+00 | 9.0593E−01 |
| A12 = 3.5113E−01 | 5.1018E+00 | 3.2572E+00 | 8.0294E−01 | 1.3329E+00 | −4.6369E−01 |
| A14 = −5.8375E−01 | −4.3433E+00 | −1.6368E+00 | −1.0513E−01 | −3.4873E−01 | 1.3675E−01 |
| A16 = — | 1.3578E+00 | — | — | — | −1.7725E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.24 | T12/CT2 | 0.36 |
| Fno | 1.70 | T23/CT3 | 0.43 |
| HFOV [deg.] | 45.1 | TL [mm] | 4.19 |
| Nmax | 1.64 | TL/f | 1.87 |
| V1 | 19.4 | TL/YI | 2.14 |
| V2 | 56.0 | R4/R5 | 0.35 |
| V3 | 19.4 | f/f1 | −0.38 |
| V4 | 19.4 | f/f2 | 1.03 |
| V5 | 19.4 | f/f3 | −0.12 |
| V6 | 19.4 | f/f4 | 0.21 |
| Vmin | 19.4 | f/f5 | 1.09 |
| ΣVi | 153.2 | f/f6 | −1.56 |
| ΣAT/ΣCT | 0.45 | f/|f|min | 1.56 |
| (CT2 + CT3)/T23 | 9.91 | $\log_{10}(|f2/R3|)$ | 0.06 |
| (CT2 + CT4 + CT5)/(CT1 + CT3 + CT6) | 1.89 | Yc62/Y62 | 0.58 |
| (CT3 + CT4)/T34 | 5.00 | — | — |

5th Embodiment

Figure 9:
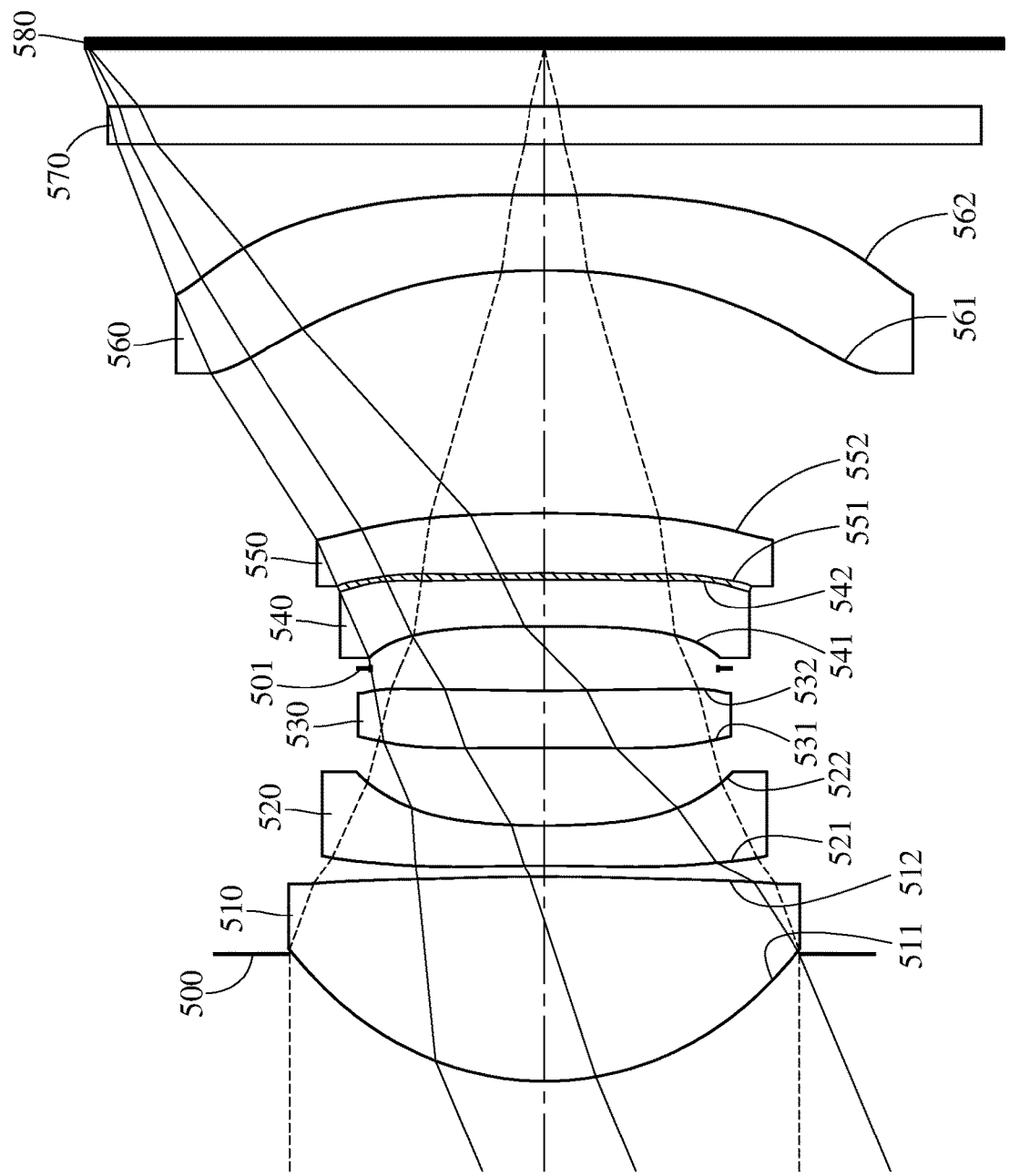
FIG. 9 is a schematic view of an optical system of an electronic device according to the 5th embodiment of the present disclosure.
Figure 10:
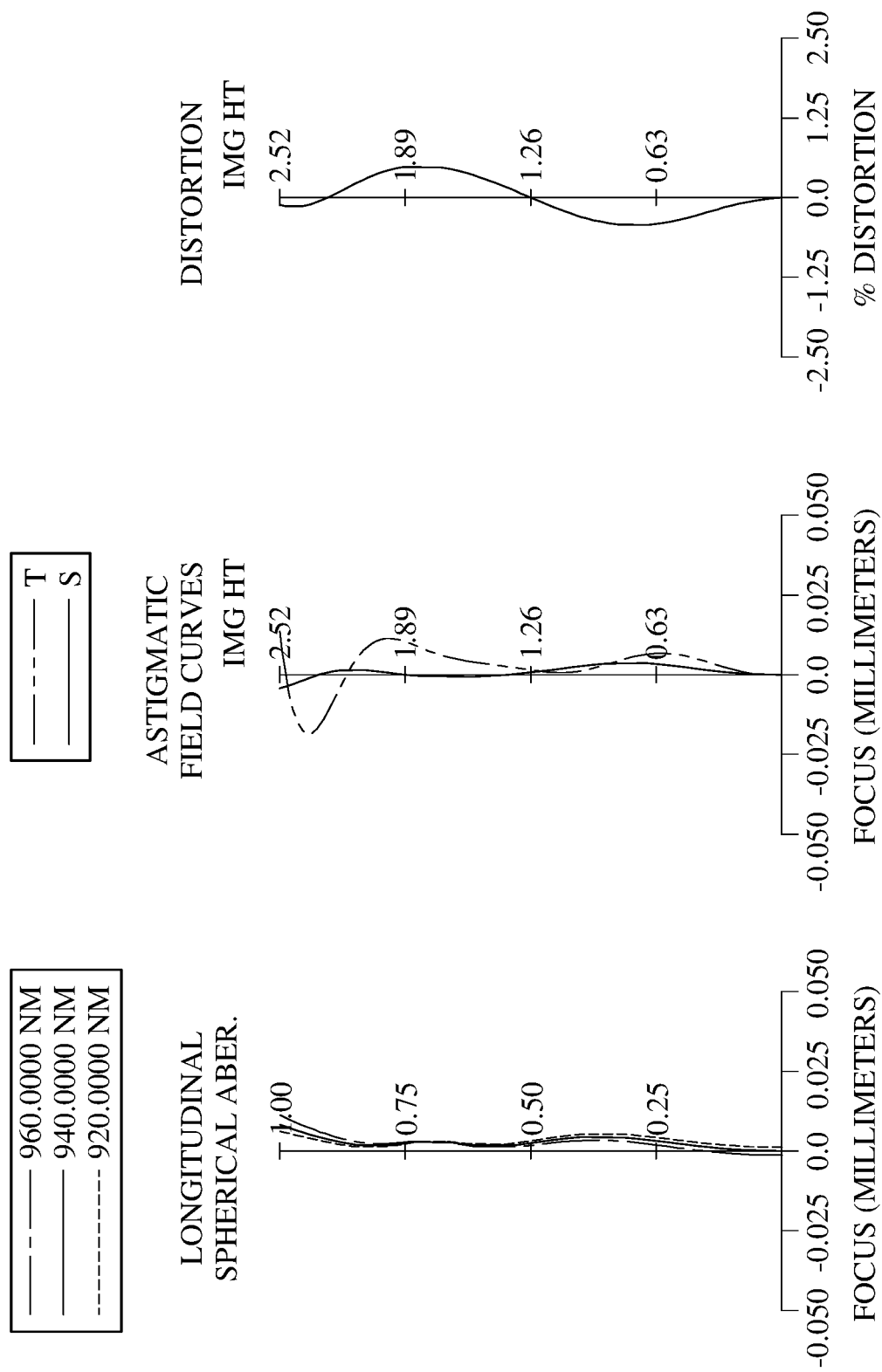
FIG. 10 shows spherical aberration curves, astigmatic field curves and a distortion curve of the optical system of the electronic device according to the 5th embodiment.

FIG. 9 is a schematic view of an optical system of an electronic device according to the 5th embodiment of the present disclosure. FIG. 10 shows, in order from left to right, spherical aberration curves, astigmatic field curves and a distortion curve of the optical system of the electronic device according to the 5th embodiment. The optical system includes, in order from an outer side to an inner side, an aperture stop 500, a first lens element 510, a second lens element 520, a third lens element 530, a stop 501, a fourth lens element 540, a fifth lens element 550, a sixth lens element 560, a filter 570 and an inner-side conjugate surface 580. The optical system includes six lens elements (510, 520, 530, 540, 550 and 560) with no additional lens element disposed between each of the adjacent six lens elements, wherein there are an air gap between the first lens element 510 and the second lens element 520, an air gap between the second lens element 520 and the third lens element 530, an air gap between the third lens element 530 and the fourth lens element 540, and an air gap between the fifth lens element 550 and the sixth lens element 560.

The first lens element 510 with positive refractive power has an outer-side surface 511 being convex in a paraxial region thereof and an inner-side surface 512 being convex in a paraxial region thereof. The first lens element 510 is made of plastic material and has the outer-side surface 511 and the inner-side surface 512 being both aspheric. The inner-side surface 512 of the first lens element 510 has three inflection points.

The second lens element 520 with negative refractive power has an outer-side surface 521 being concave in a paraxial region thereof and an inner-side surface 522 being concave in a paraxial region thereof. The second lens element 520 is made of plastic material and has the outer-side surface 521 and the inner-side surface 522 being both aspheric. The outer-side surface 521 of the second lens element 520 has one inflection point.

The third lens element 530 with negative refractive power has an outer-side surface 531 being concave in a paraxial region thereof and an inner-side surface 532 being concave in a paraxial region thereof. The third lens element 530 is made of plastic material and has the outer-side surface 531 and the inner-side surface 532 being both aspheric. The outer-side surface 531 of the third lens element 530 has two inflection points. The inner-side surface 532 of the third lens element 530 has three inflection points.

The fourth lens element 540 with negative refractive power has an outer-side surface 541 being concave in a paraxial region thereof and an inner-side surface 542 being concave in a paraxial region thereof. The fourth lens element 540 is made of plastic material and has the outer-side surface 541 and the inner-side surface 542 being both aspheric. The inner-side surface 542 of the fourth lens element 540 has four inflection points.

The fifth lens element 550 with negative refractive power has an outer-side surface 551 being concave in a paraxial region thereof and an inner-side surface 552 being convex in a paraxial region thereof. The fifth lens element 550 is made of plastic material and has the outer-side surface 551 and the inner-side surface 552 being both aspheric. The outer-side surface 551 of the fifth lens element 550 has four inflection points. The inner-side surface 552 of the fifth lens element 550 has one inflection point. The outer-side surface 551 of the fifth lens element 550 and the inner-side surface 542 of the fourth lens element 540 are cemented to each other.

The sixth lens element 560 with negative refractive power has an outer-side surface 561 being concave in a paraxial region thereof and an inner-side surface 562 being concave in a paraxial region thereof. The sixth lens element 560 is made of plastic material and has the outer-side surface 561 and the inner-side surface 562 being both aspheric. The outer-side surface 561 of the sixth lens element 560 has one inflection point. The inner-side surface 562 of the sixth lens element 560 has two inflection points. The inner-side surface 562 of the sixth lens element 560 has at least one critical point in an off-axis region thereof.

The filter 570 is made of glass material and located between the sixth lens element 560 and the inner-side conjugate surface 580, and will not affect the focal length of the optical system.

In this embodiment, each of the second through sixth lens elements (520, 530, 540, 550 and 560) adjacently arranged has an Abbe number smaller than 35.0.

The detailed optical data of the 5th embodiment are shown in Table 9 and the aspheric surface data are shown in Table 10 below.

TABLE 9

5th Embodiment
f = 6.00 mm, Fno = 2.13, HFOV = 22.8 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.704 | | | | |
| 2 | Lens 1 | 1.656 | (ASP) | 1.132 | Plastic | 1.536 | 56.1 | 2.84 |
| 3 | | −14.085 | (ASP) | 0.063 | | | | |
| 4 | Lens 2 | −12.231 | (ASP) | 0.221 | Plastic | 1.641 | 19.4 | −5.24 |
| 5 | | 4.666 | (ASP) | 0.430 | | | | |
| 6 | Lens 3 | −200.000 | (ASP) | 0.317 | Plastic | 1.564 | 30.2 | −15.84 |
| 7 | | 9.366 | (ASP) | 0.122 | | | | |
| 8 | Stop | Plano | | 0.233 | | | | |
| 9 | Lens 4 | −35.642 | (ASP) | 0.261 | Plastic | 1.641 | 19.4 | −47.16 |
| 10 | | 200.000 | (ASP) | 0.037 | Cement | 1.537 | 43.9 | |
| 11 | Lens 5 | −7.411 | (ASP) | 0.331 | Plastic | 1.594 | 26.0 | −47.32 |
| 12 | | −10.234 | (ASP) | 1.346 | | | | |
| 13 | Lens 6 | −3.981 | (ASP) | 0.417 | Plastic | 1.641 | 19.4 | −5.71 |
| 14 | | 47.355 | (ASP) | 0.280 | | | | |
| 15 | Filter | Plano | | 0.210 | Glass | 1.508 | 64.2 | — |
| 16 | | Plano | | 0.318 | | | | |
| 17 | Inner-Side Conjugate Surface | Plano | | — | | | | |

Note:
Reference wavelength is 940.0 nm (infrared light).
An effective radius of the stop 501 (Surface 8) is 0.960 mm.

TABLE 10

Aspheric Coefficients

| Surface # | | | | | |
|---|---|---|---|---|---|
| 2 | 3 | 4 | 5 | 6 | 7 |
| k = −1.5023E−01 | −6.6968E+01 | 8.0527E+01 | 4.7208E+00 | −4.0405E+01 | −5.8976E+01 |
| A4 = 1.4292E−03 | 1.3512E−04 | 5.9041E−02 | 7.9406E−02 | −6.4832E−02 | −1.6273E−01 |
| A6 = −2.0639E−04 | 6.9287E−02 | 1.2622E−01 | 1.4861E−01 | 2.9134E−01 | 3.2625E−01 |
| A8 = 7.2692E−04 | −1.1340E−01 | −2.0185E−01 | −1.2427E−01 | −2.0304E−01 | −2.9895E−01 |
| A10 = −2.2495E−03 | 7.6176E−02 | 1.0010E−01 | 6.8632E−02 | 1.6803E−02 | 1.5276E−01 |
| A12 = 2.0353E−03 | −2.4648E−02 | −1.1960E−02 | −8.3366E−02 | 3.7558E−02 | −1.1819E−01 |
| A14 = −6.7187E−04 | 3.2459E−03 | −1.2427E−03 | 5.4755E−02 | −1.8025E−02 | 4.2151E−02 |

| Surface # | | | | | |
|---|---|---|---|---|---|
| 9 | 10 | 11 | 12 | 13 | 14 |
| k = −4.5176E+01 | −9.9000E+01 | 3.3816E+01 | 1.2901E+01 | −6.8711E+01 | 9.9000E+01 |
| A4 = −1.9796E−01 | −1.4148E−01 | 1.3894E−01 | −4.1665E−02 | −2.6122E−01 | −1.7310E−01 |
| A6 = 1.0498E−01 | 9.1416E−02 | 4.8301E−01 | 3.4795E−02 | 3.8392E−01 | 2.0356E−01 |

TABLE 10-continued

| Aspheric Coefficients | | | | | | |
|---|---|---|---|---|---|---|
| A8 = | 1.7018E−02 | 1.0549E+00 | −1.7127E+00 | −6.7210E−02 | −4.1668E−01 | −1.7348E−01 |
| A10 = | −9.1670E−02 | −2.4300E+00 | 1.7440E+00 | 3.3697E−02 | 3.1140E−01 | 9.9464E−02 |
| A12 = | −1.1980E−01 | 2.0444E+00 | −6.7223E−01 | 2.1995E−02 | −1.5516E−01 | −3.8410E−02 |
| A14 = | 9.9551E−02 | −7.5339E−01 | 6.6647E−02 | −2.2948E−02 | 4.9706E−02 | 9.7855E−03 |
| A16 = | — | 1.0241E−01 | — | 5.4037E−03 | −9.7102E−03 | −1.5826E−03 |
| A18 = | — | — | — | — | 1.0480E−03 | 1.4828E−04 |
| A20 = | — | — | — | — | −4.7849E−05 | −6.1288E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.00 | T12/CT2 | 0.29 |
| Fno | 2.13 | T23/CT3 | 1.36 |
| HFOV [deg.] | 22.8 | TL [mm] | 5.72 |
| Nmax | 1.64 | TL/f | 0.95 |
| V1 | 56.1 | TL/Y1 | 2.27 |
| V2 | 19.4 | R4/R5 | −0.02 |
| V3 | 30.2 | f/f1 | 2.12 |
| V4 | 19.4 | f/f2 | −1.15 |
| V5 | 26.0 | f/f3 | −0.38 |
| V6 | 19.4 | f/f4 | −0.13 |
| Vmin | 19.4 | f/f5 | −0.13 |
| ΣVi | 170.6 | f/f6 | −1.05 |
| ΣAT/ΣCT | 0.83 | f/\|f\|min | 2.12 |
| (CT2 + CT3)/T23 | 1.25 | $\log_{10}(|f2/R3|)$ | −0.37 |
| (CT2 + CT4 + CT5)/(CT1 + CT3 + CT6) | 0.44 | Yc62/Y62 | 0.09 |
| (CT3 + CT4)/T34 | 1.63 | — | — |

6th Embodiment

Figure 11:
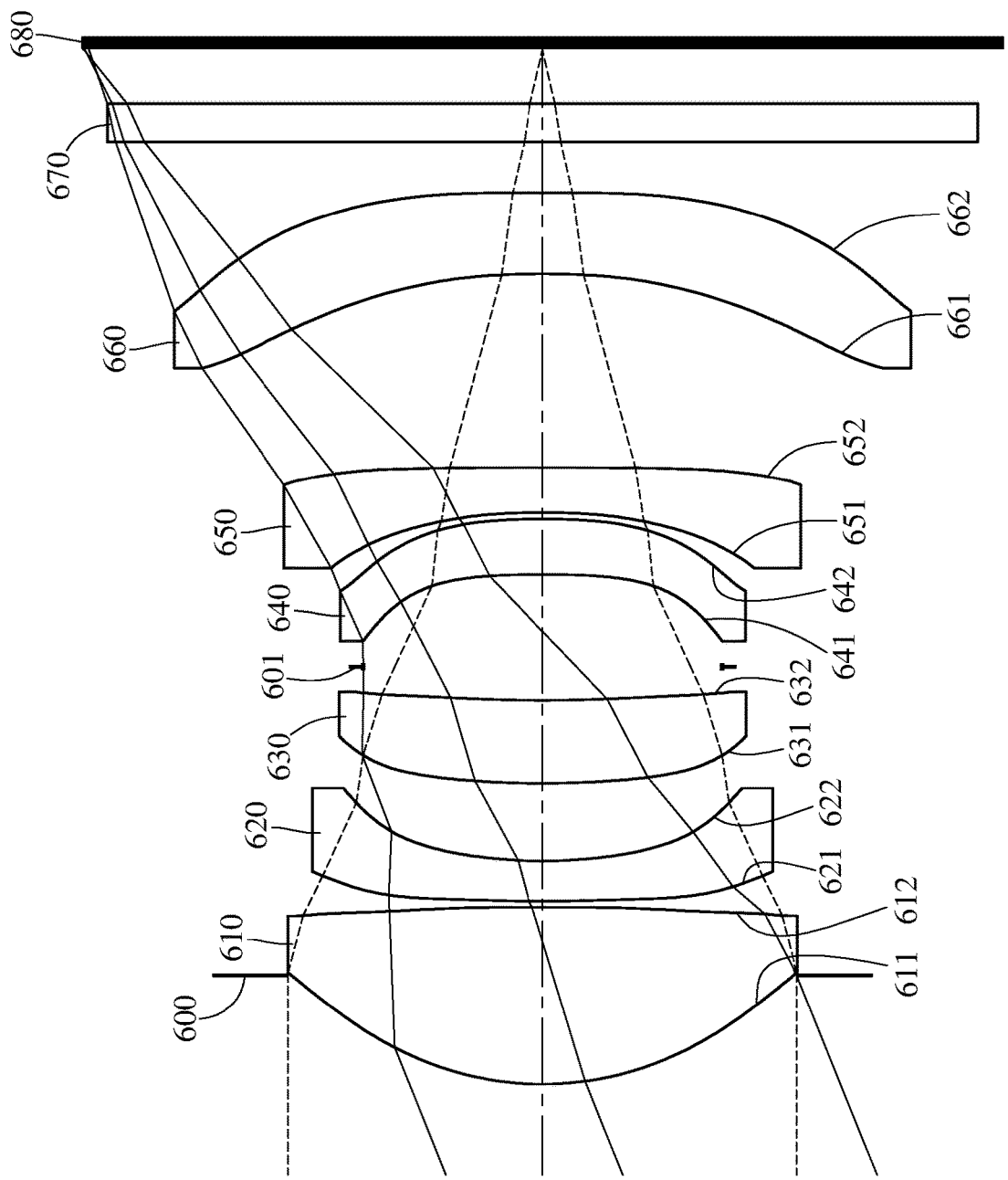
FIG. 11 is a schematic view of an optical system of an electronic device according to the 6th embodiment of the present disclosure.
Figure 12:
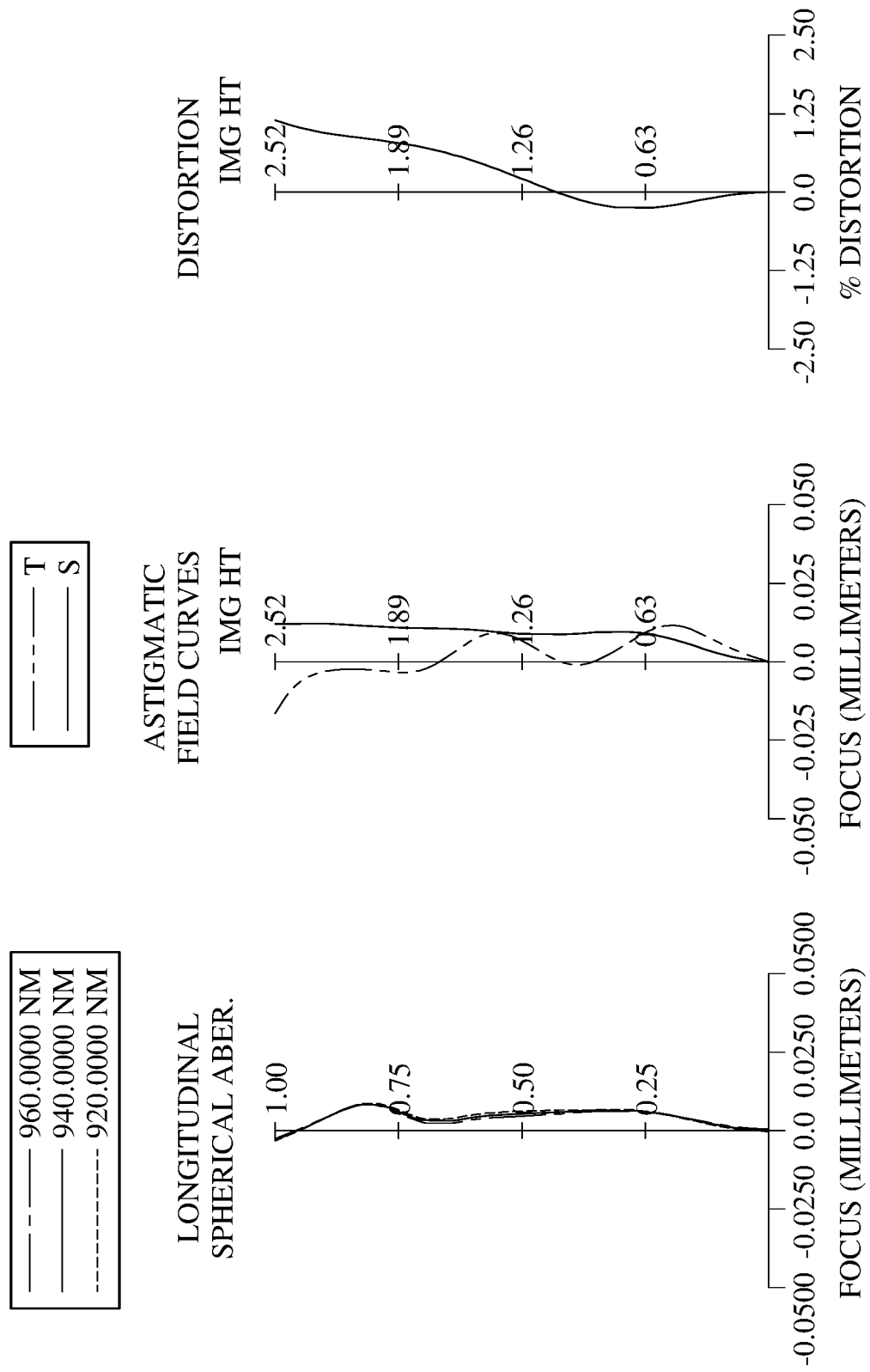
FIG. 12 shows spherical aberration curves, astigmatic field curves and a distortion curve of the optical system of the electronic device according to the 6th embodiment.

FIG. 11 is a schematic view of an optical system of an electronic device according to the 6th embodiment of the present disclosure. FIG. 12 shows, in order from left to right, spherical aberration curves, astigmatic field curves and a distortion curve of the optical system of the electronic device according to the 6th embodiment. The optical system includes, in order from an outer side to an inner side, an aperture stop 600, a first lens element 610, a second lens element 620, a third lens element 630, a stop 601, a fourth lens element 640, a fifth lens element 650, a sixth lens element 660, a filter 670 and an inner-side conjugate surface 680. The optical system includes six lens elements (610, 620, 630, 640, 650 and 660) with no additional lens element disposed between each of the adjacent six lens elements, wherein there is an air gap between each of all adjacent lens elements.

The first lens element 610 with positive refractive power has an outer-side surface 611 being convex in a paraxial region thereof and an inner-side surface 612 being concave in a paraxial region thereof. The first lens element 610 is made of plastic material and has the outer-side surface 611 and the inner-side surface 612 being both aspheric. The outer-side surface 611 of the first lens element 610 has one inflection point. The inner-side surface 612 of the first lens element 610 has three inflection points.

The second lens element 620 with negative refractive power has an outer-side surface 621 being convex in a paraxial region thereof and an inner-side surface 622 being concave in a paraxial region thereof. The second lens element 620 is made of plastic material and has the outer-side surface 621 and the inner-side surface 622 being both aspheric. The outer-side surface 621 of the second lens element 620 has two inflection points.

The third lens element 630 with positive refractive power has an outer-side surface 631 being convex in a paraxial region thereof and an inner-side surface 632 being concave in a paraxial region thereof. The third lens element 630 is made of plastic material and has the outer-side surface 631 and the inner-side surface 632 being both aspheric.

The fourth lens element 640 with positive refractive power has an outer-side surface 641 being concave in a paraxial region thereof and an inner-side surface 642 being convex in a paraxial region thereof. The fourth lens element 640 is made of plastic material and has the outer-side surface 641 and the inner-side surface 642 being both aspheric. The inner-side surface 642 of the fourth lens element 640 has one inflection point.

The fifth lens element 650 with negative refractive power has an outer-side surface 651 being concave in a paraxial region thereof and an inner-side surface 652 being concave in a paraxial region thereof. The fifth lens element 650 is made of plastic material and has the outer-side surface 651 and the inner-side surface 652 being both aspheric. The inner-side surface 652 of the fifth lens element 650 has one inflection point.

The sixth lens element 660 with negative refractive power has an outer-side surface 661 being concave in a paraxial region thereof and an inner-side surface 662 being concave in a paraxial region thereof. The sixth lens element 660 is made of plastic material and has the outer-side surface 661 and the inner-side surface 662 being both aspheric. The outer-side surface 661 of the sixth lens element 660 has one inflection point. The inner-side surface 662 of the sixth lens element 660 has two inflection points. The inner-side surface 662 of the sixth lens element 660 has at least one critical point in an off-axis region thereof.

The filter 670 is made of glass material and located between the sixth lens element 660 and the inner-side conjugate surface 680, and will not affect the focal length of the optical system.

In this embodiment, each of the second through sixth lens elements (620, 630, 640, 650 and 660) adjacently arranged has an Abbe number smaller than 35.0.

The detailed optical data of the 6th embodiment are shown in Table 11 and the aspheric surface data are shown in Table 12 below.

TABLE 11

6th Embodiment
f = 6.20 mm, Fno = 2.22, HFOV = 21.9 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.600 | | | | |
| 2 | Lens 1 | 1.710 | (ASP) | 0.975 | Plastic | 1.536 | 56.1 | 3.23 |
| 3 | | 98.966 | (ASP) | 0.033 | | | | |
| 4 | Lens 2 | 6.865 | (ASP) | 0.220 | Plastic | 1.657 | 18.7 | −6.46 |
| 5 | | 2.592 | (ASP) | 0.427 | | | | |
| 6 | Lens 3 | 5.273 | (ASP) | 0.459 | Plastic | 1.567 | 28.2 | 31.02 |
| 7 | | 7.295 | (ASP) | 0.184 | | | | |
| 8 | Stop | Plano | | 0.507 | | | | |
| 9 | Lens 4 | −6.165 | (ASP) | 0.305 | Plastic | 1.657 | 18.7 | 29.76 |
| 10 | | −4.780 | (ASP) | 0.035 | | | | |
| 11 | Lens 5 | −5.060 | (ASP) | 0.250 | Plastic | 1.617 | 23.5 | −7.80 |
| 12 | | 100.000 | (ASP) | 1.063 | | | | |
| 13 | Lens 6 | −5.089 | (ASP) | 0.448 | Plastic | 1.657 | 18.7 | −7.35 |
| 14 | | 100.000 | (ASP) | 0.280 | | | | |
| 15 | Filter | Plano | | 0.210 | Glass | 1.508 | 64.2 | — |
| 16 | | Plano | | 0.304 | | | | |
| 17 | Inner-Side Conjugate Surface | Plano | | — | | | | |

Note:
Reference wavelength is 940.0 nm (infrared light).
An effective radius of the stop 601 (Surface 8) is 0.985 mm.

TABLE 12

Aspheric Coefficients

| | Surface # | | | | | |
|---|---|---|---|---|---|---|
| | 2 | 3 | 4 | 5 | 6 | 7 |
| k = | −2.8406E−01 | 9.0000E+01 | −8.9721E+01 | −7.2971E+00 | 1.6442E+01 | 2.4552E+01 |
| A4 = | 2.7337E−03 | −1.5884E−01 | −1.5438E−01 | 8.6954E−04 | −2.9431E−02 | −6.1922E−02 |
| A6 = | 1.2331E−03 | 2.5022E−01 | 2.7101E−01 | 1.4122E−01 | 5.0717E−02 | 6.0851E−03 |
| A8 = | −7.5308E−03 | −1.7147E−01 | −7.5300E−02 | −2.8115E−03 | 4.6773E−02 | 6.9996E−02 |
| A10 = | 4.5275E−03 | 5.1716E−02 | −7.1612E−02 | 4.1264E−02 | −1.6348E−02 | −8.9916E−02 |
| A12 = | −1.9991E−03 | −3.9104E−03 | 5.3627E−02 | −5.5630E−02 | −1.5705E−02 | 4.5211E−02 |
| A14 = | 2.2936E−04 | −7.4734E−04 | −1.0637E−02 | 1.0543E−02 | 9.2633E−03 | −6.3122E−03 |

| | Surface # | | | | | |
|---|---|---|---|---|---|---|
| | 9 | 10 | 11 | 12 | 13 | 14 |
| k = | 2.8143E+01 | 1.3043E+01 | −1.0283E+00 | −9.0000E+01 | −9.0000E+01 | 7.6602E+00 |
| A4 = | −1.9934E−01 | −3.0767E−01 | −3.3013E−01 | −1.0964E−01 | −2.1912E−01 | −1.7030E−01 |
| A6 = | 1.0247E−01 | 1.2690E−01 | 5.2391E−01 | 3.2569E−01 | 2.9800E−01 | 1.8889E−01 |
| A8 = | −1.3672E+00 | 5.9840E−01 | 1.8143E−01 | −5.1588E−01 | −3.1063E−01 | −1.6383E−01 |
| A10 = | 4.3185E+00 | −1.5275E+00 | −1.5456E+00 | 4.3337E−01 | 2.2886E−01 | 9.6499E−02 |
| A12 = | −6.8613E+00 | 1.3437E+00 | 1.2980E+00 | −2.0774E−01 | −1.1483E−01 | −3.8568E−02 |
| A14 = | 5.2142E+00 | −4.6812E−01 | 4.8348E−01 | 5.6546E−02 | 3.7829E−02 | 1.0281E−02 |
| A16 = | −1.4837E+00 | 5.3324E−02 | −1.2762E+00 | −7.9379E−03 | −7.7445E−03 | −1.7587E−03 |
| A18 = | — | — | 6.9548E−01 | 3.9834E−04 | 8.8991E−04 | 1.7578E−04 |
| A20 = | — | — | −1.3024E−01 | — | −4.3835E−05 | −7.8114E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.20 | T12/CT2 | 0.15 |
| Fno | 2.22 | T23/CT3 | 0.93 |
| HFOV [deg.] | 21.9 | TL [mm] | 5.70 |
| Nmax | 1.66 | TL/f | 0.92 |
| V1 | 56.1 | TL/YI | 2.26 |
| V2 | 18.7 | R4/R5 | 0.49 |
| V3 | 28.2 | f/f1 | 1.92 |

-continued

| 6th Embodiment | | | |
|---|---|---|---|
| V4 | 18.7 | f/f2 | −0.96 |
| V5 | 23.5 | f/f3 | 0.20 |
| V6 | 18.7 | f/f4 | 0.21 |
| Vmin | 18.7 | f/f5 | −0.80 |
| ΣVi | 163.9 | f/f6 | −0.84 |
| ΣAT/ΣCT | 0.85 | f/\|f\|min | 1.92 |
| (CT2 + CT3)/T23 | 1.59 | $\log_{10}(\|f2/R3\|)$ | −0.03 |
| (CT2 + CT4 + CT5)/(CT1 + CT3 + CT6) | 0.41 | Yc62/Y62 | 0.06 |
| (CT3 + CT4)/T34 | 1.11 | — | — |

7th Embodiment

Figure 13:
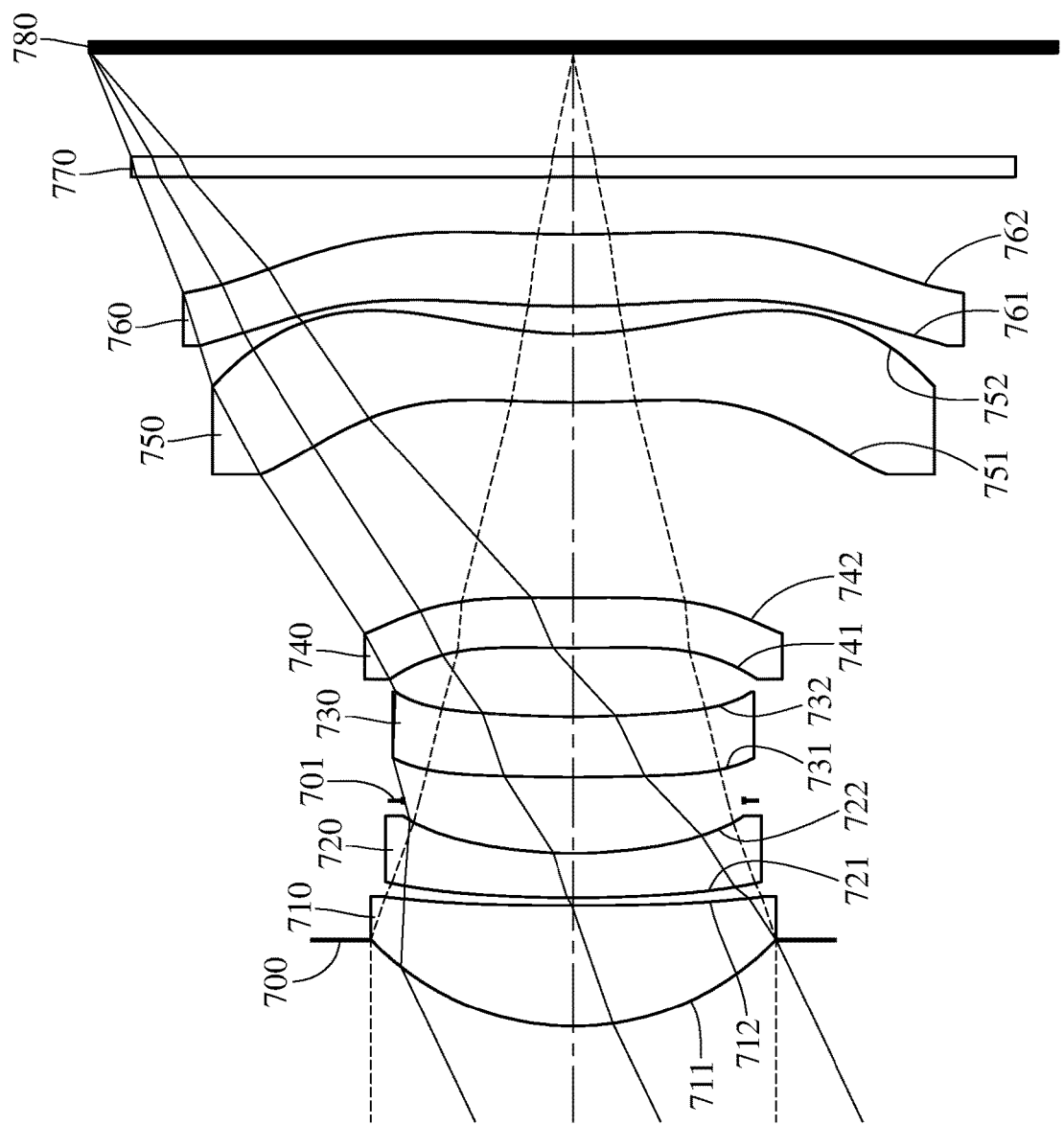
FIG. 13 is a schematic view of an optical system of an electronic device according to the 7th embodiment of the present disclosure.
Figure 14:
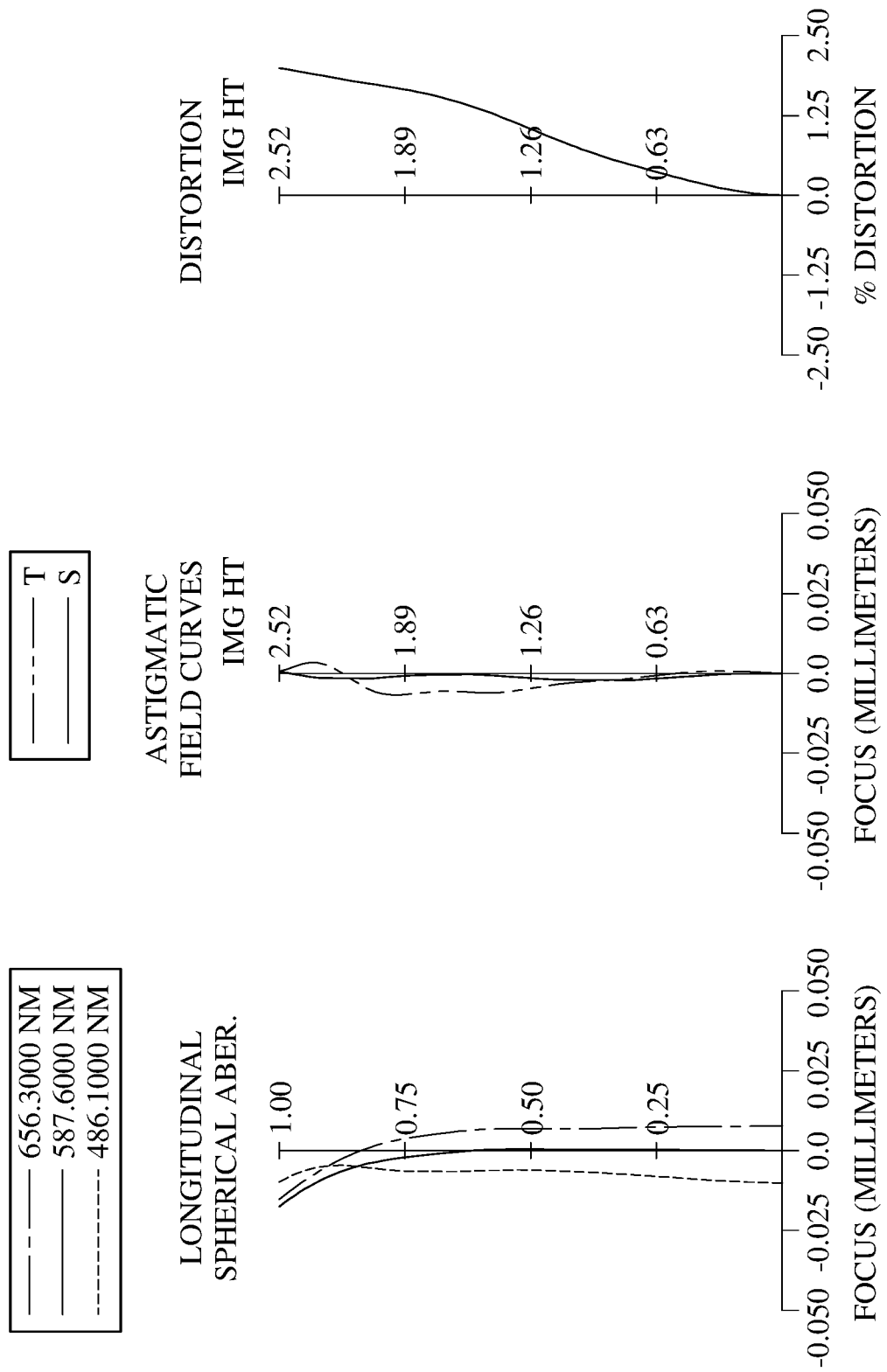
FIG. 14 shows spherical aberration curves, astigmatic field curves and a distortion curve of the optical system of the electronic device according to the 7th embodiment.

FIG. 13 is a schematic view of an optical system of an electronic device according to the 7th embodiment of the present disclosure. FIG. 14 shows, in order from left to right, spherical aberration curves, astigmatic field curves and a distortion curve of the optical system of the electronic device according to the 7th embodiment. The optical system includes, in order from an outer side to an inner side, an aperture stop 700, a first lens element 710, a second lens element 720, a stop 701, a third lens element 730, a fourth lens element 740, a fifth lens element 750, a sixth lens element 760, a filter 770 and an inner-side conjugate surface 780. The optical system includes six lens elements (710, 720, 730, 740, 750 and 760) with no additional lens element disposed between each of the adjacent six lens elements, wherein there is an air gap between each of all adjacent lens elements.

The first lens element 710 with positive refractive power has an outer-side surface 711 being convex in a paraxial region thereof and an inner-side surface 712 being concave in a paraxial region thereof. The first lens element 710 is made of plastic material and has the outer-side surface 711 and the inner-side surface 712 being both aspheric.

The second lens element 720 with negative refractive power has an outer-side surface 721 being convex in a paraxial region thereof and an inner-side surface 722 being concave in a paraxial region thereof. The second lens element 720 is made of plastic material and has the outer-side surface 721 and the inner-side surface 722 being both aspheric.

The third lens element 730 with negative refractive power has an outer-side surface 731 being convex in a paraxial region thereof and an inner-side surface 732 being concave in a paraxial region thereof. The third lens element 730 is made of plastic material and has the outer-side surface 731 and the inner-side surface 732 being both aspheric.

The fourth lens element 740 with positive refractive power has an outer-side surface 741 being convex in a paraxial region thereof and an inner-side surface 742 being concave in a paraxial region thereof. The fourth lens element 740 is made of plastic material and has the outer-side surface 741 and the inner-side surface 742 being both aspheric. The outer-side surface 741 of the fourth lens element 740 has one inflection point. The inner-side surface 742 of the fourth lens element 740 has two inflection points.

The fifth lens element 750 with negative refractive power has an outer-side surface 751 being convex in a paraxial region thereof and an inner-side surface 752 being concave in a paraxial region thereof. The fifth lens element 750 is made of plastic material and has the outer-side surface 751 and the inner-side surface 752 being both aspheric. The outer-side surface 751 of the fifth lens element 750 has two inflection points. The inner-side surface 752 of the fifth lens element 750 has two inflection points.

The sixth lens element 760 with positive refractive power has an outer-side surface 761 being convex in a paraxial region thereof and an inner-side surface 762 being concave in a paraxial region thereof. The sixth lens element 760 is made of plastic material and has the outer-side surface 761 and the inner-side surface 762 being both aspheric. The outer-side surface 761 of the sixth lens element 760 has three inflection points. The inner-side surface 762 of the sixth lens element 760 has two inflection points. The inner-side surface 762 of the sixth lens element 760 has at least one critical point in an off-axis region thereof.

The filter 770 is made of glass material and located between the sixth lens element 760 and the inner-side conjugate surface 780, and will not affect the focal length of the optical system.

In this embodiment, each of the second through sixth lens elements (720, 730, 740, 750 and 760) adjacently arranged has an Abbe number smaller than 35.0.

The detailed optical data of the 7th embodiment are shown in Table 13 and the aspheric surface data are shown in Table 14 below.

TABLE 13

7th Embodiment
f = 5.18 mm, Fno = 2.45, HFOV = 25.5 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.451 | | | | |
| 2 | Lens 1 | 1.476 | (ASP) | 0.632 | Plastic | 1.545 | 56.1 | 2.89 |
| 3 | | 20.275 | (ASP) | 0.040 | | | | |
| 4 | Lens 2 | 6.430 | (ASP) | 0.231 | Plastic | 1.642 | 22.5 | −6.30 |
| 5 | | 2.446 | (ASP) | 0.276 | | | | |
| 6 | Stop | Plano | | 0.123 | | | | |
| 7 | Lens 3 | 10.110 | (ASP) | 0.317 | Plastic | 1.639 | 23.2 | −15.39 |
| 8 | | 4.922 | (ASP) | 0.360 | | | | |
| 9 | Lens 4 | 9.129 | (ASP) | 0.261 | Plastic | 1.680 | 18.4 | 19.07 |
| 10 | | 30.477 | (ASP) | 1.024 | | | | |
| 11 | Lens 5 | 5.564 | (ASP) | 0.356 | Plastic | 1.582 | 30.2 | −5.62 |
| 12 | | 2.013 | (ASP) | 0.145 | | | | |
| 13 | Lens 6 | 4.528 | (ASP) | 0.375 | Plastic | 1.680 | 18.4 | 19.86 |

TABLE 13-continued

7th Embodiment
f = 5.18 mm, Fno = 2.45, HFOV = 25.5 deg.

| Surface # | | Curvature Radius | | Thickness | Material | Index | Abbe # | Focal Length |
|---|---|---|---|---|---|---|---|---|
| 14 | | 6.583 | (ASP) | 0.300 | | | | |
| 15 | Filter | Plano | | 0.110 | Glass | 1.517 | 64.2 | — |
| 16 | | Plano | | 0.540 | | | | |
| 17 | Inner-Side Conjugate Surface | Plano | | — | | | | |

Note:
Reference wavelength (d-line) is 587.6 nm (visible light).
An effective radius of the stop 701 (Surface 6) is 0.890 mm.
An effective radius of the outer-side surface 741 (Surface 9) is 0.960 mm.

TABLE 14

Aspheric Coefficients

| Surface # | | | | | |
|---|---|---|---|---|---|
| 2 | 3 | 4 | 5 | 7 | 8 |

| | 2 | 3 | 4 | 5 | 7 | 8 |
|---|---|---|---|---|---|---|
| k = | −1.7615E−01 | −3.2483E+00 | 1.0140E+01 | 4.6172E−02 | −7.2295E+01 | −4.0470E+01 |
| A4 = | 1.1286E−02 | −1.1831E−02 | −9.6618E−02 | −9.0562E−02 | −8.6761E−02 | −1.1196E−01 |
| A6 = | −7.6441E−04 | 1.6459E−01 | 3.1755E−01 | 2.6718E−01 | 2.8973E−01 | 3.3512E−01 |
| A8 = | 1.1217E−02 | −2.3971E−01 | −4.0170E−01 | −2.1163E−01 | −1.9923E−01 | −2.7606E−01 |
| A10 = | −4.3238E−03 | 1.2666E−01 | 2.1826E−01 | 1.1329E−01 | 1.4490E−01 | 2.2854E−01 |
| A12 = | — | −1.8124E−02 | −3.3827E−02 | — | −6.2580E−02 | −6.4024E−02 |

| Surface # | | | | | |
|---|---|---|---|---|---|
| 9 | 10 | 11 | 12 | 13 | 14 |

| | 9 | 10 | 11 | 12 | 13 | 14 |
|---|---|---|---|---|---|---|
| k = | 1.6989E+01 | −1.6951E+01 | −5.6524E+01 | −3.9787E−02 | −2.1318E+00 | 7.3598E−01 |
| A4 = | −3.3402E−01 | −2.4904E−01 | −1.2199E−01 | −1.5932E−01 | −1.2267E−01 | −1.3734E−01 |
| A6 = | 1.1363E−01 | 9.5368E−02 | −5.6251E−02 | 9.8281E−03 | 7.7689E−02 | 5.8684E−02 |
| A8 = | −6.0374E−02 | −2.6518E−02 | 7.8653E−02 | 1.5364E−02 | −5.4822E−02 | −1.7128E−02 |
| A10 = | 3.1992E−02 | 9.3918E−03 | −3.2789E−02 | −1.3562E−02 | 2.4245E−02 | 2.4190E−03 |
| A12 = | — | 5.3256E−03 | 5.9264E−03 | 5.4422E−03 | −5.7805E−03 | 2.2129E−04 |
| A14 = | — | — | −1.1909E−04 | −1.1035E−03 | 7.0466E−04 | −1.0387E−04 |
| A16 = | — | — | −6.1145E−05 | 8.6775E−05 | −3.5284E−05 | 8.0614E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.18 | T12/CT2 | 0.17 |
| Fno | 2.45 | T23/CT3 | 1.26 |
| HFOV [deg.] | 25.5 | TL [mm] | 5.09 |
| Nmax | 1.68 | TL/f | 0.98 |
| V1 | 56.1 | TL/YI | 2.02 |
| V2 | 22.5 | R4/R5 | 0.24 |
| V3 | 23.2 | f/f1 | 1.79 |
| V4 | 18.4 | f/f2 | −0.82 |
| V5 | 30.2 | f/f3 | −0.34 |
| V6 | 18.4 | f/f4 | 0.27 |
| Vmin | 18.4 | f/f5 | −0.92 |
| ΣVi | 168.8 | f/f6 | 0.26 |
| ΣAT/ΣCT | 0.91 | f/|f|min | 1.79 |
| (CT2 + CT3)/T23 | 1.37 | log₁₀(|f2/R3|) | −0.01 |
| (CT2 + CT4 + CT5)/(CT1 + CT3 + CT6) | 0.64 | Yc62/Y62 | 0.29 |
| (CT3 + CT4)/T34 | 1.61 | — | — |

8th Embodiment

Figure 15:
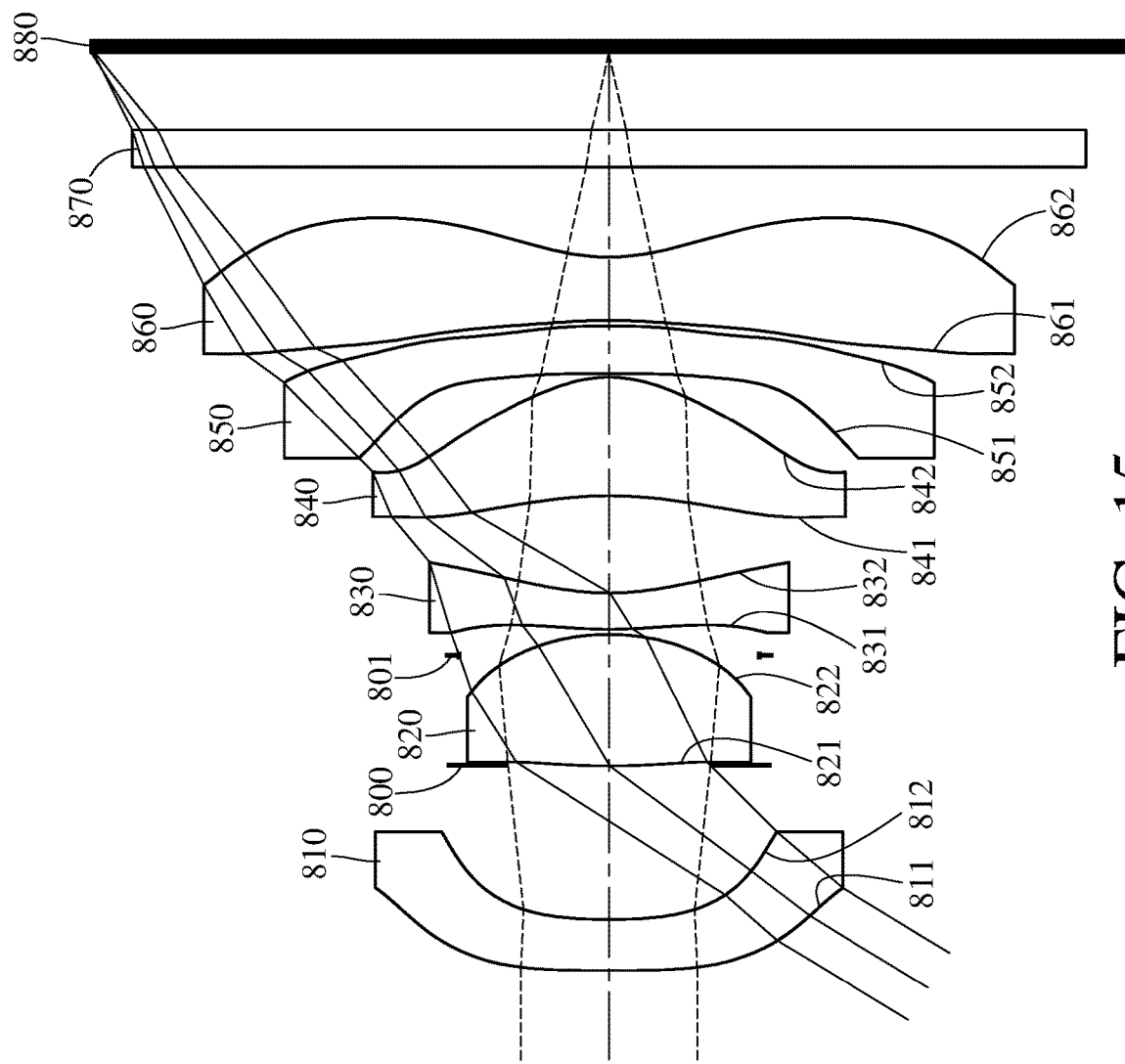
FIG. 15 is a schematic view of an optical system of an electronic device according to the 8th embodiment of the present disclosure.
Figure 16:
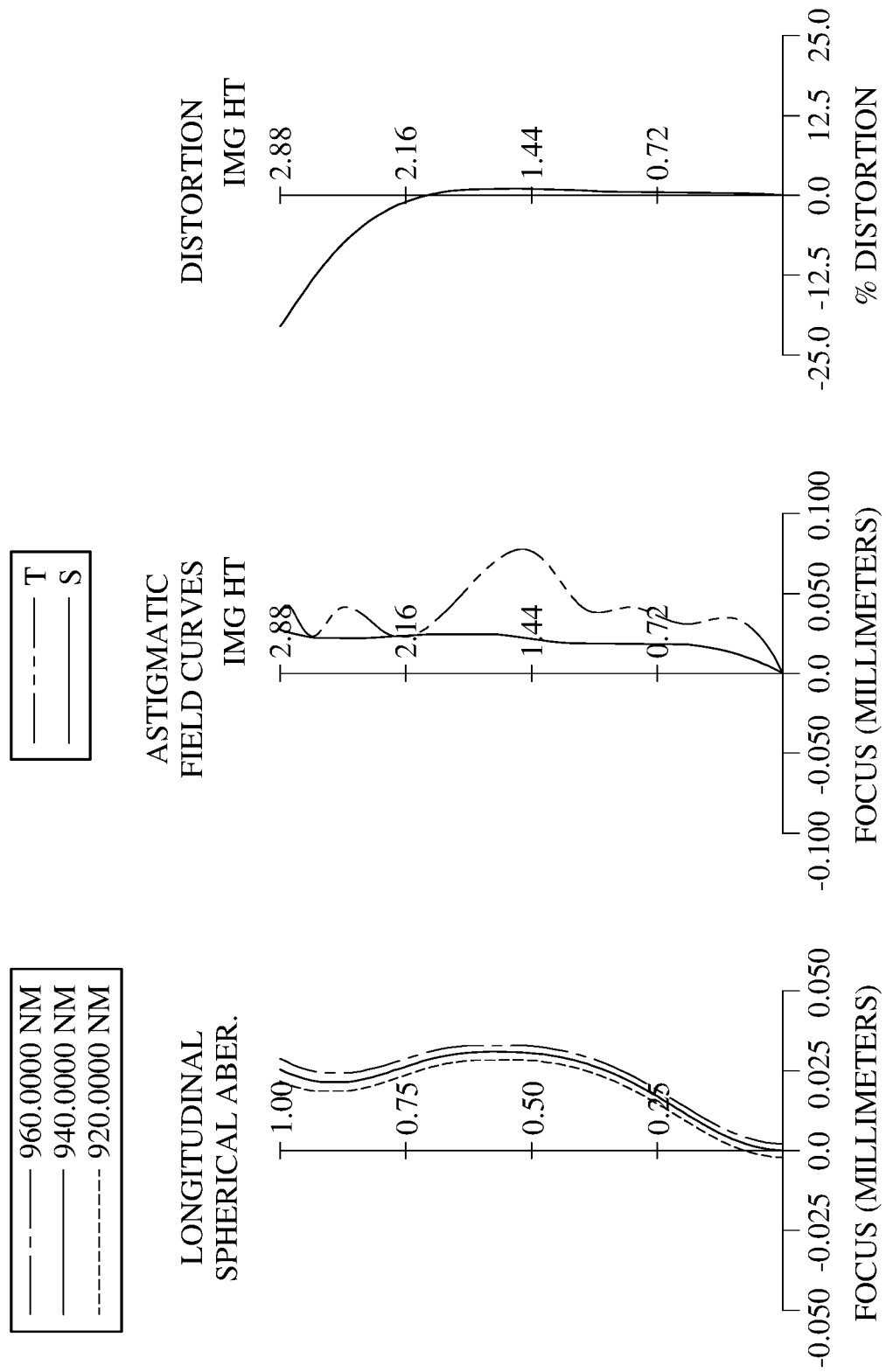
FIG. 16 shows spherical aberration curves, astigmatic field curves and a distortion curve of the optical system of the electronic device according to the 8th embodiment.

FIG. 15 is a schematic view of an optical system of an electronic device according to the 8th embodiment of the present disclosure. FIG. 16 shows, in order from left to right, spherical aberration curves, astigmatic field curves and a distortion curve of the optical system of the electronic device according to the 8th embodiment. The optical system includes, in order from an outer side to an inner side, a first lens element 810, an aperture stop 800, a second lens element 820, a stop 801, a third lens element 830, a fourth lens element 840, a fifth lens element 850, a sixth lens element 860, a filter 870 and an inner-side conjugate surface 880. The optical system includes six lens elements (810, 820, 830, 840, 850 and 860) with no additional lens element disposed between each of the adjacent six lens elements, wherein there is an air gap between each of all adjacent lens elements.

The first lens element 810 with negative refractive power has an outer-side surface 811 being convex in a paraxial region thereof and an inner-side surface 812 being concave in a paraxial region thereof. The first lens element 810 is made of glass material and has the outer-side surface 811 and the inner-side surface 812 being both aspheric. The outer-side surface 811 of the first lens element 810 has one inflection point. The inner-side surface 812 of the first lens element 810 has one inflection point.

The second lens element 820 with positive refractive power has an outer-side surface 821 being convex in a paraxial region thereof and an inner-side surface 822 being convex in a paraxial region thereof. The second lens element 820 is made of plastic material and has the outer-side surface 821 and the inner-side surface 822 being both aspheric. The outer-side surface 821 of the second lens element 820 has one inflection point.

The third lens element 830 with negative refractive power has an outer-side surface 831 being convex in a paraxial region thereof and an inner-side surface 832 being concave in a paraxial region thereof. The third lens element 830 is made of plastic material and has the outer-side surface 831 and the inner-side surface 832 being both aspheric. The outer-side surface 831 of the third lens element 830 has two inflection points. The inner-side surface 832 of the third lens element 830 has two inflection points.

The fourth lens element 840 with positive refractive power has an outer-side surface 841 being concave in a paraxial region thereof and an inner-side surface 842 being convex in a paraxial region thereof. The fourth lens element 840 is made of plastic material and has the outer-side surface 841 and the inner-side surface 842 being both aspheric. The outer-side surface 841 of the fourth lens element 840 has two inflection points. The inner-side surface 842 of the fourth lens element 840 has one inflection point.

The fifth lens element 850 with positive refractive power has an outer-side surface 851 being concave in a paraxial region thereof and an inner-side surface 852 being convex in a paraxial region thereof. The fifth lens element 850 is made of plastic material and has the outer-side surface 851 and the inner-side surface 852 being both aspheric. The outer-side surface 851 of the fifth lens element 850 has one inflection point. The inner-side surface 852 of the fifth lens element 850 has four inflection points.

The sixth lens element 860 with negative refractive power has an outer-side surface 861 being concave in a paraxial region thereof and an inner-side surface 862 being concave in a paraxial region thereof. The sixth lens element 860 is made of plastic material and has the outer-side surface 861 and the inner-side surface 862 being both aspheric. The outer-side surface 861 of the sixth lens element 860 has five inflection points. The inner-side surface 862 of the sixth lens element 860 has two inflection points. The inner-side surface 862 of the sixth lens element 860 has at least one critical point in an off-axis region thereof.

The filter 870 is made of glass material and located between the sixth lens element 860 and the inner-side conjugate surface 880, and will not affect the focal length of the optical system.

In this embodiment, each of the second through sixth lens elements (820, 830, 840, 850 and 860) adjacently arranged has an Abbe number smaller than 35.0.

The detailed optical data of the 8th embodiment are shown in Table 15 and the aspheric surface data are shown in Table 16 below.

TABLE 15

8th Embodiment
f = 2.20 mm, Fno = 2.24, HFOV = 58.6 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Lens 1 | 100.000 | (ASP) | 0.284 | Glass | 1.534 | 62.9 | −6.81 |
| 2 | | 3.506 | (ASP) | 0.858 | | | | |
| 3 | Ape. Stop | Plano | | −0.004 | | | | |
| 4 | Lens 2 | 4.241 | (ASP) | 0.735 | Plastic | 1.567 | 28.2 | 1.85 |
| 5 | | −1.304 | (ASP) | −0.117 | | | | |
| 6 | Stop | Plano | | 0.146 | | | | |
| 7 | Lens 3 | 2.630 | (ASP) | 0.200 | Plastic | 1.641 | 19.4 | −5.88 |
| 8 | | 1.503 | (ASP) | 0.541 | | | | |
| 9 | Lens 4 | −2.303 | (ASP) | 0.663 | Plastic | 1.641 | 19.4 | 1.41 |
| 10 | | −0.722 | (ASP) | 0.020 | | | | |
| 11 | Lens 5 | −44.050 | (ASP) | 0.266 | Plastic | 1.641 | 19.4 | 10.55 |
| 12 | | −5.877 | (ASP) | 0.031 | | | | |
| 13 | Lens 6 | −2.879 | (ASP) | 0.351 | Plastic | 1.641 | 19.4 | −1.21 |
| 14 | | 1.119 | (ASP) | 0.500 | | | | |
| 15 | Filter | Plano | | 0.210 | Glass | 1.508 | 64.2 | — |
| 16 | | Plano | | 0.428 | | | | |
| 17 | Inner-Side Conjugate Surface | Plano | | — | | | | |

Note:
Reference wavelength is 940.0 nm (infrared light).
An effective radius of the stop 801 (Surface 6) is 0.835 mm.

TABLE 16

Aspheric Coefficients

| Surface # | | | | | |
|---|---|---|---|---|---|
| 1 | 2 | 4 | 5 | 7 | 8 |
| k = -9.9000E+01 | -6.4360E+00 | -9.9000E+01 | -5.3717E-01 | -5.9836E+01 | -2.2343E+00 |
| A4 = 3.3193E-01 | 5.2318E-01 | 1.0502E-02 | -3.0628E-01 | -2.0307E-01 | -2.9278E-01 |
| A6 = -2.9839E-01 | -5.4869E-01 | -7.7063E-01 | 1.0136E+00 | 2.2140E-01 | 3.8684E-01 |
| A8 = 3.7308E-01 | 1.8824E+00 | 1.6655E+00 | -3.1507E+00 | -5.7701E-01 | -4.0163E-01 |
| A10 = -3.7853E-01 | -3.8855E+00 | -3.1505E+00 | 4.3929E+00 | 6.9399E-01 | 2.3412E-01 |
| A12 = 2.7908E-01 | 4.7978E+00 | — | -2.8488E+00 | -4.4695E-01 | -5.1551E-02 |
| A14 = -1.2245E-01 | -2.3367E+00 | — | — | 1.8573E-01 | — |
| A16 = 2.1609E-02 | — | — | — | — | — |

| Surface # | | | | | |
|---|---|---|---|---|---|
| 9 | 10 | 11 | 12 | 13 | 14 |
| k = -1.5706E+01 | -1.2748E+00 | -9.9000E+01 | 3.9005E+00 | -4.3680E+01 | -1.0600E+00 |
| A4 = -2.2973E-02 | 5.5475E-01 | -4.2502E-01 | -5.0145E-01 | 2.0801E-01 | -4.2118E-01 |
| A6 = 1.6467E-01 | -8.4599E-01 | 1.3042E+00 | 1.9027E+00 | -4.3435E-01 | 2.8976E-01 |
| A8 = -4.4810E-01 | 8.1546E-01 | -1.9648E+00 | -2.9787E+00 | 3.8704E-01 | -1.6398E-01 |
| A10 = 7.7032E-01 | -6.1104E-01 | 1.4258E+00 | 2.5432E+00 | -1.8608E-01 | 7.5402E-02 |
| A12 = -6.8728E-01 | 3.8310E-01 | -5.5022E-01 | -1.3061E+00 | 5.2359E-02 | -2.6744E-02 |
| A14 = 3.0761E-01 | -1.4072E-01 | 1.1063E-01 | 4.1610E-01 | -8.6830E-03 | 6.6960E-03 |
| A16 = -5.5810E-02 | 2.0141E-02 | -9.1527E-03 | -8.0709E-02 | 7.9096E-04 | -1.0796E-03 |
| A18 = — | — | — | 8.7416E-03 | -3.0681E-05 | 9.8992E-05 |
| A20 = — | — | — | -4.0548E-04 | — | -3.8862E-06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.20 | T12/CT2 | 1.16 |
| Fno | 2.24 | T23/CT3 | 0.15 |
| HFOV [deg.] | 58.6 | TL [mm] | 5.11 |
| Nmax | 1.64 | TL/f | 2.32 |
| V1 | 62.9 | TL/YI | 1.77 |
| V2 | 28.2 | R4/R5 | -0.50 |
| V3 | 19.4 | f/f1 | -0.32 |
| V4 | 19.4 | f/f2 | 1.19 |
| V5 | 19.4 | f/f3 | -0.37 |
| V6 | 19.4 | f/f4 | 1.56 |
| Vmin | 19.4 | f/f5 | 0.21 |
| ΣVi | 168.9 | f/f6 | -1.81 |
| ΣAT/ΣCT | 0.59 | f/|f|min | 1.81 |
| (CT2 + CT3)/T23 | 32.24 | $\log_{10}(|f2/R3|)$ | -0.36 |
| (CT2 + CT4 + CT5)/(CT1 + CT3 + CT6) | 1.99 | Yc62/Y62 | 0.56 |
| (CT3 + CT4)/T34 | 1.60 | — | — |

9th Embodiment

Figure 17:
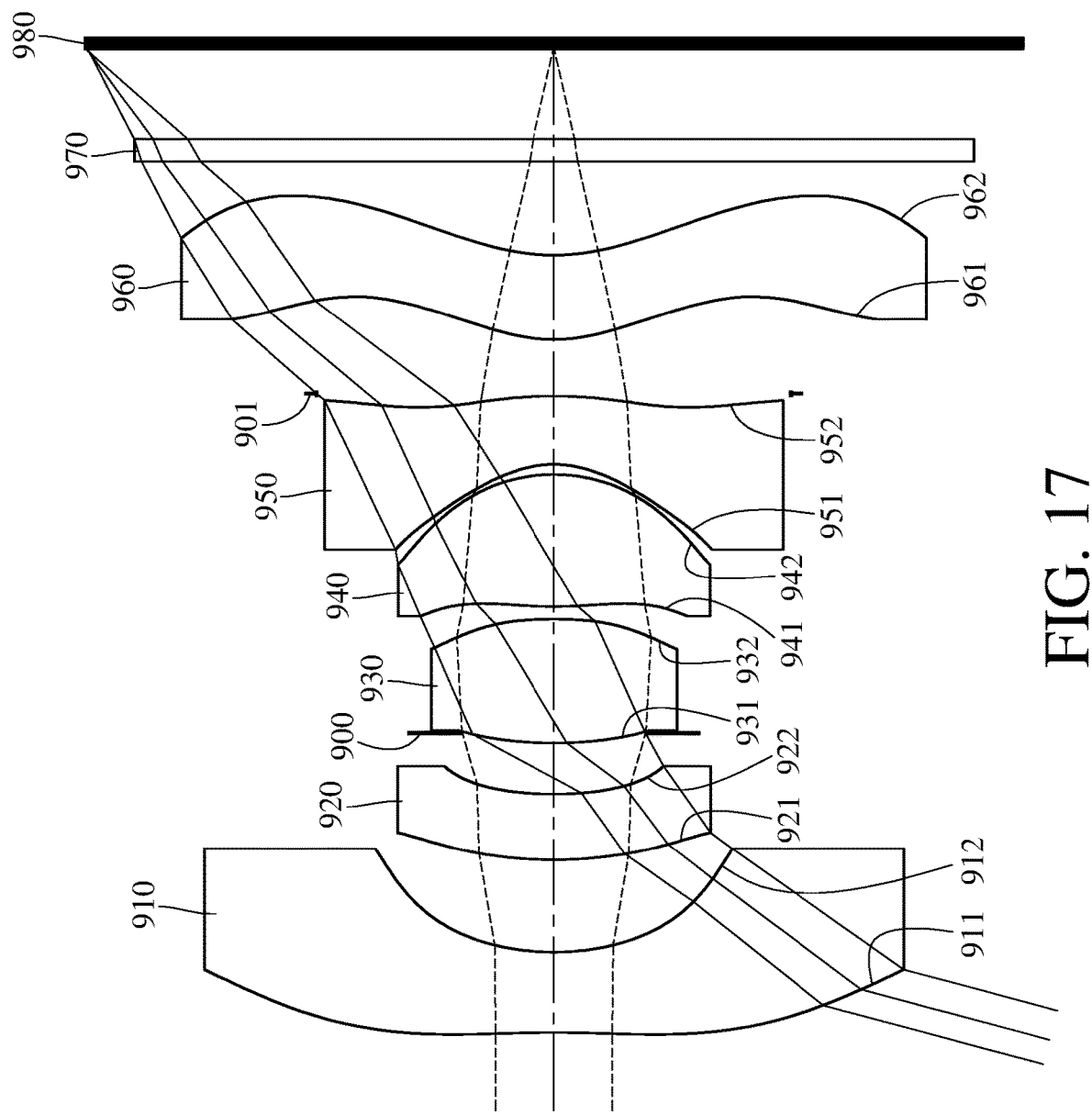
FIG. 17 is a schematic view of an optical system of an electronic device according to the 9th embodiment of the present disclosure.
Figure 18:
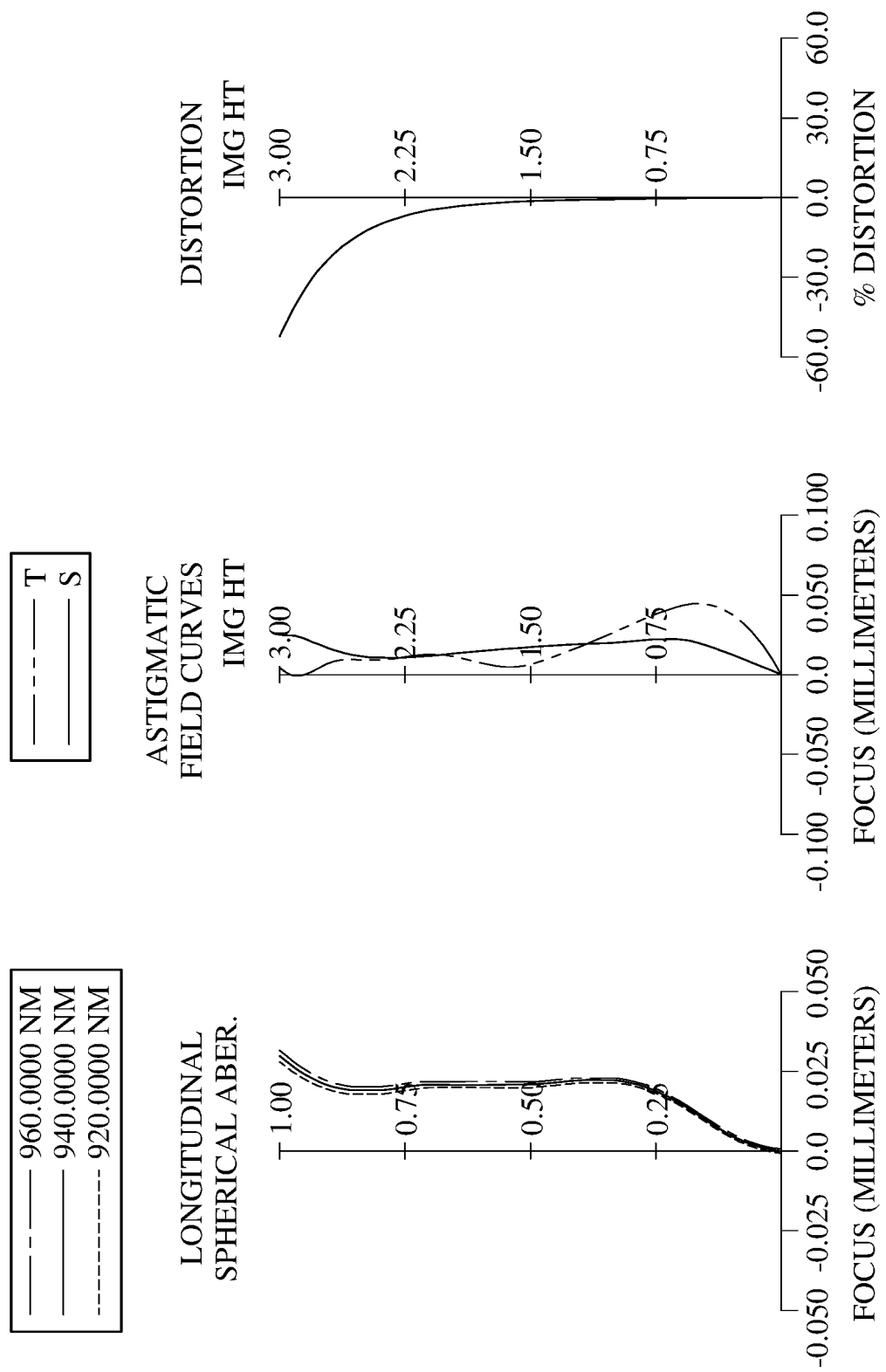
FIG. 18 shows spherical aberration curves, astigmatic field curves and a distortion curve of the optical system of the electronic device according to the 9th embodiment.

FIG. 17 is a schematic view of an optical system of an electronic device according to the 9th embodiment of the present disclosure. FIG. 18 shows, in order from left to right, spherical aberration curves, astigmatic field curves and a distortion curve of the optical system of the electronic device according to the 9th embodiment. The optical system includes, in order from an outer side to an inner side, a first lens element 910, a second lens element 920, an aperture stop 900, a third lens element 930, a fourth lens element 940, a fifth lens element 950, a stop 901, a sixth lens element 960, a filter 970 and an inner-side conjugate surface 980. The optical system includes six lens elements (910, 920, 930, 940, 950 and 960) with no additional lens element disposed between each of the adjacent six lens elements, wherein there is an air gap between each of all adjacent lens elements.

The first lens element 910 with negative refractive power has an outer-side surface 911 being concave in a paraxial region thereof and an inner-side surface 912 being concave in a paraxial region thereof. The first lens element 910 is made of plastic material and has the outer-side surface 911 and the inner-side surface 912 being both aspheric. The outer-side surface 911 of the first lens element 910 has one inflection point. The inner-side surface 912 of the first lens element 910 has one inflection point.

The second lens element 920 with negative refractive power has an outer-side surface 921 being convex in a paraxial region thereof and an inner-side surface 922 being concave in a paraxial region thereof. The second lens element 920 is made of plastic material and has the outer-side surface 921 and the inner-side surface 922 being both aspheric. The outer-side surface 921 of the second lens element 920 has one inflection point.

The third lens element 930 with positive refractive power has an outer-side surface 931 being convex in a paraxial region thereof and an inner-side surface 932 being convex in a paraxial region thereof. The third lens element 930 is made of plastic material and has the outer-side surface 931 and the inner-side surface 932 being both aspheric. The inner-side surface 932 of the third lens element 930 has one inflection point.

The fourth lens element 940 with positive refractive power has an outer-side surface 941 being convex in a paraxial region thereof and an inner-side surface 942 being convex in a paraxial region thereof. The fourth lens element 940 is made of plastic material and has the outer-side surface 941 and the inner-side surface 942 being both aspheric. The outer-side surface 941 of the fourth lens element 940 has one inflection point. The inner-side surface 942 of the fourth lens element 940 has one inflection point.

The fifth lens element 950 with negative refractive power has an outer-side surface 951 being concave in a paraxial region thereof and an inner-side surface 952 being convex in a paraxial region thereof. The fifth lens element 950 is made of plastic material and has the outer-side surface 951 and the inner-side surface 952 being both aspheric. The inner-side surface 952 of the fifth lens element 950 has two inflection points.

The sixth lens element 960 with positive refractive power has an outer-side surface 961 being convex in a paraxial region thereof and an inner-side surface 962 being concave in a paraxial region thereof. The sixth lens element 960 is made of plastic material and has the outer-side surface 961 and the inner-side surface 962 being both aspheric. The outer-side surface 961 of the sixth lens element 960 has two inflection points. The inner-side surface 962 of the sixth lens element 960 has one inflection point. The inner-side surface 962 of the sixth lens element 960 has at least one critical point in an off-axis region thereof.

The filter 970 is made of glass material and located between the sixth lens element 960 and the inner-side conjugate surface 980, and will not affect the focal length of the optical system.

In this embodiment, each of the first lens element 910, the second lens element 920, the third lens element 930, the fifth lens element 950 and the sixth lens element 960 has an Abbe number smaller than 35.0.

The detailed optical data of the 9th embodiment are shown in Table 17 and the aspheric surface data are shown in Table 18 below.

TABLE 17

9th Embodiment
f = 1.68 mm, Fno = 2.24, HFOV = 75.0 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Lens 1 | −7.770 | (ASP) | 0.515 | Plastic | 1.594 | 26.0 | −2.32 |
| 2 | | 1.713 | (ASP) | 0.593 | | | | |
| 3 | Lens 2 | 2.633 | (ASP) | 0.424 | Plastic | 1.649 | 18.4 | −83.98 |
| 4 | | 2.353 | (ASP) | 0.391 | | | | |
| 5 | Ape. Stop | Plano | | −0.064 | | | | |
| 6 | Lens 3 | 2.720 | (ASP) | 0.794 | Plastic | 1.594 | 26.0 | 2.56 |
| 7 | | −3.084 | (ASP) | 0.081 | | | | |
| 8 | Lens 4 | 2.374 | (ASP) | 0.851 | Plastic | 1.550 | 58.0 | 1.39 |
| 9 | | −0.982 | (ASP) | 0.065 | | | | |
| 10 | Lens 5 | −0.657 | (ASP) | 0.437 | Plastic | 1.649 | 18.4 | −1.44 |
| 11 | | −2.810 | (ASP) | 0.016 | | | | |
| 12 | Stop | Plano | | 0.348 | | | | |
| 13 | Lens 6 | 1.055 | (ASP) | 0.542 | Plastic | 1.649 | 18.4 | 4.40 |
| 14 | | 1.336 | (ASP) | 0.600 | | | | |
| 15 | Filter | Plano | | 0.145 | Glass | 1.508 | 64.2 | — |
| 16 | | Plano | | 0.580 | | | | |
| 17 | Inner-Side Conjugate Surface | Plano | | — | | | | |

Note:
Reference wavelength is 940.0 nm (infrared light).
An effective radius of the stop 901 (Surface 12) is 1.520 mm.

TABLE 18

Aspheric Coefficients

| | Surface # | | | | | |
|---|---|---|---|---|---|---|
| | 1 | 2 | 3 | 4 | 6 | 7 |
| k = | 8.6927E+00 | 6.8798E−01 | −3.2967E+00 | −2.0743E+00 | 1.3169E+01 | −4.8748E+00 |
| A4 = | 1.0283E−01 | 6.4023E−02 | −3.5044E−02 | 1.3011E−01 | −8.1110E−03 | −7.2605E−01 |
| A6 = | −4.6942E−02 | −2.3238E−03 | 1.4503E−01 | 5.2304E−01 | −1.6987E−01 | 1.6545E+00 |
| A8 = | 1.8342E−02 | 1.5570E−01 | −1.0477E−01 | −1.5043E+00 | 4.4627E−01 | −3.2146E+00 |
| A10 = | −4.8540E−03 | −4.0974E−01 | −1.3183E−02 | 4.7934E+00 | −1.0195E+00 | 3.9908E+00 |
| A12 = | 7.8906E−04 | 5.2302E−01 | −5.3801E−03 | −8.7912E+00 | — | −1.8218E+00 |
| A14 = | −7.1711E−05 | −2.8424E−01 | 1.1758E−02 | 7.9986E+00 | — | — |
| A16 = | 2.8761E−06 | 4.7388E−02 | — | — | — | — |

TABLE 18-continued

Aspheric Coefficients

| | Surface # | | | | |
|---|---|---|---|---|---|
| 8 | 9 | 10 | 11 | 13 | 14 |
| k = −7.3511E+01 | −9.5087E−01 | −8.9051E−01 | −2.6151E+00 | −5.3987E+00 | −5.4528E+00 |
| A4 = −1.8143E−01 | 4.1435E−01 | 9.2614E−01 | −1.1083E−01 | −3.5819E−02 | 2.8106E−02 |
| A6 = −7.5056E−01 | −2.7720E+00 | −2.9142E+00 | 7.3626E−01 | −1.9192E−02 | −6.2330E−02 |
| A8 = 3.0578E+00 | 6.8933E+00 | 7.6849E+00 | −1.0174E+00 | 6.6012E−03 | 3.5502E−02 |
| A10 = −6.8206E+00 | −9.1535E+00 | −1.2201E+01 | 7.3931E−01 | −2.0373E−03 | −1.1981E−02 |
| A12 = 7.5952E+00 | 6.4833E+00 | 1.1135E+01 | −3.1141E−01 | 1.5226E−03 | 2.5478E−03 |
| A14 = −3.1610E+00 | −2.2380E+00 | −5.4739E+00 | 7.1868E−02 | −5.3671E−04 | −3.3579E−04 |
| A16 = — | 3.0895E−01 | 1.1279E+00 | −7.0387E−03 | 8.1910E−05 | 2.4817E−05 |
| A18 = — | — | — | — | −4.6453E−06 | −7.7255E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.68 | T12/CT2 | 1.40 |
| Fno | 2.24 | T23/CT3 | 0.41 |
| HFOV [deg.] | 75.0 | TL [mm] | 6.32 |
| Nmax | 1.65 | TL/f | 3.76 |
| V1 | 26.0 | TL/YI | 2.11 |
| V2 | 18.4 | R4/R5 | 0.87 |
| V3 | 26.0 | f/f1 | −0.72 |
| V4 | 58.0 | f/f2 | −0.02 |
| V5 | 18.4 | f/f3 | 0.65 |
| V6 | 18.4 | f/f4 | 1.21 |
| Vmin | 18.4 | f/f5 | −1.17 |
| ΣVi | 165.1 | f/f6 | 0.38 |
| ΣAT/ΣCT | 0.40 | f/|f|min | 1.21 |
| (CT2 + CT3)/T23 | 3.72 | $\log_{10}(|f2/R3|)$ | 1.50 |
| (CT2 + CT4 + CT5)/(CT1 + CT3 + CT6) | 0.92 | Yc62/Y62 | 0.70 |
| (CT3 + CT4)/T34 | 20.31 | — | — |

10th Embodiment

Figure 19:
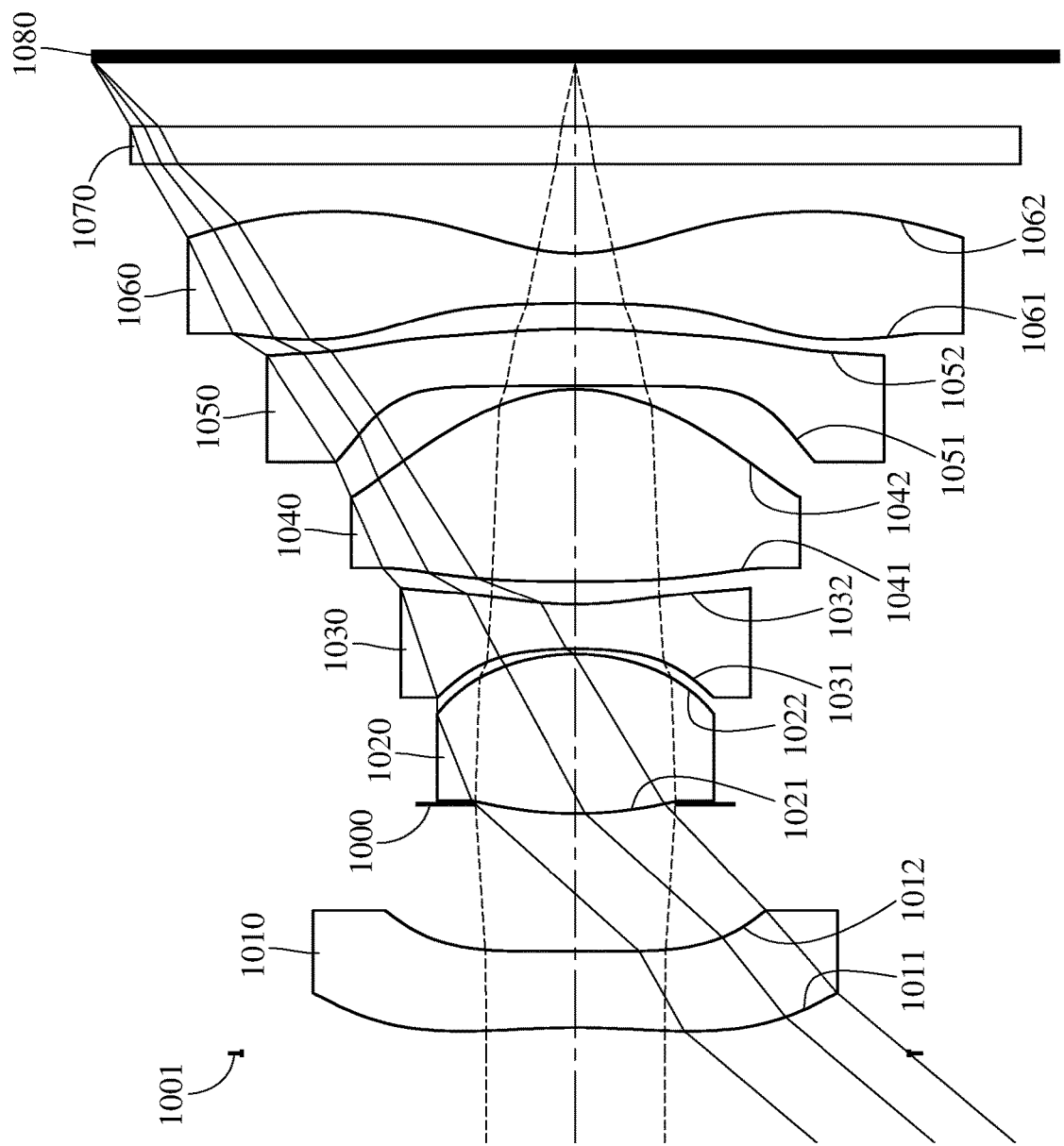
FIG. 19 is a schematic view of an optical system of an electronic device according to the 10th embodiment of the present disclosure.
Figure 20:
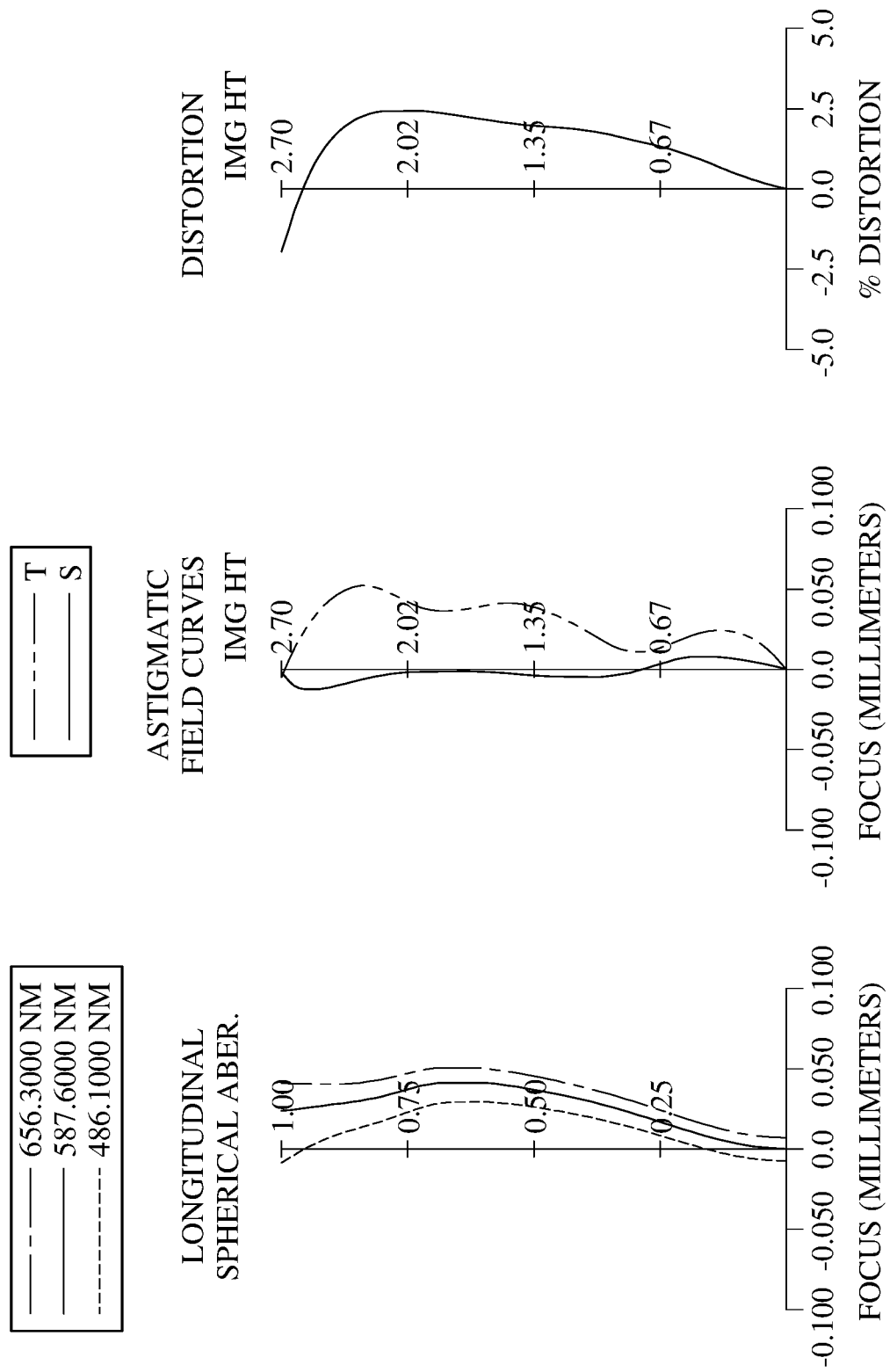
FIG. 20 shows spherical aberration curves, astigmatic field curves and a distortion curve of the optical system of the electronic device according to the 10th embodiment.

FIG. 19 is a schematic view of an optical system of an electronic device according to the 10th embodiment of the present disclosure. FIG. 20 shows, in order from left to right, spherical aberration curves, astigmatic field curves and a distortion curve of the optical system of the electronic device according to the 10th embodiment. The optical system includes, in order from an outer side to an inner side, a stop 1001, a first lens element 1010, an aperture stop 1000, a second lens element 1020, a third lens element 1030, a fourth lens element 1040, a fifth lens element 1050, a sixth lens element 1060, a filter 1070 and an inner-side conjugate surface 1080. The optical system includes six lens elements (1010, 1020, 1030, 1040, 1050 and 1060) with no additional lens element disposed between each of the adjacent six lens elements, wherein there is an air gap between each of all adjacent lens elements.

The first lens element 1010 with negative refractive power has an outer-side surface 1011 being concave in a paraxial region thereof and an inner-side surface 1012 being convex in a paraxial region thereof. The first lens element 1010 is made of plastic material and has the outer-side surface 1011 and the inner-side surface 1012 being both aspheric. The outer-side surface 1011 of the first lens element 1010 has two inflection points. The inner-side surface 1012 of the first lens element 1010 has two inflection points.

The second lens element 1020 with positive refractive power has an outer-side surface 1021 being convex in a paraxial region thereof and an inner-side surface 1022 being convex in a paraxial region thereof. The second lens element 1020 is made of plastic material and has the outer-side surface 1021 and the inner-side surface 1022 being both aspheric. The outer-side surface 1021 of the second lens element 1020 has one inflection point.

The third lens element 1030 with negative refractive power has an outer-side surface 1031 being concave in a paraxial region thereof and an inner-side surface 1032 being concave in a paraxial region thereof. The third lens element 1030 is made of plastic material and has the outer-side surface 1031 and the inner-side surface 1032 being both aspheric. The outer-side surface 1031 of the third lens element 1030 has one inflection point. The inner-side surface 1032 of the third lens element 1030 has two inflection points.

The fourth lens element 1040 with positive refractive power has an outer-side surface 1041 being convex in a paraxial region thereof and an inner-side surface 1042 being convex in a paraxial region thereof. The fourth lens element 1040 is made of plastic material and has the outer-side surface 1041 and the inner-side surface 1042 being both aspheric. The outer-side surface 1041 of the fourth lens element 1040 has one inflection point. The inner-side surface 1042 of the fourth lens element 1040 has one inflection point.

The fifth lens element 1050 with positive refractive power has an outer-side surface 1051 being concave in a paraxial region thereof and an inner-side surface 1052 being convex in a paraxial region thereof. The fifth lens element 1050 is made of plastic material and has the outer-side surface 1051 and the inner-side surface 1052 being both aspheric. The outer-side surface 1051 of the fifth lens element 1050 has one inflection point. The inner-side surface 1052 of the fifth lens element 1050 has four inflection points.

The sixth lens element 1060 with negative refractive power has an outer-side surface 1061 being concave in a paraxial region thereof and an inner-side surface 1062 being concave in a paraxial region thereof. The sixth lens element 1060 is made of plastic material and has the outer-side surface 1061 and the inner-side surface 1062 being both aspheric. The outer-side surface 1061 of the sixth lens element 1060 has one inflection point. The inner-side surface 1062 of the sixth lens element 1060 has two inflection points. The inner-side surface 1062 of the sixth lens element 1060 has at least one critical point in an off-axis region thereof.

The filter 1070 is made of glass material and located between the sixth lens element 1060 and the inner-side conjugate surface 1080, and will not affect the focal length of the optical system.

In this embodiment, each of the second through sixth lens elements (1020, 1030, 1040, 1050 and 1060) adjacently arranged has an Abbe number smaller than 35.0.

The detailed optical data of the 10th embodiment are shown in Table 19 and the aspheric surface data are shown in Table 20 below.

TABLE 19

10th Embodiment
f = 2.30 mm, Fno = 2.30, HFOV = 49.8 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Stop | Plano | | 0.145 | | | | |
| 2 | Lens 1 | −4.338 | (ASP) | 0.427 | Plastic | 1.545 | 56.1 | −10.94 |
| 3 | | −16.482 | (ASP) | 0.826 | | | | |
| 4 | Ape. Stop | Plano | | −0.052 | | | | |
| 5 | Lens 2 | 2.291 | (ASP) | 0.893 | Plastic | 1.582 | 30.2 | 1.42 |
| 6 | | −1.111 | (ASP) | 0.030 | | | | |
| 7 | Lens 3 | −2.516 | (ASP) | 0.250 | Plastic | 1.669 | 19.4 | −1.58 |
| 8 | | 1.900 | (ASP) | 0.130 | | | | |
| 9 | Lens 4 | 18.071 | (ASP) | 1.077 | Plastic | 1.582 | 30.2 | 1.51 |
| 10 | | −0.906 | (ASP) | 0.020 | | | | |
| 11 | Lens 5 | −28.210 | (ASP) | 0.317 | Plastic | 1.669 | 19.4 | 8.74 |
| 12 | | −4.866 | (ASP) | 0.148 | | | | |
| 13 | Lens 6 | −10.506 | (ASP) | 0.280 | Plastic | 1.669 | 19.4 | −1.42 |
| 14 | | 1.056 | (ASP) | 0.500 | | | | |
| 15 | Filter | Plano | | 0.210 | Glass | 1.517 | 64.2 | — |
| 16 | | Plano | | 0.361 | | | | |
| 17 | Inner-Side Conjugate Surface | Plano | | — | | | | |

Note:
Reference wavelength (d-line) is 587.6 nm (visible light).
An effective radius of the stop 1001 (Surface 1) is 1.870 mm.

TABLE 20

Aspheric Coefficients

| | Surface # | | | | | |
|---|---|---|---|---|---|---|
| | 2 | 3 | 5 | 6 | 7 | 8 |
| k = | 5.9653E+00 | 3.0878E+01 | −1.4122E+01 | −5.6974E−01 | 6.1560E−01 | −3.9125E+00 |
| A4 = | 2.0746E−01 | 2.4759E−01 | 1.1810E−01 | 4.6373E−01 | −1.2150E−01 | −3.3873E−01 |
| A6 = | −1.3064E−01 | −3.5181E−02 | 6.0720E−01 | −3.3569E+00 | −2.6399E+00 | 3.4084E−01 |
| A8 = | 1.1055E−01 | −1.5176E−01 | −6.7947E+00 | 9.8043E+00 | 8.4555E+00 | −1.0700E−01 |
| A10 = | −7.3562E−02 | 3.7466E−01 | 3.0412E+01 | −1.5398E+01 | −1.1762E+01 | −1.4155E−01 |
| A12 = | 3.3899E−02 | −3.6827E−01 | −6.9005E+01 | 1.0512E+01 | 4.9815E+00 | 1.3970E−01 |
| A14 = | −9.0057E−03 | 1.9971E−01 | 5.8825E+01 | −1.9792E+00 | 1.8418E+00 | −1.9731E−02 |
| A16 = | 9.9251E−04 | −5.6233E−02 | — | — | — | — |

| | Surface # | | | | | |
|---|---|---|---|---|---|---|
| | 9 | 10 | 11 | 12 | 13 | 14 |
| k = | 9.9000E+01 | −1.0359E+00 | 5.2192E+01 | −1.0629E+01 | −2.7176E+00 | −1.1277E+00 |
| A4 = | 1.1811E−01 | 4.6682E−01 | 7.5090E−02 | −2.4216E−01 | −3.6271E−01 | −4.6363E−01 |
| A6 = | 2.9202E−02 | −1.4185E+00 | −3.0565E−01 | 3.9792E−01 | −2.7762E−01 | 3.3148E−01 |
| A8 = | −5.5359E−01 | 3.2262E+00 | 7.0625E−01 | −8.2473E−01 | 4.4062E−01 | −1.6423E−01 |
| A10 = | 1.1398E+00 | −4.8998E+00 | −1.3387E+00 | 7.8591E−01 | −2.9398E−01 | 5.4835E−02 |
| A12 = | −1.1706E+00 | 4.7736E+00 | 1.4288E+00 | −4.2128E−01 | 1.1088E−01 | −1.2111E−02 |
| A14 = | 6.0029E−01 | −2.8138E+00 | −9.2425E−01 | 1.3588E−01 | −2.5404E−02 | 1.7124E−03 |
| A16 = | −1.2196E−01 | 9.0435E−01 | 3.6405E−01 | −2.6349E−02 | 3.5036E−03 | −1.4510E−04 |
| A18 = | — | −1.2059E−01 | −7.8693E−02 | 2.8466E−03 | −2.6672E−04 | 6.4577E−06 |
| A20 = | — | — | 7.0246E−03 | −1.3222E−04 | 8.5542E−06 | −1.0938E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 2.30 | T12/CT2 | 0.87 |
| Fno | 2.30 | T23/CT3 | 0.12 |
| HFOV [deg.] | 49.8 | TL [mm] | 5.42 |
| Nmax | 1.67 | TL/f | 2.36 |
| V1 | 56.1 | TL/YI | 2.01 |
| V2 | 30.2 | R4/R5 | 0.44 |
| V3 | 19.4 | f/f1 | −0.21 |
| V4 | 30.2 | f/f2 | 1.62 |
| V5 | 19.4 | f/f3 | −1.45 |
| V6 | 19.4 | f/f4 | 1.52 |
| Vmin | 19.4 | f/f5 | 0.26 |
| ΣVi | 174.9 | f/f6 | −1.62 |
| ΣAT/ΣCT | 0.34 | f/|f|min | 1.62 |
| (CT2 + CT3)/T23 | 38.10 | $\log_{10}(|f2/R3|)$ | −0.21 |
| (CT2 + CT4 + CT5)/(CT1 + CT3 + CT6) | 2.39 | Yc62/Y62 | 0.62 |
| (CT3 + CT4)/T34 | 10.21 | — | — |

11th Embodiment

Figure 21:
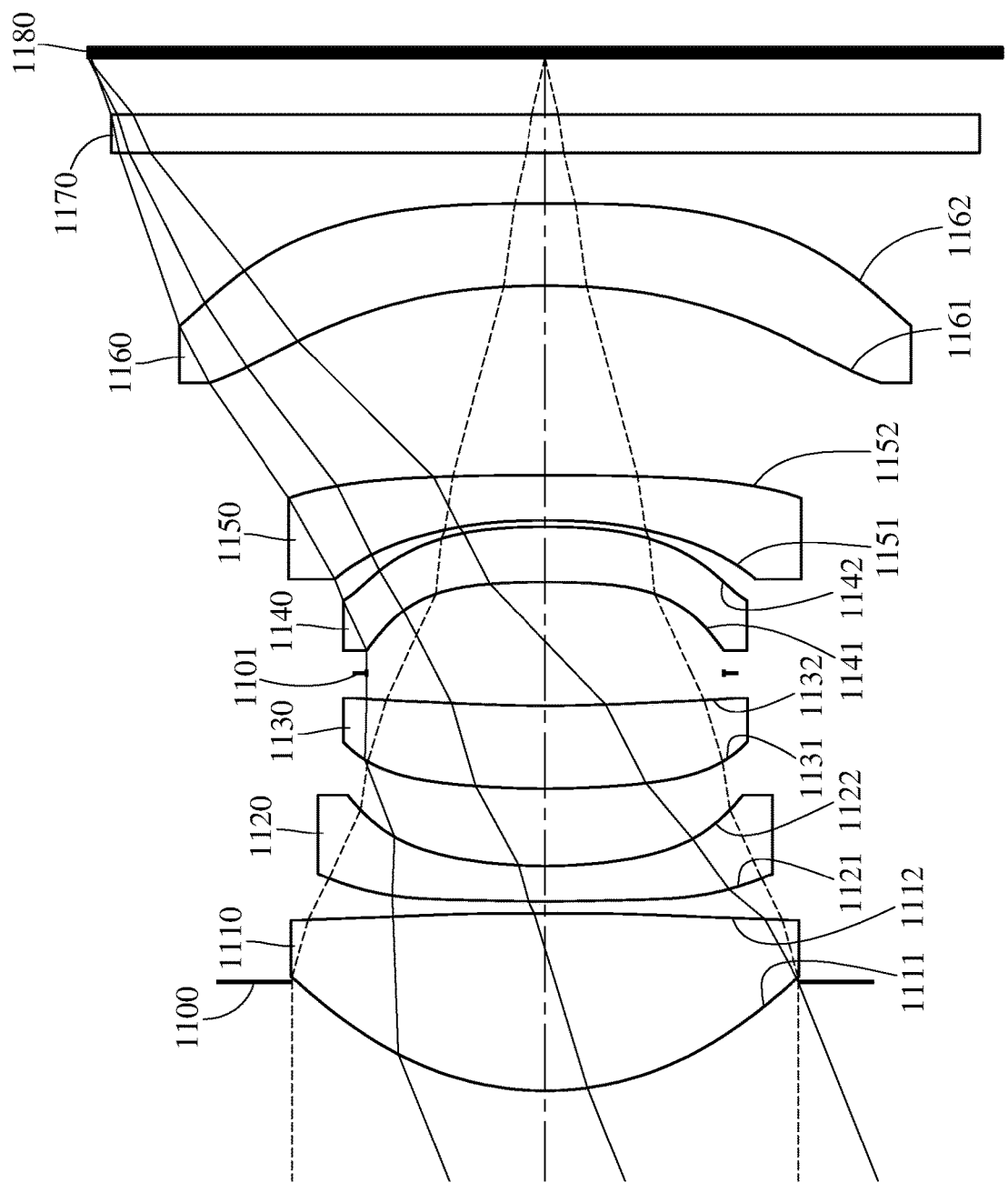
FIG. 21 is a schematic view of an optical system of an electronic device according to the 11th embodiment of the present disclosure.
Figure 22:
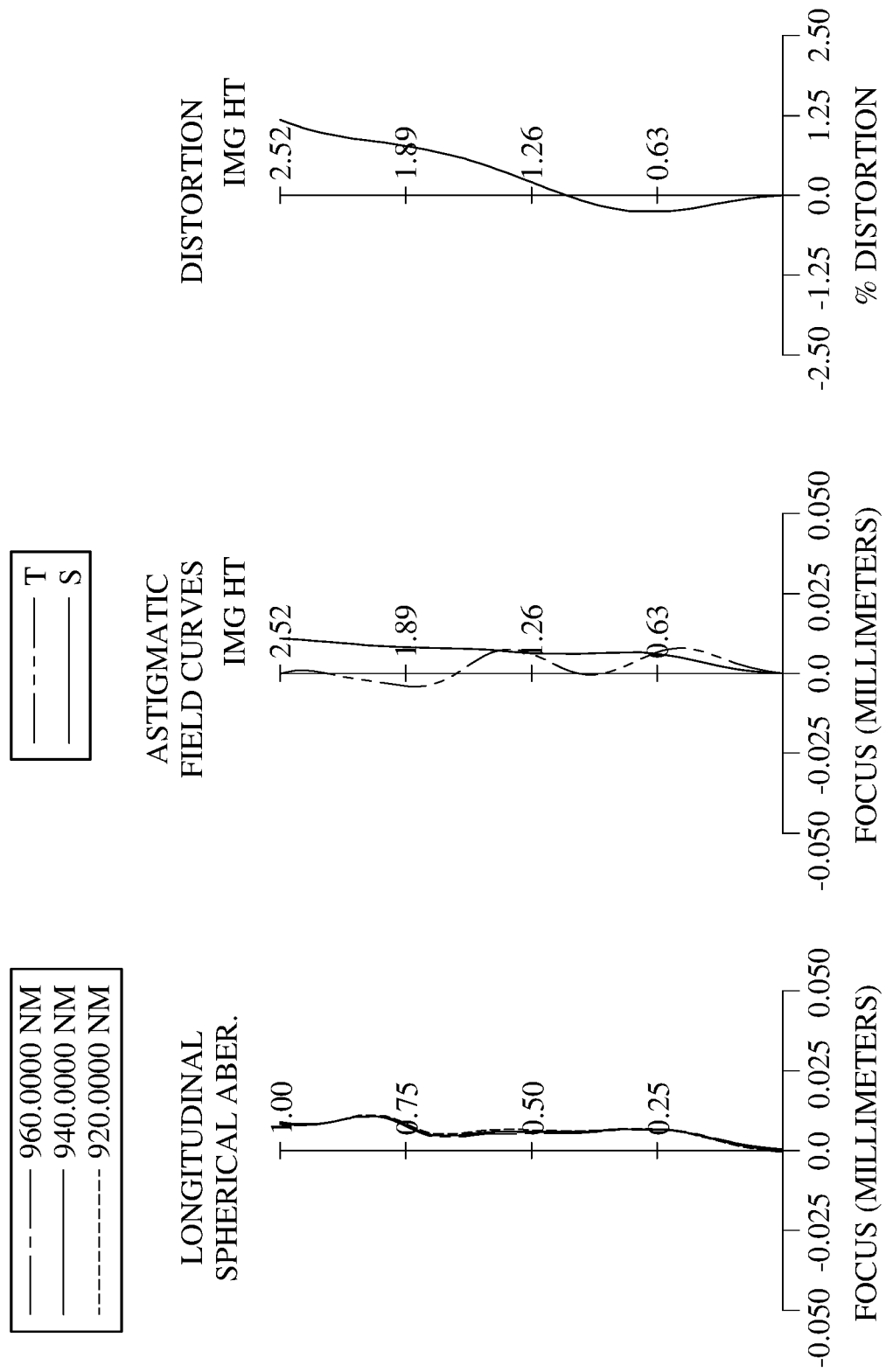
FIG. 22 shows spherical aberration curves, astigmatic field curves and a distortion curve of the optical system of the electronic device according to the 11th embodiment.

FIG. 21 is a schematic view of an optical system of an electronic device according to the 11th embodiment of the present disclosure. FIG. 22 shows, in order from left to right, spherical aberration curves, astigmatic field curves and a distortion curve of the optical system of the electronic device according to the 11th embodiment. The optical system includes, in order from an outer side to an inner side, an aperture stop 1100, a first lens element 1110, a second lens element 1120, a third lens element 1130, a stop 1101, a fourth lens element 1140, a fifth lens element 1150, a sixth lens element 1160, a filter 1170 and an inner-side conjugate surface 1180. The optical system includes six lens elements (1110, 1120, 1130, 1140, 1150 and 1160) with no additional lens element disposed between each of the adjacent six lens elements, wherein there is an air gap between each of all adjacent lens elements.

The first lens element 1110 with positive refractive power has an outer-side surface 1111 being convex in a paraxial region thereof and an inner-side surface 1112 being concave in a paraxial region thereof. The first lens element 1110 is made of plastic material and has the outer-side surface 1111 and the inner-side surface 1112 being both aspheric. The inner-side surface 1112 of the first lens element 1110 has three inflection points.

The second lens element 1120 with negative refractive power has an outer-side surface 1121 being convex in a paraxial region thereof and an inner-side surface 1122 being concave in a paraxial region thereof. The second lens element 1120 is made of plastic material and has the outer-side surface 1121 and the inner-side surface 1122 being both aspheric. The outer-side surface 1121 of the second lens element 1120 has two inflection points.

The third lens element 1130 with positive refractive power has an outer-side surface 1131 being convex in a paraxial region thereof and an inner-side surface 1132 being concave in a paraxial region thereof. The third lens element 1130 is made of plastic material and has the outer-side surface 1131 and the inner-side surface 1132 being both aspheric.

The fourth lens element 1140 with positive refractive power has an outer-side surface 1141 being concave in a paraxial region thereof and an inner-side surface 1142 being convex in a paraxial region thereof. The fourth lens element 1140 is made of plastic material and has the outer-side surface 1141 and the inner-side surface 1142 being both aspheric. The inner-side surface 1142 of the fourth lens element 1140 has one inflection point.

The fifth lens element 1150 with negative refractive power has an outer-side surface 1151 being concave in a paraxial region thereof and an inner-side surface 1152 being convex in a paraxial region thereof. The fifth lens element 1150 is made of plastic material and has the outer-side surface 1151 and the inner-side surface 1152 being both aspheric.

The sixth lens element 1160 with negative refractive power has an outer-side surface 1161 being concave in a paraxial region thereof and an inner-side surface 1162 being convex in a paraxial region thereof. The sixth lens element 1160 is made of plastic material and has the outer-side surface 1161 and the inner-side surface 1162 being both aspheric. The outer-side surface 1161 of the sixth lens element 1160 has one inflection point. The inner-side surface 1162 of the sixth lens element 1160 has one inflection point.

The filter 1170 is made of glass material and located between the sixth lens element 1160 and the inner-side conjugate surface 1180, and will not affect the focal length of the optical system.

In this embodiment, each of the second through sixth lens elements (1120, 1130, 1140, 1150 and 1160) adjacently arranged has an Abbe number smaller than 35.0.

The detailed optical data of the 11th embodiment are shown in Table 21 and the aspheric surface data are shown in Table 22 below.

TABLE 21

11th Embodiment
f = 6.20 mm, Fno = 2.22, HFOV = 21.9 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | Infinity | | | | |
| 1 | Ape. Stop | Plano | | −0.600 | | | | |
| 2 | Lens 1 | 1.705 | (ASP) | 0.976 | Plastic | 1.536 | 56.1 | 3.24 |
| 3 | | 69.850 | (ASP) | 0.067 | | | | |
| 4 | Lens 2 | 7.662 | (ASP) | 0.199 | Plastic | 1.657 | 18.7 | −6.50 |

TABLE 21-continued

11th Embodiment
f = 6.20 mm, Fno = 2.22, HFOV = 21.9 deg.

| Surface # | | Curvature Radius | | Thickness | Material | Index | Abbe # | Focal Length |
|---|---|---|---|---|---|---|---|---|
| 5 | | 2.716 | (ASP) | 0.426 | | | | |
| 6 | Lens 3 | 5.277 | (ASP) | 0.456 | Plastic | 1.567 | 28.2 | 30.60 |
| 7 | | 7.346 | (ASP) | 0.181 | | | | |
| 8 | Stop | Plano | | 0.504 | | | | |
| 9 | Lens 4 | −5.692 | (ASP) | 0.305 | Plastic | 1.657 | 18.7 | 29.90 |
| 10 | | −4.508 | (ASP) | 0.035 | | | | |
| 11 | Lens 5 | −4.428 | (ASP) | 0.250 | Plastic | 1.617 | 23.5 | −7.90 |
| 12 | | −49.523 | (ASP) | 1.048 | | | | |
| 13 | Lens 6 | −4.750 | (ASP) | 0.452 | Plastic | 1.657 | 18.7 | −7.67 |
| 14 | | −84.672 | (ASP) | 0.280 | | | | |
| 15 | Filter | Plano | | 0.210 | Glass | 1.508 | 64.2 | — |
| 16 | | Plano | | 0.314 | | | | |
| 17 | Inner-Side Conjugate Surface | Plano | | — | | | | |

Note:
Reference wavelength is 940.0 nm (infrared light).
An effective radius of the stop 1101 (Surface 8) is 0.985 mm.

TABLE 22

Aspheric Coefficients

| | Surface # | | | | | |
|---|---|---|---|---|---|---|
| | 2 | 3 | 4 | 5 | 6 | 7 |
| k = | −2.9064E−01 | −1.5198E+01 | −8.5032E+01 | −7.3752E+00 | 1.6297E+01 | 2.3149E+01 |
| A4 = | 2.4223E−03 | −1.2976E−01 | −1.6847E−01 | −3.2403E−02 | −3.2290E−02 | −6.3690E−02 |
| A6 = | 7.7095E−04 | 1.9738E−01 | 3.5648E−01 | 2.6074E−01 | 6.6955E−02 | 1.2329E−02 |
| A8 = | −7.1667E−03 | −1.3787E−01 | −2.2882E−01 | −1.4769E−01 | 2.0205E−02 | 5.8675E−02 |
| A10 = | 5.7753E−03 | 4.5958E−02 | 5.1383E−02 | 8.2233E−02 | −3.3221E−03 | −8.8325E−02 |
| A12 = | −3.0754E−03 | −5.6737E−03 | 7.5626E−03 | −2.9434E−02 | −1.3802E−02 | 5.3348E−02 |
| A14 = | 5.3494E−04 | −1.2469E−04 | −4.0755E−03 | −4.2214E−03 | 7.4519E−03 | −1.0754E−02 |

| | Surface # | | | | | |
|---|---|---|---|---|---|---|
| | 9 | 10 | 11 | 12 | 13 | 14 |
| k = | 2.4263E+01 | 1.1588E+01 | −1.1751E+00 | 1.4401E+00 | −9.0000E+01 | 1.2203E+01 |
| A4 = | −2.0421E−01 | −3.1105E−01 | −3.2356E−01 | −1.0792E−01 | −2.2274E−01 | −1.5396E−01 |
| A6 = | 1.0219E−01 | 1.5802E−01 | 4.8745E−01 | 3.0938E−01 | 3.0177E−01 | 1.6342E−01 |
| A8 = | −1.3066E+00 | 5.1777E−01 | 3.1277E−01 | −4.9627E−01 | −3.1346E−01 | −1.3737E−01 |
| A10 = | 4.0796E+00 | −1.4344E+00 | −1.9154E+00 | 4.3559E−01 | 2.2874E−01 | 7.8474E−02 |
| A12 = | −6.5070E+00 | 1.2994E+00 | 2.0016E+00 | −2.2867E−01 | −1.1350E−01 | −3.0567E−02 |
| A14 = | 4.9724E+00 | −4.6794E−01 | −3.2902E−01 | 7.3435E−02 | 3.7008E−02 | 7.9864E−03 |
| A16 = | −1.4178E+00 | 5.7558E−02 | −7.3550E−01 | −1.3602E−02 | −7.5069E−03 | −1.3476E−03 |
| A18 = | — | — | 5.0465E−01 | 1.1087E−03 | 8.5536E−04 | 1.3382E−04 |
| A20 = | — | — | −1.0261E−01 | — | −4.1801E−05 | −5.9429E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 6.20 | T12/CT2 | 0.34 |
| Fno | 2.22 | T23/CT3 | 0.93 |
| HFOV [deg.] | 21.9 | TL [mm] | 5.70 |
| Nmax | 1.66 | TL/f | 0.92 |
| V1 | 56.1 | TL/Y1 | 2.26 |
| V2 | 18.7 | R4/R5 | 0.51 |
| V3 | 28.2 | f/f1 | 1.91 |
| V4 | 18.7 | f/f2 | −0.95 |
| V5 | 23.5 | f/f3 | 0.20 |
| V6 | 18.7 | f/f4 | 0.21 |
| Vmin | 18.7 | f/f5 | −0.79 |
| ΣVi | 163.9 | f/f6 | −0.81 |
| ΣAT/ΣCT | 0.86 | f/|f|min | 1.91 |
| (CT2 + CT3)/T23 | 1.54 | $\log_{10}(|f2/R3|)$ | −0.07 |
| (CT2 + CT4 + CT5)/(CT1 + CT3 + CT6) | 0.40 | Yc62/Y62 | — |
| (CT3 + CT4)/T34 | 1.11 | — | — |

12th Embodiment

Figure 23:
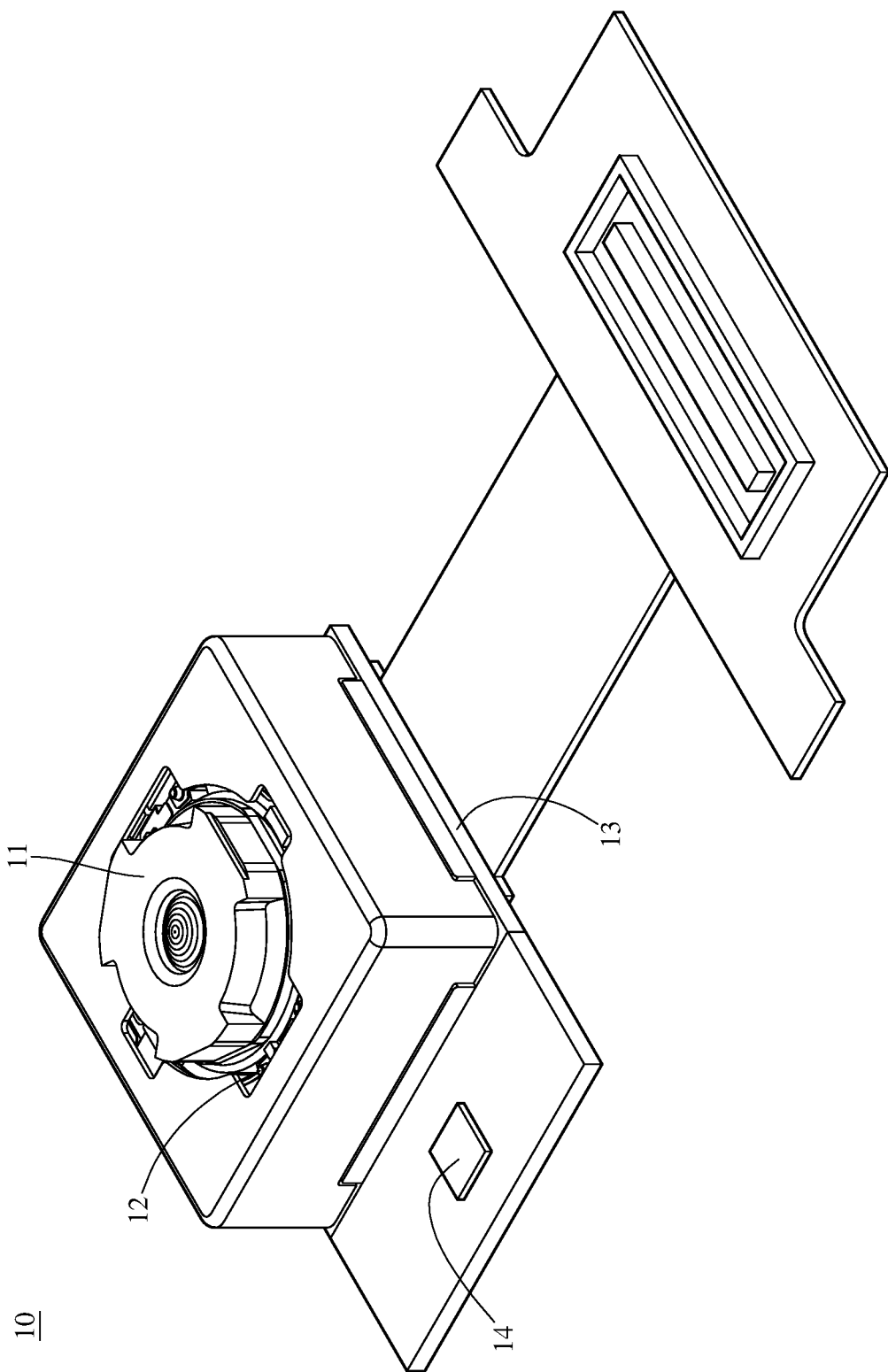
FIG. 23 is a perspective view of an image capturing unit of an electronic device according to the 12th embodiment of the present disclosure.

FIG. 23 is a perspective view of an image capturing unit of an electronic device according to the 12th embodiment of the present disclosure. In this embodiment, an image capturing unit 10 is a camera module including a lens unit 11, a driving device 12, an image sensor 13 and an image stabilizer 14. The lens unit 11 includes the optical system disclosed in the 1st embodiment, a barrel and a holder member (their reference numerals are omitted) for holding the optical system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the inner-side conjugate surface of the optical system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
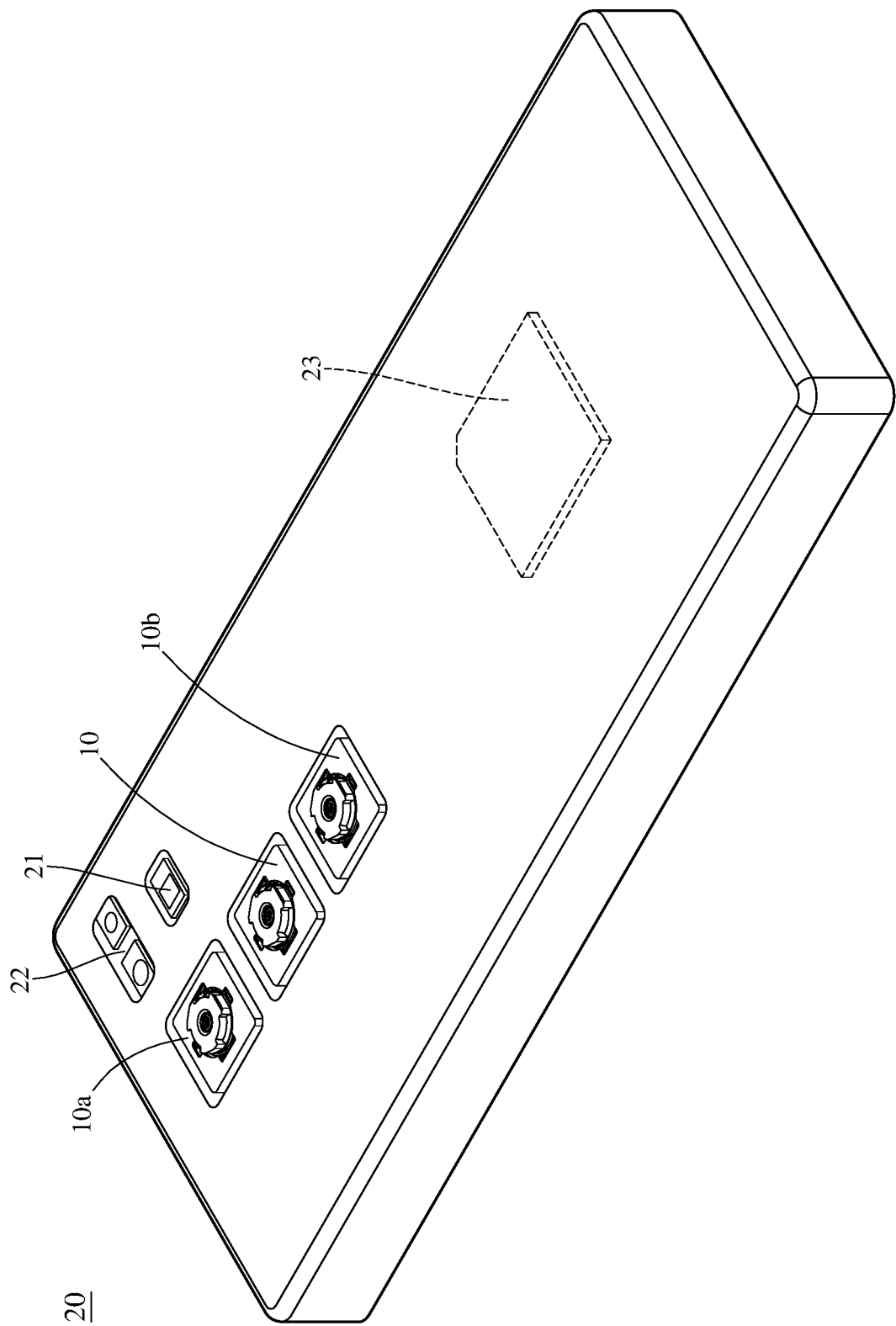
FIG. 24 is one perspective view of an electronic device according to the 13th embodiment of the present disclosure.
Figure 25:
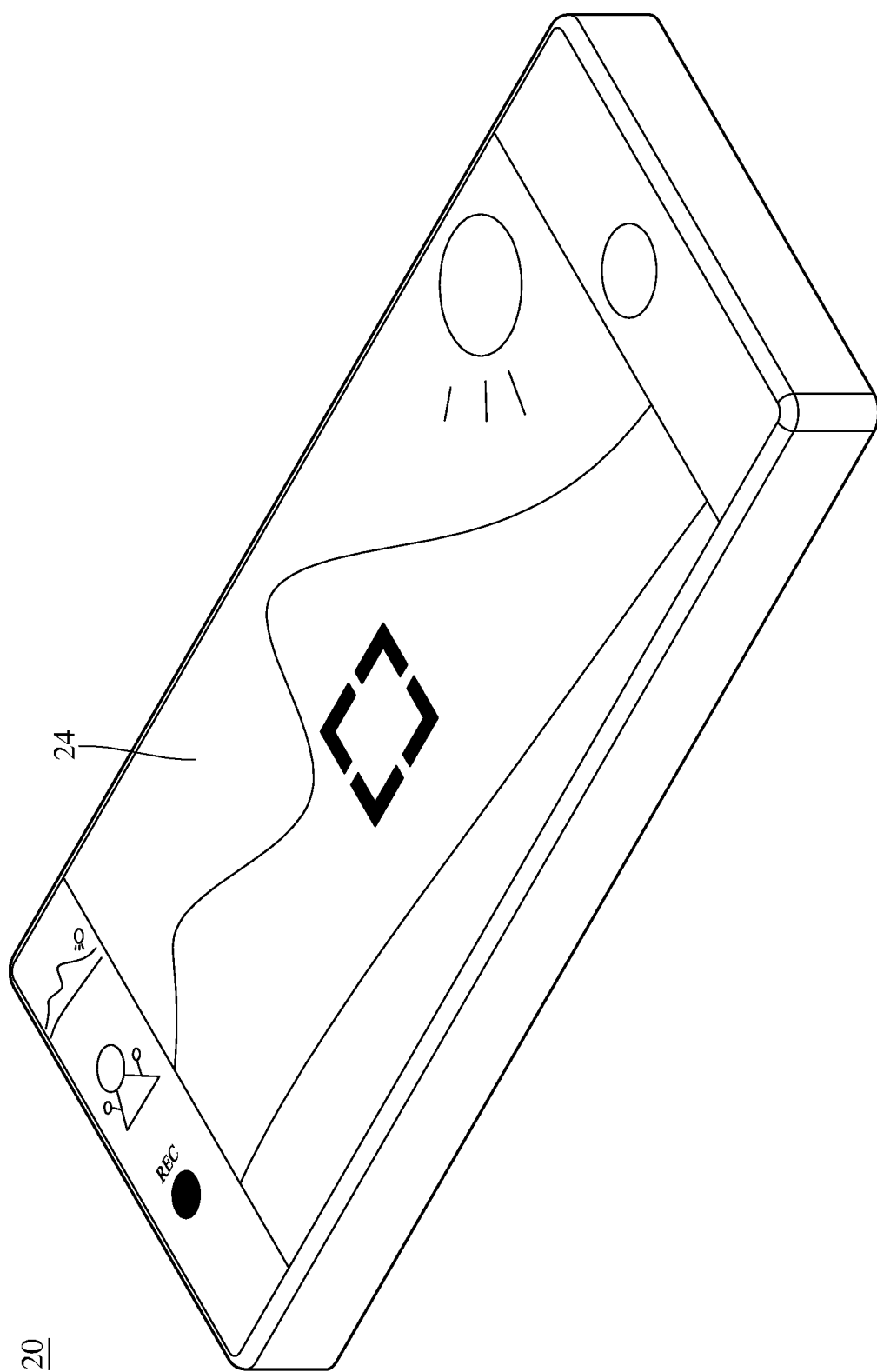
FIG. 25 is another perspective view of the electronic device in FIG. 24.
Figure 26:
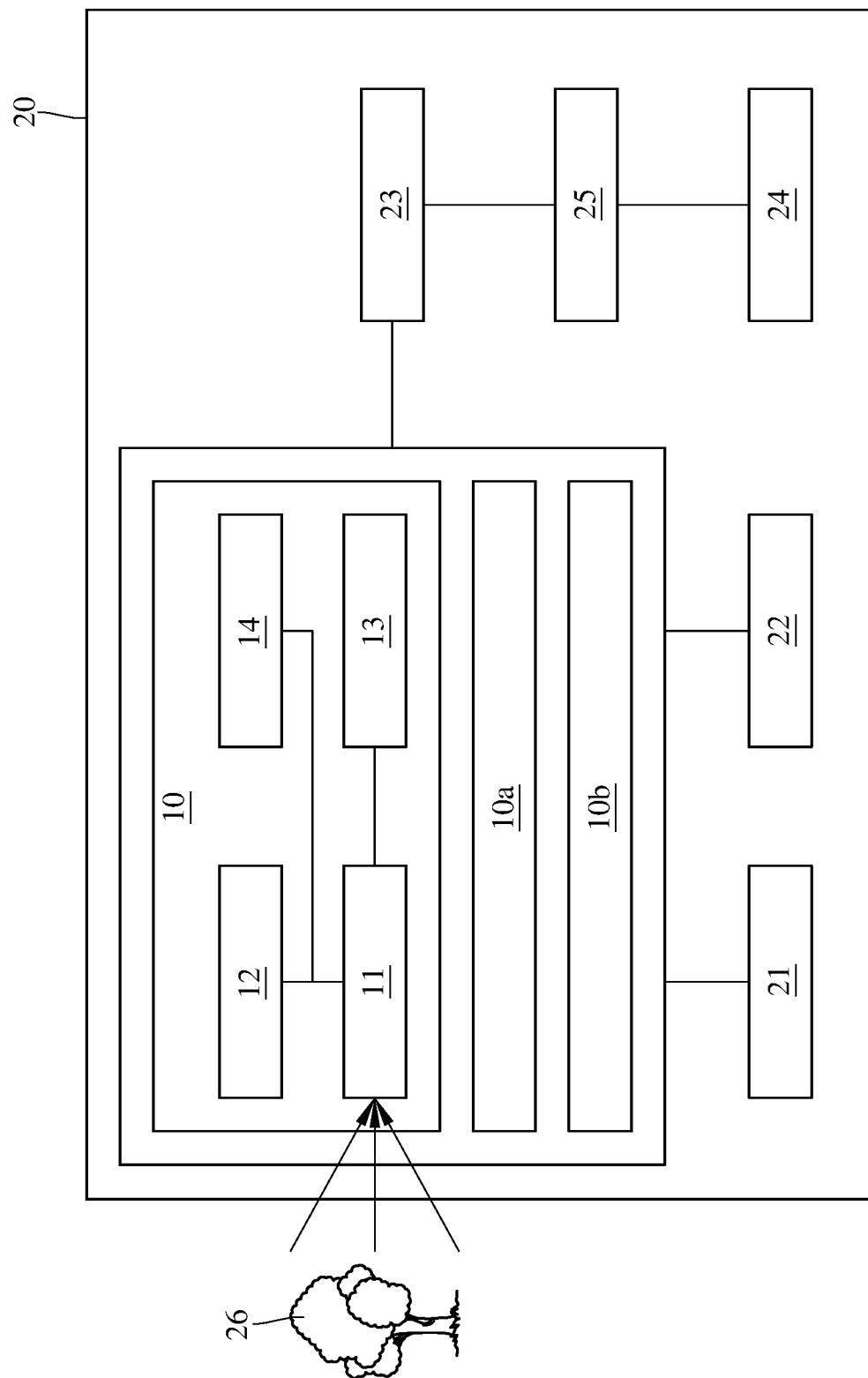
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 20 is a smartphone including the image capturing unit 10 disclosed in the 12th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, each of the image capturing unit 10a and the image capturing unit 10b has a configuration similar to that of the image capturing unit 10. In detail, each of the image capturing unit 10a and the image capturing unit 10b includes a lens unit, a driving device, an image sensor and an image stabilizer, and the lens unit includes the optical system of the present disclosure, a barrel and a holder member for holding the lens system.

In this embodiment, the image capturing units 10, 10a, 10b have different fields of view. In detail, the optical system of the image capturing unit 10 is the optical system disclosed in the 1st embodiment; the optical system of the image capturing unit 10a is the optical system disclosed in the 7th embodiment, and the image capturing unit 10a is, for example, a telephoto image capturing unit; the image capturing unit 10b is the optical system disclosed in the 10th embodiment, and the image capturing unit 10b is, for example, a wide-angle image capturing unit. The image capturing unit 10 can have a field of view ranging between that of the image capturing unit 10a and the image capturing unit 10b, such that the electronic device 20 has various magnification ratios so as to meet the requirement of optical zoom functionality. In this embodiment, the electronic device 20 includes multiple image capturing units 10, 10a and 10b, but the present disclosure is not limited to the number and the configuration of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

14th Embodiment

FIG. 27 is a schematic view of a detecting module of an electronic device according to the 14th embodiment of the present disclosure. In this embodiment, a detecting module 30 includes a receiving device 31 and a projection device 32. The receiving device 31 includes an imaging optical system 31a and an image sensor 31b. The image sensor 31b is disposed on an inner-side conjugate surface 311a of the imaging optical system 31a. The projection device 32 includes a projection optical system 32a and a light source 32b. The light source 32b is disposed on an inner-side conjugate surface 321a of the projection optical system 32a. In addition, each of the imaging optical system 31a and the projection optical system 32a can be the optical system of the present disclosure. FIG. 27 shows a schematic view of several lens elements of the imaging optical system 31a and the projection optical system 32a.

The light source 32b can be a laser, a superluminescent diode (SLED), a micro LED, a resonant cavity light emitting diode (RCLED), a vertical cavity surface emitting laser (VCSEL) and the like. The light source 32b can be a single light source or multiple light sources disposed on the inner-side conjugate surface 321a of the projection optical system 32a to present good projection quality. In a case that the light source 32b of the projection device 32 is a VCSEL disposed on the inner-side conjugate surface 321a of the projection optical system 32a, the light source 32b is favorable for the projection device 32 emitting high directional light rays having low divergence and high intensity so as to enhance the illuminance of an outer-side conjugate surface of the projection optical system 32a. The light source 32b of the projection device 32 projects a light onto a detected object O. The detected object O reflects the light, and the reflected light travels into the receiving device 31. The light traveling into the receiving device 31 passes through the imaging optical system 31a and then is imaged on the image sensor 31b.

The projection device 32 may further include a diffractive optical element (not shown). The diffractive optical element helps project the light evenly onto the detected object O, or helps diffract the light to enlarge the projection angle and the projection field. The diffractive optical element can be a diffuser, a raster or a combination thereof (but not limited thereto). The diffractive optical element can have a micro structure such as a diffraction grating for scattering the light and replicating a speckle pattern generated by the scattered light, thereby enlarging the projection angle of the projection device 32.

The present disclosure is not limited to the detecting module 30 in FIG. 27. For example, the detecting module can include a focusing system or a reflector. The focusing system is configured to adjust the focal lengths of the projection optical system 32a of the projection device 32 and the imaging optical system 31a of the receiving device 31 according to different photographing conditions so as to provide high image resolution. The reflector is configured to improve the space utilization.

According to the present disclosure, the detecting module can be operated with light having a wavelength range of 750 nm to 1600 nm, such that the detecting module is applicable to applications such as augmented reality, face recognition and motion capturing.

15th Embodiment

Figure 28:
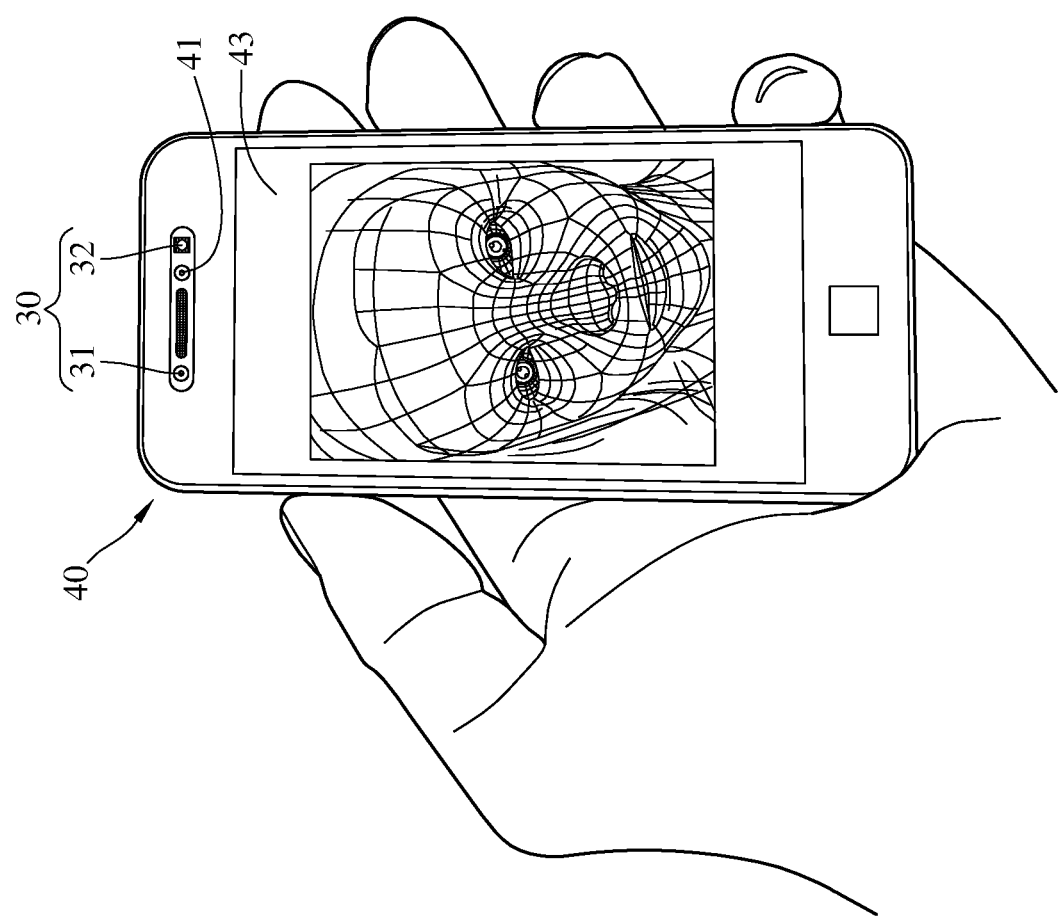
FIG. 28 is a schematic view of an electronic device according to the 15th embodiment of the present disclosure.
Figure 29:
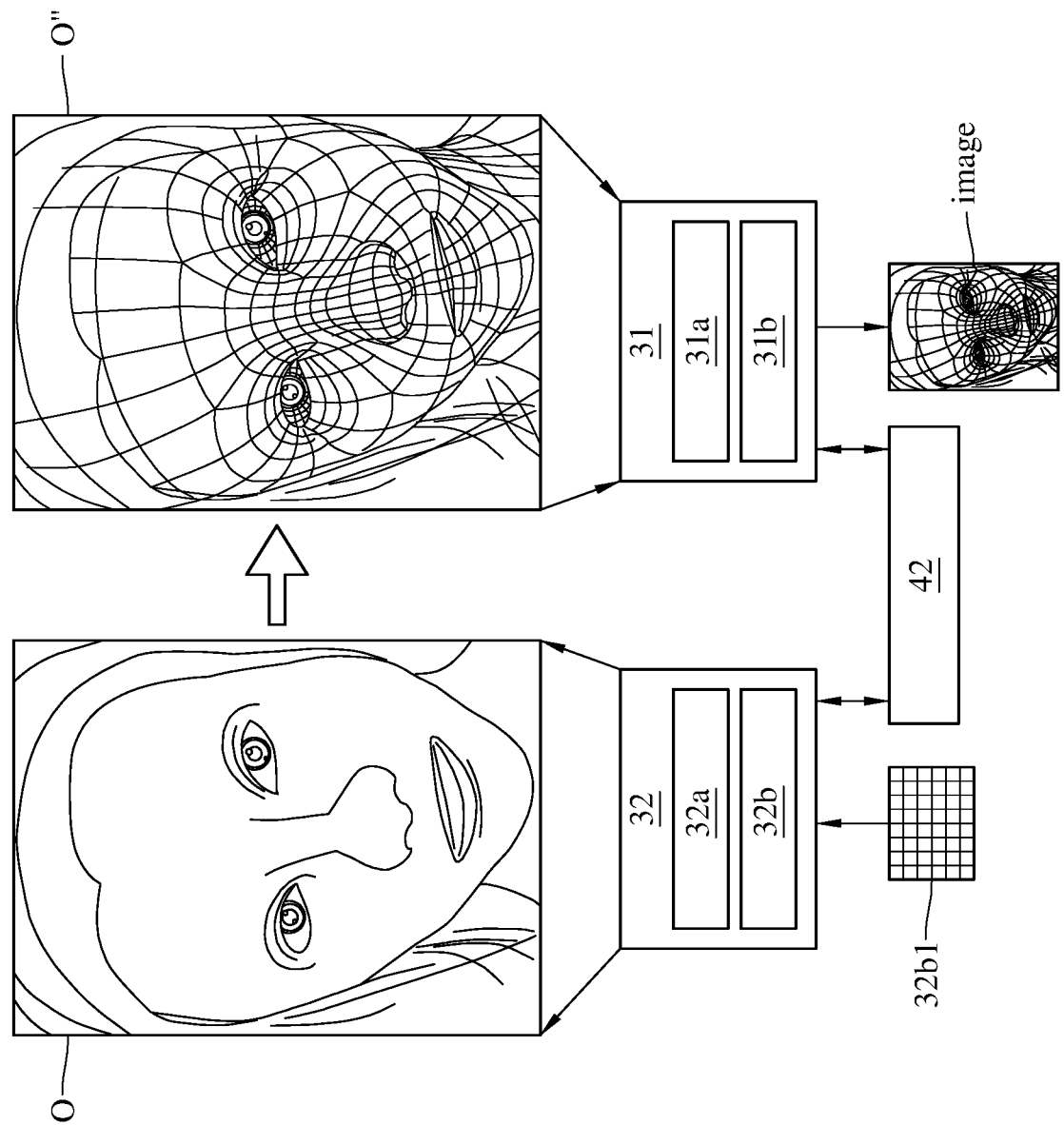
FIG. 29 is a schematic view of the detection of a 3D facial profile by using the electronic device in FIG. 28.

FIG. 28 is a schematic view of an electronic device according to the 15th embodiment of the present disclosure. FIG. 29 is a schematic view of the detection of a 3D facial profile by using the electronic device in FIG. 28. In this embodiment, an electronic device 40 is a smartphone including an image capturing unit 41, a processor 42, a screen 43 and the detecting module 30 disclosed in the 14th embodiment. The image capturing unit 41 can include the optical system of the present disclosure for imaging and photography.

A laser array 32b1 is used as the light source 32b of the projection device 32 of the detecting module 30 in order to form specific light patterns. In detail, the light passes through the projection optical system 32a of the projection device 32 to generate structured light, which is projected onto a human face (the detected object O). The structured light can be in the shape of dots, spots or stripes, but the present disclosure is not limited thereto. The structured light projected onto the human face generates a 3D face structure O" corresponding to the facial surface of the human subject.

The imaging optical system 31a of the receiving device 31 of the detecting module 30 receives the light (the 3D face structure O") reflected off the subject's face, and projected on the image sensor 31b to generate a corresponding image. The processor 42 is configured to analyze information of the image to obtain a relative distance between different parts of the subject's face, thereby determining a 3D profile of the subject's face. Moreover, after the information of the image is analyzed by the processor 42, an analyzed human facial image can be displayed on a screen 43 of the electronic device 40.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device comprising:
   an optical system comprising six lens elements, the six lens elements being, in order from an outer side to an inner side, a first lens element, a second lens element, a third lens element, a fourth lens element, a fifth lens element and a sixth lens element; each of the six lens elements having an outer-side surface facing toward the outer side and an inner-side surface facing toward the inner side, wherein each of at least three lens surfaces of the six lens elements is aspheric and has at least one inflection point, and each of at least five lens elements of the six lens elements has an Abbe number smaller than 33.0;
   wherein half of a maximum field of view of the optical system is HFOV, a focal length of the second lens element is f2, a curvature radius of the outer-side surface of the second lens element is R3, an axial distance between the second lens element and the third lens element is T23, a central thickness of the third lens element is CT3, an axial distance between the outer-side surface of the first lens element and an inner-side conjugate surface of the optical system is TL, a maximum effective radius of the inner-side conjugate surface of the optical system is YI, a sum of axial distances between each of all adjacent lens elements of the six lens elements of the optical system is ΣAT, a sum of central thicknesses of the six lens elements of the optical system is ΣCT, and the following conditions are satisfied:

$0[\deg.]<HFOV<120.0[\deg.]$;

$-5.0<\log_{10}(|f2/R3|)<3.6$;

$0<T23/CT3<2.00$;

$0.9<TL/YI<6.0$; and $0.34 \leq \Sigma AT/\Sigma CT<1.40$.

2. The electronic device of claim 1, wherein each of at least four lens elements of the six lens elements has an Abbe number smaller than 28.5, an f-number of the optical system is Fno, and the following condition is satisfied:

$0.5<Fno<5.0$.

3. The electronic device of claim 1, wherein each of at least five lens elements of the six lens elements has an Abbe number smaller than 31.0, the axial distance between the outer-side surface of the first lens element and the inner-side conjugate surface of the optical system is TL, a focal length of the optical system is f, and the following condition is satisfied:

$0.50<TL/f<5.00.$

4. The electronic device of claim 1, wherein half of the maximum field of view of the optical system is HFOV, the axial distance between the outer-side surface of the first lens element and the inner-side conjugate surface of the optical system is TL, a focal length of the optical system is f, and the following conditions are satisfied:

$7.0[deg.]<HFOV<27.0[deg.];$ and $0.50<TL/f<1.00.$

5. The electronic device of claim 1, wherein the inner-side surface of the sixth lens element is concave in a paraxial region thereof, and the inner-side surface of the sixth lens element is aspheric and has at least one inflection point.

6. The electronic device of claim 5, wherein a focal length of the optical system is f, a focal length of the first lens element is f1, the central thickness of the third lens element is CT3, a central thickness of the fourth lens element is CT4, an axial distance between the third lens element and the fourth lens element is T34, and the following conditions are satisfied:

$-1.2<f/f1<1.4;$ and $0.28<(CT3+CT4)/T34<50.00.$

7. The electronic device of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the i-th lens element is Vi, and the following condition is satisfied:

$60.0<\Sigma Vi<200.0,$ wherein i=1, 2, 3, 4, 5, 6.

8. The electronic device of claim 1, wherein a central thickness of the second lens element is CT2, the central thickness of the third lens element is CT3, the axial distance between the second lens element and the third lens element is T23, and the following condition is satisfied:

$1.1<(CT2+CT3)/T23<8.0.$

9. The electronic device of claim 1, wherein an axial distance between the first lens element and the second lens element is T12, a central thickness of the second lens element is CT2, a focal length of the optical system is f, a minimum value among absolute values of focal lengths of each of the six lens elements of the optical system is |f|min, and the following conditions are satisfied:

$0.022<T12/CT2<1.5;$ and $1.40<f/|f|min<4.00.$

10. The electronic device of claim 1, wherein the axial distance between the outer-side surface of the first lens element and the inner-side conjugate surface of the optical system is TL, a focal length of the optical system is f, the focal length of the second lens element is f2, a curvature radius of the inner-side surface of the second lens element is R4, a curvature radius of the outer-side surface of the third lens element is R5, and the following conditions are satisfied:

$1.25<TL/f<4.50;$ $-0.70<R4/R5<0.95;$ and $-3.0<f/f2<2.0.$

11. The electronic device of claim 1, wherein the optical system is operated within a wavelength range of 750 nm to 1600 nm, the axial distance between the outer-side surface of the first lens element and the inner-side conjugate surface of the optical system is TL, and the following condition is satisfied:

$1.0[mm]<TL<15[mm].$

12. The electronic device of claim 1, further comprising an image capturing unit, wherein the image capturing unit comprises the optical system and an image sensor, and the image sensor is disposed on the inner-side conjugate surface of the optical system.

13. An electronic device comprising:
an optical system comprising six lens elements, the six lens elements being, in order from an outer side to an inner side, a first lens element, a second lens element, a third lens element, a fourth lens element, a fifth lens element and a sixth lens element; each of the six lens elements having an outer-side surface facing toward the outer side and an inner-side surface facing toward the inner side, wherein the inner-side surface of the sixth lens element is concave in a paraxial region thereof, the inner-side surface of the sixth lens element is aspheric and has at least one inflection point, the outer-side surfaces and the inner-side surfaces of at least three lens elements of the six lens elements are aspheric, and each of at least four consecutive lens elements of the six lens elements adjacently arranged has an Abbe number smaller than 35.0;
wherein half of a maximum field of view of the optical system is HFOV, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, an f-number of the optical system is Fno, an axial distance between the outer-side surface of the first lens element and an inner-side conjugate surface of the optical system is TL, a focal length of the optical system is f, and the following conditions are satisfied:

$5.0[deg.]<HFOV<30.0[deg.];$ $0<(CT2+CT4+CT5)/(CT1+CT3+CT6)<0.95;$ $1.8<Fno<5.0;$ and $0.50<TL/f<1.00.$ 14. The electronic device of claim 13, wherein the outer-side surface of the sixth lens element is aspheric and has at least one inflection point, a maximum value among refractive indices of the six lens elements of the optical system is Nmax, a minimum value among Abbe numbers of the six lens elements of the optical system is Vmin, and the following conditions are satisfied:

1.64≤Nmax<1.75; and 10.0<Vmin≤20.4.

15. The electronic device of claim 13, wherein each of at least five lens elements of the six lens elements has an Abbe number smaller than 31.0, the focal length of the optical system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

−2.0<f/f1<5.0;

−5.0<f/f2<5.0;

−5.0<f/f3<5.0;

−5.0<f/f4<5.0;

−5.0<f/f5<5.0; and

−5.0<f/f6<5.0.

16. The electronic device of claim 13, wherein the central thickness of the first lens element is CT1, the central thickness of the second lens element is CT2, the central thickness of the third lens element is CT3, the central thickness of the fourth lens element is CT4, the central thickness of the fifth lens element is CT5, the central thickness of the sixth lens element is CT6, a focal length of the second lens element is f2, a curvature radius of the outer-side surface of the second lens element is R3, and the following conditions are satisfied:

0.20<(CT2+CT4+CT5)/(CT1+CT3+CT6)<0.80; and

−5.0<log$_{10}$(|f2/R3|).

17. The electronic device of claim 13, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the i-th lens element is Vi, and the following condition is satisfied:

60.0<ΣVi<200.0, wherein i=1, 2, 3, 4, 5, 6.

18. The electronic device of claim 13, wherein the central thickness of the second lens element is CT2, the central thickness of the third lens element is CT3, an axial distance between the second lens element and the third lens element is T23, and the following condition is satisfied:

1.1<(CT2+CT3)/T23<8.0.

19. The electronic device of claim 13, wherein a curvature radius of the inner-side surface of the second lens element is R4, a curvature radius of the outer-side surface of the third lens element is R5, and the following condition is satisfied:

−0.70<R4/R5<0.95.

20. The electronic device of claim 13, wherein there is an air gap in a paraxial region between each of at least three pairs of adjacent lens elements of the six lens elements of the optical system, the focal length of the optical system is f, a focal length of the first lens element is f1, half of the maximum field of view of the optical system is HFOV, and the following conditions are satisfied:

−1.2<f/f1<1.4; and 7.0[deg.]<HFOV<27.0[deg.].

21. An electronic device comprising:
an optical system comprising six lens elements, the six lens elements being, in order from an outer side to an inner side, a first lens element, a second lens element, a third lens element, a fourth lens element, a fifth lens element and a sixth lens element; each of the six lens elements having an outer-side surface facing toward the outer side and an inner-side surface facing toward the inner side, wherein the inner-side surface of the sixth lens element is concave in a paraxial region thereof, the inner-side surface of the sixth lens element is aspheric and has at least one inflection point, and each of at least five lens elements of the six lens elements has an Abbe number smaller than 35.0;
wherein half of a maximum field of view of the optical system is HFOV, and the following condition is satisfied:

38.0[deg.]<HFOV<120.0[deg.].

22. The electronic device of claim 21, wherein the outer-side surface of the sixth lens element is aspheric and has at least one inflection point, each of at least five lens elements of the six lens elements has an Abbe number smaller than 33.0, a sum of axial distances between each of all adjacent lens elements of the six lens elements of the optical system is ΣAT, a sum of central thicknesses of the six lens elements of the optical system is ΣCT, and the following condition is satisfied:

0.20<ΣAT/ΣCT<1.40.

23. The electronic device of claim 21, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the i-th lens element is Vi, an axial distance between the outer-side surface of the first lens element and an inner-side conjugate surface of the optical system is TL, a focal length of the optical system is f, and the following conditions are satisfied:

60.0<ΣVi<200.0, wherein i=1, 2, 3, 4, 5, 6; and 1.00<TL/f<5.00.

24. The electronic device of claim 21, wherein a central thickness of the second lens element is CT2, a central thickness of the third lens element is CT3, an axial distance between the second lens element and the third lens element is T23, an f-number of the optical system is Fno, and the following conditions are satisfied:

1.1<(CT2+CT3)/T23<8.0; and 0.5<Fno<2.8.

25. The electronic device of claim 21, wherein the inner-side surface of the sixth lens element has at least one critical point in an off-axis region thereof, a curvature radius of the inner-side surface of the second lens element is R4, a curvature radius of the outer-side surface of the third lens element is R5, a vertical distance between the at least one critical point on the inner-side surface of the sixth lens element and an optical axis is Yc62, a maximum effective radius of the inner-side surface of the sixth lens element is Y62, and the following conditions are satisfied:

$-0.70 < R4/R5 < 0.95$; and $0.10 < Yc62/Y62 < 0.90$.

26. The electronic device of claim 21, wherein at least three lens elements of the six lens elements are made of plastic material, a focal length of the optical system is f, a focal length of the first lens element is f1, and the following condition is satisfied:

$-1.2 < f/f1 < 1.4$.

* * * * *